United States Patent [19]

Brodegard et al.

[11] Patent Number: 5,077,673
[45] Date of Patent: Dec. 31, 1991

[54] AIRCRAFT TRAFFIC ALERT AND COLLISION AVOIDANCE DEVICE

[75] Inventors: William C. Brodegard; Dean E. Ryan, both of Columbus; Paul A. Ryan, Dublin, all of Ohio

[73] Assignee: Ryan International Corp., Columbus, Ohio

[21] Appl. No.: 462,387

[22] Filed: Jan. 9, 1990

[51] Int. Cl.$^5$ .............................................. G01S 3/02
[52] U.S. Cl. .................................... 364/461; 342/32; 342/455; 342/29
[58] Field of Search ................... 364/460, 461, 424.06, 364/443, 452; 342/29–32, 455

[56] References Cited

U.S. PATENT DOCUMENTS

| | | | |
|---|---|---|---|
| Re. 29,260 | 6/1977 | Litchford | 343/16 R |
| 3,076,962 | 2/1963 | Norton | 343/112 |
| 3,341,812 | 12/1967 | Perkinson | 340/23 |
| 3,408,651 | 10/1968 | Boudouris | 343/112 |
| 3,456,256 | 7/1969 | Perkinson | 343/6.5 |
| 3,458,861 | 7/1969 | Michnik | 343/112 |
| 3,521,278 | 7/1970 | Michnik | 343/6 |
| 3,614,728 | 10/1971 | Borrok | 340/23 |
| 3,623,048 | 11/1971 | Haddock | 340/213.1 |
| 3,623,090 | 11/1971 | Gilbert | 343/6 |

(List continued on next page.)

OTHER PUBLICATIONS

Eleccion, "The Promise of Air Safety", *IEEE Spectrum*, Jul. 1975, pp. 26–36.
"PWI* Proximity Warning Indicator: Maintenance Manual", *General Aviation Electronics, Inc.*, 1970.
Hauser, "Computer Program Functional Specifications for En Route Conflict Alert", *The Mitre Corporation*, 1975.
Litchford, "Avoiding Midair Collisions", *IEEE Spectrum*, Sep. 1975, pp. 41–48.
Orlando et al., "TCAS I Design Guidelines", *Massachusetts Institute of Technology/NTIS*, 1982.
Perry et al., "A Matter of Margins", *IEEE Spectrum*, Nov. 1986, pp. 38, 49–50.
"Minimum Operational Performance Standards for Traffic Alert and Collision Avoidance System (TCAS) Airborne Equipment", vol. I, *Radio Technical Commission for Aeronautics*, 1983.

*Primary Examiner*—Thomas G. Black
*Attorney, Agent, or Firm*—Pollock, Vande Sande & Priddy

[57] ABSTRACT

A passive aircraft Traffic alert and Collision Avoidance device (TCAD) is based on sensing and responding to transponder replies of other aircraft to SSR interrogations. In order to avoid masking other aircraft replies by the host transponder TCAD repeatedly and randomly suppresses the host transponder and simultaneously listens for other aircraft replies. Suppression on each occasion is effective for an equal and predetermined duration which is much longer than a typical reply, in a preferred embodiment the suppression/listen duration is 725 μs. In this embodiment the time between successive suppression/listen occasions is random between 725 μs. and 5.025 ms. with an average value of about 2.9 ms. Digital signal processing is used to detect and discard garbled or overlapping replies. Each valid reply, exhibiting a minimum pulse amplitude, is decoded and correlated with a calibrated range parameter and given a time tag. Successive replies which match to within predetermined criteria in time and calibrated range are merged to track the positional relation between the host and other aircraft. The positional relation between other aircraft and the host are evaluated via a priority table in terms of relative altitude and range to locate that craft which poses the highest threat to the host. Parameters of such a craft are displayed. In the event a craft penetrates a shield of programmable size an audible alert is sounded. TCAD provides for shields for each of a plurality of flight regimes, such as terminal, standard and enroute. Selection among shields is via a single pushbutton. TCAD allows the pilot to program each of the different shield sizes. Peripheral functions such as altitude deviation alert, density altitude and barometric pressure correction for altitude reporting are also provided.

65 Claims, 28 Drawing Sheets

U.S. PATENT DOCUMENTS

| | | | |
|---|---|---|---|
| 3,626,411 | 12/1971 | Litchford | 342/6 R |
| 3,680,068 | 7/1972 | Hanchett | 340/213 |
| 3,680,122 | 7/1972 | Graham | 343/112 CA |
| 3,713,161 | 1/1973 | Rice | 343/112 CA |
| 3,715,717 | 2/1973 | Perkinson | 340/27 R |
| 3,736,559 | 5/1973 | Trageser | 340/27 R |
| 3,750,168 | 7/1973 | Schrader | 343/6.5 R |
| 3,792,472 | 2/1974 | Payne | 343/6.5 LC |
| 3,808,598 | 4/1974 | Carter | 343/112 TC |
| 3,829,640 | 8/1974 | Taylor | 200/83 N |
| 3,846,746 | 11/1974 | Trageser | 340/27 R |
| 3,849,782 | 11/1974 | Bond | 343/112 CA |
| 3,852,711 | 12/1974 | Greene | 340/27 R |
| 3,866,194 | 2/1975 | Lawton | 340/213 R |
| 3,875,570 | 4/1975 | Litchford | 343/6.5 LC |
| 3,893,091 | 7/1975 | Lee | 340/213.1 |
| 3,921,172 | 11/1975 | Litchford | 343/16 R |
| 3,947,845 | 3/1976 | Lyon | 343/6.5 LC |
| 3,959,793 | 5/1976 | Litchford | 343/6.5 R |
| 4,021,802 | 5/1977 | Litchford | 343/6.5 LC |
| 4,027,307 | 5/1977 | Litchford | 343/6.5 LC |
| 4,115,771 | 9/1978 | Litchford | 343/6 R |
| 4,161,729 | 7/1979 | Schneider | 343/6.5 R |
| 4,191,958 | 3/1980 | Hulland | 343/105 R |
| 4,302,973 | 12/1981 | Yoshino | 73/384 |
| 4,309,695 | 1/1982 | Guillemot | 340/514 |
| 4,342,087 | 7/1982 | Marin | 364/433 |
| 4,433,219 | 2/1984 | Dietz | 200/83 R |
| 4,453,154 | 6/1984 | Rait | 340/970 |
| 4,486,755 | 12/1984 | Hulland | 343/6.5 LC |
| 4,710,774 | 12/1987 | Gunny | 342/455 |
| 4,768,036 | 8/1988 | Litchford et al. | 342/455 |
| 4,835,537 | 5/1989 | Manion | 340/30 |
| 4,839,658 | 6/1989 | Kathol et al. | 342/455 |

"W"   < 1 msec.   or   = 750 μsec.   or   = 725 μsec.
"X"   < 4 msec.   or   = 3 msec.     or   = 2.9 msec.
"X"   IN THE RANGE OF < 1 msec. TO < 7 msec.

NO DATA          DATA ACQUIRED

"W" = 725 μsec.
"$\bar{X}$" = 4W
"$\bar{X}$" = 2.9 msec.
"X" IN THE RANGE OF 725 μsec. TO 5.075 msec.
"Y" = 3.625 msec., TIME FOR DATA TRANSFER FROM RAM TO A BUFFER
"$\bar{Z}$" = 1.75 W = 1.269 msec.
"Z" IN THE RANGE OF 0 msec. TO 2.538 msec.

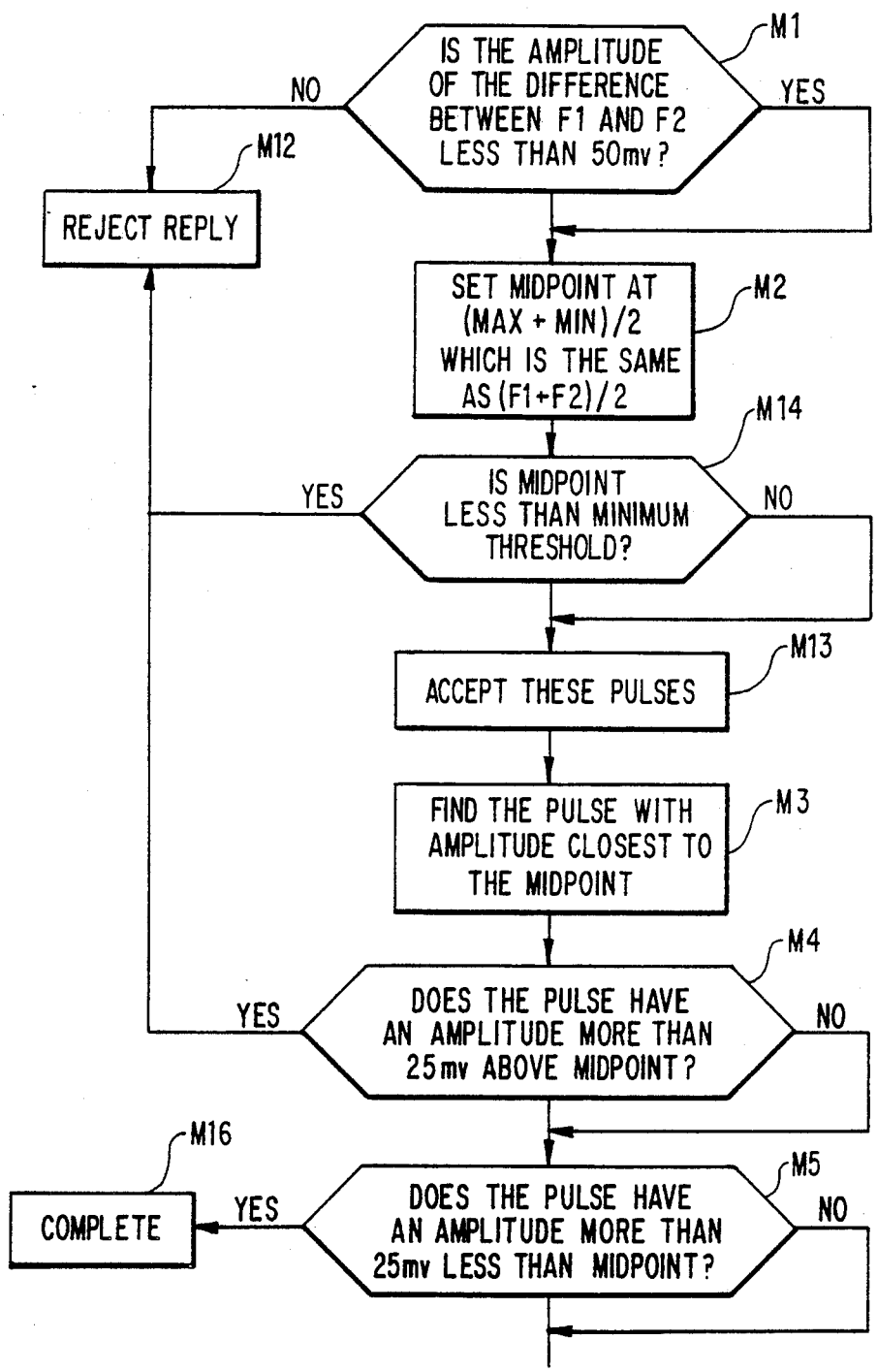

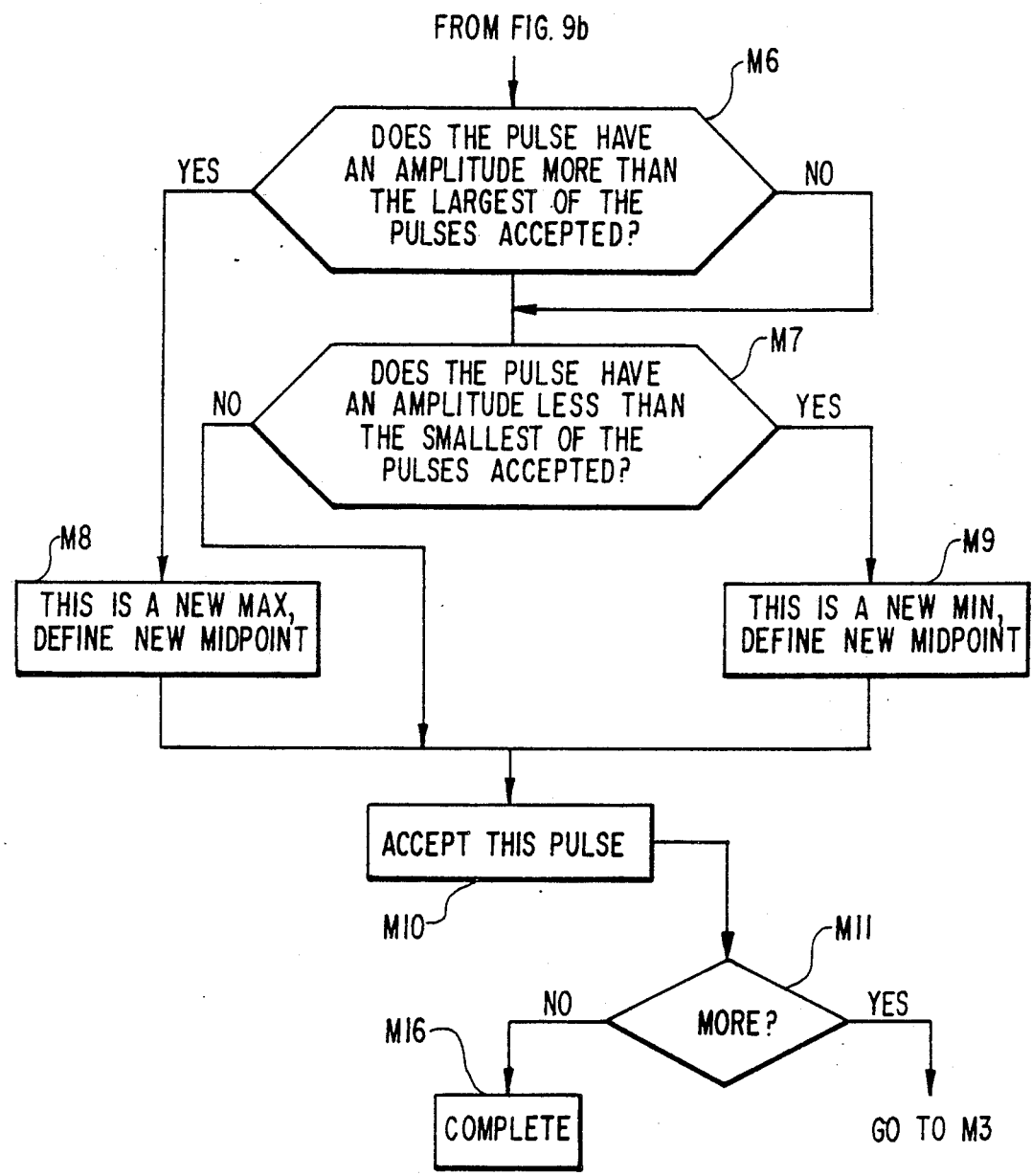

TIME INDICATED IN MICROSECONDS

FIG. 23
THREAT
TOP OF SHIELD
HOST
MODE A IMAGE
500 FEET OPPOSITE FROM THREAT — — — — — — — — — —
BOTTOM OF SHIELD
1. A THREAT IS DISPLAYED SINCE THERE IS A MODE A IMAGE WITHIN THE SHIELD AND ASSOCIATED THREAT WITHIN THE cNM OF THE SHIELD.
2. IMAGE IS DISPLAYED AS PRIMARY THREAT SINCE WITHIN SHIELD.
3. NO SECONDARY THREAT INDICATED SINCE THREAT OUTSIDE SHIELD.

1. PRIMARY AND SECONDARY THREATS DISPLAYED, SINCE BOTH THREAT AND IMAGE WITHIN SHIELD.
2. IMAGE DISPLAYED AS PRIMARY THREAT SINCE CLOSEST TO HOST (HIGHER PRIORITY).
3. SECONDARY THREAT SYMBOL DOES NOT FLASH SINCE BOTH THREAT AND IMAGE ARE NOT WITHIN 500 FEET OF HOST.

1. PRIMARY AND SECONDARY THREATS DISPLAYED, SINCE BOTH THREAT AND IMAGE ARE WITHIN SHIELD.
2. IMAGE DISPLAYED AS PRIMARY THREAT SINCE CLOSEST TO HOST (HIGHER PRIORITY).
3. SECONDARY THREAT AIRPLANE SYMBOL FLASHES SINCE BOTH THREAT AND IMAGE WITHIN 500 FEET OF HOST, AND OPPOSITE ALTITUDE DIRECTION. TELLS PILOT TO LOOK AT SECONDARY THREAT BEFORE MAKING AVOIDANCE DECISION.

FIG. 26

| cNM | 0.3 | ... 0.5 | ... 1.0 | ... 1.5 | ... 2.0 | ... 2.5 | ... 3.0 | ... 3.9 |
|---|---|---|---|---|---|---|---|---|
| NO ALT II | 252 | 256 | 266 | 276 | 288 | 778 VI | 788 | 806 |
| 2500 ... VIII | 2024 | 2028 | 2038 | 2048 | 2058 | 2068 | 2078 | 2096 |
| 2000 ... | 1654 | 1658 | 1668 | 1678 | 1688 | 1698 | 1708 | 1726 |
| 1500 ... | 1284 | 1288 | 1298 | 1308 | 1318 | 1328 | 1338 | 1356 |
| 1000 V | 734 | 738 | 748 | 758 | 768 | 958 VII | 968 | 986 |
| 500 | 328 | 332 | 342 | 352 | 362 | 552 | 562 | 580 |
| 400 III | 290 | 294 | 302 | 314 | 324 | 516 | 526 | 544 |
| 300 | 214 | 218 | 228 | 238 | 248 | 480 | 490 | 508 |
| 200 | 176 | 180 | 190 | 200 | 210 | 444 | 454 | 472 |
| 100 | 138 | 142 | 152 | 162 | 172 | 408 | 418 | 436 |
| 0 I | 100 | 104 | 114 | 124 | 134 | 372 IV | 382 | 400 |
| -100 | 139 | 143 | 153 | 163 | 173 | 409 | 419 | 437 |
| -200 | 177 | 181 | 191 | 201 | 211 | 445 | 455 | 473 |
| -300 | 215 | 219 | 229 | 239 | 249 | 481 | 491 | 509 |
| -400 | 291 | 295 | 303 | 315 | 325 | 517 | 527 | 545 |
| -500 III | 329 | 333 | 343 | 353 | 363 | 553 | 563 | 581 |
| -1000 V | 735 | 739 | 749 | 759 | 769 | 959 VII | 969 | 987 |
| -1500 ... | 1285 | 1289 | 1299 | 1309 | 1319 | 1329 | 1339 | 1357 |
| -2000 ... | 1655 | 1659 | 1669 | 1679 | 1689 | 1699 | 1709 | 1727 |
| -2500 ... VIII | 2025 | 2029 | 2039 | 2049 | 2059 | 2069 | 2079 | 2097 |

REGION      I:    $\leq \pm$ 300 FEET, < 2.1 cNM
REGION     II:    NO ALT, <2.1 cNM
REGION    III:    > $\pm$ 300 FEET AND $\leq \pm$ 500 FEET, $\leq$ 2.1 cNM
REGION     IV:    > $\pm$ 300 FEET AND $\leq \pm$ 500 FEET, $\leq$ 3.9 cNM
REGION      V:    > $\pm$ 500 FEET AND $\leq \pm$ 1000 FEET, $\leq$ 2.1 cNM
REGION     VI:    NO ALT, $\geq$ 2.1 cNM AND $\leq$ 3.9 cNM
REGION    VII:    > $\pm$ 500 FEET AND $\leq \pm$ 1000 FEET, $\leq$ 3.9 cNM
REGION   VIII:    > $\pm$ 1000 FEET AND $\leq \pm$ 2500 FEET, $\leq$ 3.9 cNM

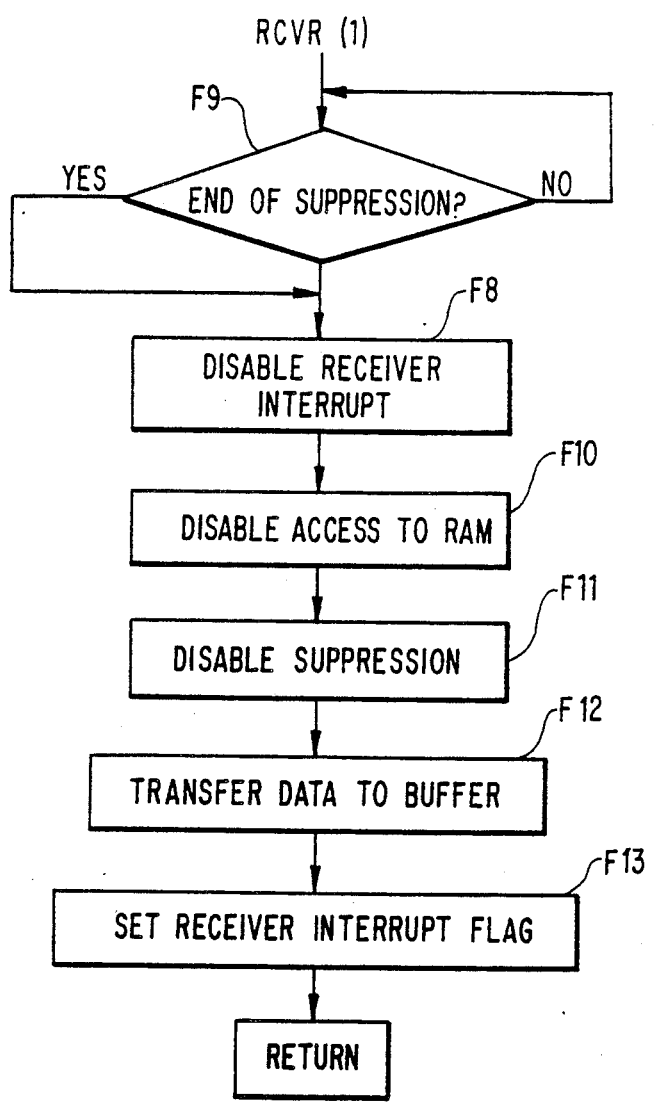

AIRCRAFT TRAFFIC ALERT AND COLLISION AVOIDANCE DEVICE

TECHNICAL FIELD

The present invention relates to an aircraft carried device which provides the pilot with information respecting collision threats.

BACKGROUND ART

The potential for aircraft collisions was recognized early in the aviation age. Initially, collision avoidance was based on the pilot's visual sense; the pilot was expected to visually identify collision threats and avoid them. Since at least the 1950's, research has been conducted to enhance collision avoidance techniques, although "see and avoid" remains the basic technique and other techniques are supplementary. Almost exclusively, those enhancements have been based on radio frequency or optical transmissions.

Since then, the government has developed and implemented the Air Traffic Control Radar Beacon System (ATCRBS). This system comprises ground based and airborne carried equipment. The ground based equipment includes two different types of radar emitters located at each of a plurality of Air Traffic Control (ATC) stations. The first type of radar equipment is referred to as the Primary Surveillance Radar (PSR), or sometimes simply as the primary radar. The primary radar operates by sending out microwave energy which is reflected by the metal surfaces of aircraft skin producing a reflected signal that is received back at the radar site and displayed for locating and displaying the position of aircraft to an air traffic controller. The second type of radar, referred to as the Secondary Surveillance Radar (SSR), or simply secondary radar, is unlike the primary radar in that it does not depend on reflected signals. The secondary radar transmits a coded 1030 MHz microwave interrogation signal. Airborne equipment includes a transponder which receive these signals, interprets them, and transmits in turn a reply back to the SSR site. The reply is transmitted back to the ground on a microwave frequency of 1090 MHz. Thus the combined ATCRBS includes ground sites comprising primary surveillance and secondary surveillance radar and aircraft carried transponders.

Transmitted Signals from Secondary Radar

Antennas for both the Primary Radar and Secondary Radar are located on the same platform, rotating continuously in a clockwise direction (viewed from top) in azimuth. As these antennas rotate, the Secondary Radar sends a narrow fan-shaped 1030±0.2 MHz beam of energy, that can cover aircraft at all elevations. With antenna rotation, aircraft at all azimuth angles are covered repetitively with each rotation of the antenna. For approach SSRs, it typically requires approximately four seconds for the rotating antenna to complete one revolution; for enroute SSRs, it typically requires approximately ten seconds to complete one revolution (a few antennas rotate as slowly as 15 seconds per revolution).

The 1030 MHz carrier of the Secondary Radar is pulse-code modulated. The rotating antenna transmits groups of two pulses, the $P_1$ and $P_3$ pulses, while an omni-directional antenna transmits a $P_2$ pulse. Using the $P_2$ pulse, the transponder receiver can tell if the $P_1$ and $P_3$ pulses are coming from the Main Lobe of the antenna or from a Side Lobe. Since $P_2$ is transmitted from an omni-directional antenna, with proper normalization, $P_1$ and $P_3$ will be stronger than $P_2$ in the Main Lobe of the antenna, whereas $P_1$ and $P_3$ will be weaker than $P_2$ in Side Lobes. By comparison of pulse amplitudes, the transponder receiver can be set to respond only to the Main Lobe of the antenna. In fact, by adjusting the relative strength of the $P_2$ pulse, the radar operator can change the effective beam width of the Main Lobe. An increase in the amplitude of $P_2$ will cause the transponder to respond on higher amplitude $P_1$ and $P_3$ pulses, thus having the effect of a more narrow antenna beam width. Typically, the amplitude of the transmitted $P_2$ pulse is adjusted so that the transponder makes about 18 replies each time the Main Lobe of the antenna pattern sweeps by the aircraft; however, especially for enroute SSRs, thirty or more replies are solicited for each beam sweep. The beam width of the rotating directional antenna is usually between 3° and 4°, however, occasionally the beam width will be almost twice this value. If the effective beam width is defined as the azimuth angle wherein the transponder is triggered, since this is influenced by system adjustment, this effective beam width can be different from the actual beam width. Antenna radiation patterns are illustrated by FIG. 16.

The pulse group repetition rate for a Secondary Radar is assigned a specific value, not to exceed 450 interrogations per second. The Pulse Repetition Period (PRP) for the pulse groups is between about 2 and 5 ms.

Nearby (within a few hundred miles) Secondary Radar installations are each assigned different interrogation rates, so that each will be asynchronous with all others in the area. Because of this, a particular radar can look for synchronous replies, while rejecting others, resulting in discrimination against unwanted replies. The range coverage for an SSR is commonly between 60 and 200 miles.

Each transmitted pulse from an SSR has a pulse width of 0.8 $\mu$s. The $P_2$ pulse occurs 2 $\mu$s after the $P_1$ pulse, and the $P_3$ pulse occurs a time "T" following the $P_1$ pulse. The time delay "T" between pulses $P_1$ and $P_3$ has certain preassigned values which determine the kind of information requested from the airborne transponder. Each assigned value for "T" determines a "Mode" of operation. FIG. 17 illustrates the transmitted pulse sequence, and Table 2-1 illustrates possible modes of operation.

Note that only modes A and C are presently used for civilian aircraft. When Mode A is used, the pulse spacing between $P_1$ and $P_3$ will be 8 $\mu$s, and the transponder will respond with an identification code set by the pilot as directed by the air traffic controller. When Mode C is used, the pulse spacing between $P_1$ and $P_3$ will be 21 $\mu$s, which instructs the transponder to respond with aircraft altitude information.

TABLE 2-1

| | Modes of Operation | | |
|---|---|---|---|
| Military Mode | Civilian Mode | T ($\mu$s) | Remarks |
| 1 | — | 3 | Military Only |
| 2 | — | 5 | Military Only |
| 3 | A | 8 | Identification |
| — | B | 17 | Not yet used |
| — | C | 21 | Altitude |
| — | D | 25 | Not yet used |

The operator of the ground based secondary radar can set the radar interrogation code to request either Mode A or Mode C replies. Typically, the radar will be set to request a sequence of two Mode A replies, then a single Mode C reply. This sequence is repeated. Thus, the radar operator will continuously receive both the Mode A identification code, as well as the Mode C altitude code.

Transponder Reply Signals

After an airborne transponder has received a valid 1030 MHz pulse-coded interrogation signal from the secondary radar, a pulse-coded reply signal is transmitted from the airborne transponder. This reply signal has a carrier frequency of 1090±3 MHz and is transmitted from an omni-directional dipole antenna mounted beneath the aircraft. The peak radiated power from the 1090 MHz transmitted should be between 125 watts and 500 watts, with typical General Aviation transponders radiating about 250 watts peak power output from the antenna. After receiving the interrogation signal from the ground based radar, the start of the transponder reply is delayed 3 μs from the leading edge of the $P_3$ interrogation pulse. The transponder reply consists of two framing pulses, $F_1$ and $F_2$ which are spaced 20.3 μs apart, and twelve data pulse positions located between the two framing pulses. There is an additional pulse position, SPI (Special Position Identification), located beyond $F_2$. FIG. 18 presents an overview of the pulse coding format of the interrogation from the ground based secondary radar, the transponder reply, and the time delay between the two.

Although the interrogation rate from the ground based radar is limited to 450 interrogations per second, when a transponder is being interrogated by several ground radar stations simultaneously, the interrogation rate may be much greater. Transponders limit their maximum reply rate to a recommended value of 1200 replies per second (one reply per 833 μs). This is necessary in order to place reasonable limits on the average radiated power from the transponder.

The pulse width of each data pulse is 0.45 μs, with pulse positions of the twelve data pulses spaced 1.45 μs (2.9 μs between 6th and 7th data pulses). The framing pulses, $F_1$ and $F_2$, are always present in a reply, whereas the twelve data pulses between the framing pulses are coded according to the reply data to be transmitted. The SPI pulse is present when the transponder operator manually initiates an "IDENT" reply. When the ground based radar operator wants to quickly identify a specific aircraft, he will request the pilot to "IDENT". With this request, the pilot manually activates the "IDENT", which causes the SPI pulse to appear for about a 20-second duration. The presence of the SPI pulse causes the target for this specific aircraft to illuminate apart from other targets, permitting the radar operator quick identification of the specific aircraft. FIG. 19 illustrates the transponder reply code format. Table 2-2 tabulates time positions for each reply pulse as measured from $F_1$, the first framing pulse.

TABLE 2-2

| Pulse | Reply Pulse Positions Time From First Framing Pulse (μs) |
|---|---|
| First Framing Pulse | 0 |
| Data Pulse C1 | 1.45 |
| Data Pulse A1 | 2.90 |
| Data Pulse C2 | 4.35 |
| Data Pulse A2 | 5.80 |
| Data Pulse C4 | 7.25 |
| Data Pulse A4 | 8.70 |
| Data Pulse B1 | 11.60 |
| Data Pulse D1 | 13.05 |
| Data Pulse B2 | 14.50 |
| Data Pulse D2 | 15.95 |
| Data Pulse B4 | 17.40 |
| Data Pulse D4 | 18.85 |
| Second Framing Pulse | 20.30 |
| Special Position Identification Pulse | 24.65 |

The twelve data pulses of the transponder reply allows for $2^{12}=4096$ possible codes that can be either selected by the Code Selector Switches (Mode A) on conventional transponders, or by repeat aircraft ID on Mode S transponders, or by the Altitude Digitizer (Mode C). The pulses are divided into four groups of three pulses, identified as the A, B, C and D groups. These groups form a 4-digit number in which the A group is the "thousands" digit, the B group the "hundreds" digit, the C group the "tens" digit, and the D group the "units" digit. Thus, the resulting number is represented by:

ABCD where each digit can take on one of eight values from 0 through 7. Table 2-3 shows the binary states associated with numerical values for A, B, C and D. Binary state "0" indicates the absence of a pulse; binary state "1" indicates the presence of a pulse.

TABLE 2-3

| Binary States | | | |
|---|---|---|---|
| A | $A_4$ | $A_2$ | $A_1$ |
| B | $B_4$ | $B_2$ | $B_1$ |
| C | $C_4$ | $C_2$ | $C_1$ |
| D | $D_4$ | $D_2$ | $D_1$ |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

The Code Selector Switches select the proper binary states corresponding to the Mode A code that is entered. For Mode C altitude coding, a "gray" code is utilized, having the property that only a single binary bit changes state for progressive changes in altitude. Altitude is digitized in 100 foot increments by a remote altitude digitizer, with the resulting code supplied to the transponder through electrical connections. A 100-foot change in altitude will result in a single bit change in the number ABCD. The altitude information supplied from the digitizing altimeter is referenced to the Standard Barometric Pressure of 29.92 inches of mercury. This altitude is referred to as the Pressure Altitude.

Beginning in the 1960's, efforts were made to incorporate the existing and contemplated transponders in collision avoidance systems. Collision avoidance systems which depend on the use of aircraft carried transponders can be divided into two classes. One class is referred to as passive systems because the only emissions relied on for locating and identifying potential threats are the emissions from airborne ATCRBS transponders. The other class of collision avoidance systems are referred to as active systems in that they rely on RF emissions other than, or in addition to, those created by the airborne ATCRBS transponders. Conventional wisdom is that wholly passive systems are not reliable for collision avoidance purposes.

More recently, cooperation between the government and aviation industry has developed Operational Performance Standards for electronic systems intended for traffic alert and collision avoidance. The acronym TCAS has been generally assigned to systems conforming with published standards. TCAS is an acronym for Traffic Alert and Collision Avoidance Systems. The TCAS standards call for the utilization of reply signals from airborne transponders as the basis of operation. Existing standards for TCAS rely on transponder emissions generated in response to interrogation signals from TCAS equipped aircraft, e.g. present day TCAS standards call for active systems.

Clearly, passive systems hold out the promise of simplicity, low cost in comparison to active systems and do not crowd the spectrum with additional RF transmissions. However, in order to assure reliable collision alerting from a wholly passive system, numerous problems have to be overcome; some of the problems are not even recognized in the art.

One of the most perplexing problems is reliably detecting the existence of transponder emissions from other craft; the problem arises because of the very nature of transponder operations. A passive collision threat detector is essentially a receiver equipped with sufficient intelligence to first detect and then locate the existence of potential collision threats. This receiver, however, must operate in close proximity (by necessity) to the ATCRBS transponder carried by the host aircraft on which the receiver is mounted. Government regulations require the ATCRBS transponder to emit RF energy of 125-500 watts. The transponder emits this energy in response to an interrogation signal from a SSR. Of necessity, any other aircraft lying along a radial from the SSR site to the host aircraft will also respond at about the same time as the host aircraft's transponder. Because the host aircraft's transponder is so much closer (usually no more than a few feet) from any receiver, the host aircraft's response will swamp (and hence render undetectable) the response from any other aircraft lying along or in the vicinity of the radial from the host to the SSR. The result of this effect is a blind region for the host, a region wherein any target aircraft will not be "seen" by the host unless other provisions are made. The blind region expands further and further from the radial as the target gets closer and closer to the host. Furthermore, it is not unusual for a host aircraft to be within range of more than one SSR site. Accordingly, there is a blind region which is associated with each SSR site within range of the host aircraft.

Rice U.S. Pat. No. 3,713,161 describes a proximity warning indicator which is carried aboard a first aircraft to detect transponder emissions by a second aircraft. One of the features of the Rice arrangement is a "look" generator (part of the proximity warning indicator) which generates a 3.5 ms blanking pulse every 20.8 ms. The blanking pulse is used to suppress the ATCRBS transponder on the first aircraft. Rice indicates that the 20.8 ms rate varies slightly from aircraft to aircraft in order to ensure that two aircraft, both equipped with proximity warning indicators do not simultaneously suppress their own transponders, thereby rendering the proximity warning indicators ineffective relative to each other.

Litchford U.S. Pat. No. 3,875,570, describes two methods of suppressing the ATCRBS transponder. Under one circumstance (where there is light transponder reply activity), the suppression method is to generate a 2500 µs suppression pulse 18 times per second. Under heavy transponder reply conditions, a 100 µs suppression pulse is generated 18 times per second in synchronism with the received interrogations.

Both Rice and Litchford, by providing periodic suppression of the on board transponder, limit the effectiveness of the suppression in contrast to an improved suppression arrangement described below. Further, the 3.5 ms blanking (of Rice) or the 2.5 ms suppression (of Litchford) is too long, in view of the typical AC coupling (typically with 5 ms time constant) to transponders, for reliable suppression.

Assuring that other transponder carrying aircraft can be "seen" is only the beginning of the problem of providing reliable collision avoidance. Once a transponder equipped target aircraft is "seen" that aircraft must then be located relative to the host in order to determine whether it constitutes a threat. The prior art documents the fact that range determinations in wholly passive systems are particularly suspect. In fact many of the systems justify the added expense and complexity of active systems solely as an assist in sharpening range determinations. Three variables contribute to the difficulty of making accurate range determinations in wholly passive systems. In the first place, government regulations do not specify a power level for transponder emissions; rather, a substantially wide range of power variations fall within the government regulations which mandate emissions in the range of 125-500 watts. Furthermore, experimental evidence indicates that in practice the ATCRBS transponders exhibit a wider power variation than is allowed by government regulations. The second parameter is varying reception efficiencies caused both by variations in transmission conditions (atmospheric conditions) and variations in antenna patterns (both the transponder's transmission antenna and the receiver's antenna). Finally, the third variable is the actual output pattern, i.e. there is more power in a 7777 code than in a 1111 code.

Locating aircraft in altitude is assisted by the fact that typical transponders alternately transmit identification and altitude in response to interrogations specific to identification on one hand and altitude on the other hand. It is a fact, however, that there is nothing in the transponder emission which distinguishes identification from altitude; i.e. when decoded both identity and altitude are merely 4-digit numbers Accordingly, one having decoded a transponder emission which corresponds to some altitude has no way of knowing whether or not the decoded number is an identification number or an altitude number. Some systems attempt to differentiate transponder emissions between altitude and identity by correlating the transponder emissions with the interrogation. Of necessity, this requires the device to include not only a 1090 MHz receiver (as does the present invention) but also requires the device to include a 1030 MHz receiver (which is absent in the present invention). This clearly adds cost and complexity but moreover the technique is not reliable. The lack of reliability of this technique flows from the fact that there is much air space in which an aircraft is within range of multiple SSRs. If a transponder is responding to a SSR, there is no guarantee that the host aircraft (carrying the collision warning device) is also within range of the same SSR or another SSR.

In contrast to the foregoing, the present invention provides a practical collision warning system which is wholly passive and does not depend on emissions other than ATCRBS transponder emissions.

SUMMARY OF THE INVENTION

The invention meets these and other problems in the prior art, providing a relatively simple, low-cost and effective Traffic Alert and Collision Avoidance Device (hereinafter TCAD).

Contrary to the accepted reasoning in the collision avoidance field, the present invention purposely does not attempt to generate relative azimuth (other craft relative to the host). In another departure from accepted reasoning, the present invention does not attempt to establish precise range parameters. Eliminating the need to establish precise distances between other craft (hereinafter traffic) and host is significant in maintaining low cost and simplicity. The logical underpinning for eliminating precise range information has several bases. In the first place, no two aircraft can collide unless they are at or near the same altitude. Thus, the primary threat parameter that is relied on is altitude. Secondly, given any receiver sensitivity or threshold, a corresponding range exists at which the detection probability is 100% regardless of reasonable transponder power and/or atmospheric variables. So long as there is sufficient warning time for this range, the pilot with this warning time can effect a collision avoidance maneuver, if any maneuver is necessary. Finally, trend information can be derived from changes in amplitude of the received signal. Increasing amplitude indicates the traffic is closing in distance. Since a collision threat remains on a fixed trajectory relative to the host, this trend information is essentially independent of power variations and is effective in providing the pilot with essential information in making an avoidance decision.

In accordance with the invention, a 1090 MHz receiver monitors ATCRBS transponder emissions. The output of the receiver is monitored to detect and then decode replies by traffic to SSR interrogations. The apparatus of the invention is coupled both to the host aircraft transponder and to the encoding altimeter which is typically present. The invention provides a buffer interface for accepting the output of the encoding altimeter for the purpose of determining host altitude. As will be described the apparatus generates, at the appropriate times, a suppression pulse to suppress the host transponder. Management of host transponder operation and particularly host transponder suppression is important from two competent considerations. Clearly, the longer the host transponder is suppressed, the more effective will be the detection and locating of traffic. However, suppression of the host transponder limits the ability of the ATCRBS as well as other receivers (such as other aircraft incorporating the inventive apparatus or other proximity warning or collision avoidance systems based on transponder emissions) from detecting the host. In fact, there are official guidelines which specify the maximum amount of transponder suppression. Experimental evidence indicates that optimum operation is achieved by suppressing the host transponder for fixed periods of about 1 ms duration with random spacing of suppression periods, in the range of 1 to 7 ms, with an average spacing of about 4 ms. In an embodiment which has been constructed, each suppression period is 725 $\mu$s with spacing between suppression periods selected at random in the range 725 to 5075 $\mu$s (1 to 7 times the suppression period) with an average of 2900 $\mu$s (4 times the suppression period).

For passive systems, there are significant differences in the effectiveness with which the two parameters of range and altitude can be determined. In a passive system the only parameter on which to gauge traffic range is the received power level or pulse amplitude. As noted above, however, there are inherent limitations in this technique both because the radiated power levels can vary within prescribed regulations (in actual practice there is a wider variation than is allowable under the regulations) and because reception efficiency is also a variable. On the other hand, determination of altitude difference between the host and traffic can be accomplished with the exactness permitted by mode C equipment, assuming a mode C reply has been received, decoded and identified as such. Since no two aircraft can collide unless they are at nearly the same altitude, the primary determinant of threat is altitude separation. Furthermore, trend information can be derived to indicate range or altitude changes (closure or parting) as a function of time.

Quantizing the degree of threat, first based on altitude separation and secondarily based on range, is also justified by the fact that effective collision avoidance is usually a change in altitude. It is not easy or exact to maneuver an aircraft horizontally to avoid collision with another aircraft. However, changing altitude to establish adequate vertical separation is much simpler, and more exact.

In fact, any threat approaching from any angle can be avoided by establishing and maintaining vertical separation. Therefore, the essential information for collision avoidance is awareness of the altitude of the threat (ideally, the vertical direction and the altitude difference between host and threat), and approximate distance. In addition, altitude trend information (closing or parting), and distance trend (converging or diverging) is important.

Despite the usefulness of collision avoidance data, the pilot can be confused with too much information, especially in high traffic areas, unless some method is available to limit data acquisition. As will be described below, the invention effectively places a shield around the host whereby no traffic can penetrate that shield without detection. The vertical thickness of the shield as well as the horizontal extent are set by the pilot and quickly selectable for various phases of flight. The vertical thickness of the shield is precise and forms a very sharp boundary. The horizontal extent of the shield is well defined but boundaries are not as sharply defined. As will be described, the horizontal boundaries of the shield expand somewhat for threats from the faster air carrier aircraft (because such aircraft typically transmit at higher power levels) thus offering greater margins exactly where the margins are needed.

Reliable experimental evidence indicates that for a given receiver threshold (for example $-57$ dBm), 50% of general aviation aircraft will be detected between 2 and 4 nautical miles from the host aircraft, whereas for air carriers 50% will be detected approximately 6 nautical miles from the host aircraft. 90% of transponder equipped general aviation aircraft will be detected at about 1.5 nautical miles from the host, whereas 90% of air carrier aircraft with operating transponders will be detected approximately 3.3 nautical miles from the host. On the other hand, 10% of general aviation aircraft will be detected at 5.5 nautical miles, whereas 10% of air carrier aircraft will be detect at about 10.5 nautical miles. Data points 50G, 50A, 90G, 90A, 10G and 10A are plotted on FIG. 1 with detection reliability plotted on a vertical axis and distance from the host plotted on the horizontal axis. The three data points relating to general aviation aircraft have been connected by the curve labelled "General Aviation" and the three points relating to air carriers have been connected by the curve identified as "Air Carrier". Logical extrapolation of these curves shows that both intersect both the 100% detection reliability and 0% detection reliability; these intersections identify the boundaries of 100% detection reliability and 0% detection reliability about a host using a receiver with a sensitivity of −57 dBm. Since signal strength varies inversely with the square of range, we can use the same curves to indicate detection reliability vs. distance for a receiver sensitivity of −51 dBm. This range scale is also shown on FIG. 1. FIG. 2 is similar to FIG. 1 (using the −51 dBm sensitivity) but has been annotated to indicate three data points for each of the curves (points A, B and C for the general aviation curve and D, E and F for the air carrier curve).

FIG. 3 is a schematic showing of the coverage provided by the parameters of FIG. 2 relative to the host illustrated by the aircraft symbol at the center of the diagram. FIG. 3 shows a disk-shaped region T which provides for 100% detection reliability for traffic penetrating the region T. The region T is characterized by a thickness or vertical depth referenced as Th, which is two times the parameter ALT (to be described below). The radius of the disk T is equal to one-half the parameter THD (also to be described below). FIG. 3 also (partially) shows two additional protection disks, one labelled I, corresponding to 50% shielding, and the other labelled 0, the outer limit of the shield. The tops and bottoms of shields I and 0 have been omitted for clarity but their thickness Th is identical to the thickness of the disk T. The radius of the disk I is just twice the radius of the disk T, i.e. THD, whereas the radius of the disk O is 2THD, twice the radius of the disk I.

The parameter cNM identifies Calibrated Nautical Miles (actual nautical miles separation assuming standard communications conditions). The term standard communications conditions are the transmission and propagation characteristics obtaining so that the 1090 MHz transponder transmissions from an aircraft located 2.8 nautical miles from the host will produce a signal level of −51 dBm at the receiving antenna of the host. THD represents the threshold setting of the device either in cNM or a signal level (dBm) at the antenna of the host. A received 1090 MHz reply that is equal to or greater than the threshold level setting will activate an audible alarm. The parameter ALT represents the height of the shield above and below the altitude of the host. The user set THD and ALT serves to limit the traffic available for display. This is important in high traffic areas. TCAD allows the user to program values (THD and ALT) for three different flight regimes. Terminal (TRML), Standard (SDT) and Enroute (ENRT) shield volumes provide respectively small, medium or large volumes depending on anticipated traffic density. Once programmed, the pilot can change to any one of the programmed parameters by touching the appropriate button.

Accordingly, the invention provides a Traffic Collision Avoidance Device (TCAD) which detects and displays threat potential from other traffic based on receipt of transponder replies (from the other traffic) to SSR interrogations. The TCAD interfaces with the host transponder and suppresses the host transponder, on a random basis, for approximately 20% of the time. During the time the host transponder is suppressed, TCAD is monitoring transponder replies from other traffic. The TCAD receiver, operating while the host transponder is suppressed, receives and validates the transponder replies from other traffic using novel signal processing techniques. Those replies meeting predetermined criteria established by the signal processing techniques are passed on to sorting and display processing. By this processing, each reply is associated with a time tag and a cNM parameter. The latter parameter identifies a representative distance (between host and the source of the reply) based on standard conditions. The replies are first compared against codes that represent encoded altitude. Replies which match encoded altitude and at the same time fall within a predetermined altitude band centered on host altitude, are considered Mode C (altitude) replies. All other replies, i.e. either replies not matching predetermined altitude codes or replies which do match predetermined altitude codes but are outside the band of altitude centered on host altitude, are regarded as Mode A replies.

All the replies which are regarded as Mode C (altitude) replies are compared (in terms of time stamp and cNM parameter) to see if they match (within predetermined offsets) from traffic which is already being tracked. If they do, then the parameters (altitude, range and time tag) of this traffic is updated. Those replies which do not match are treated as parameters of new traffic to be tracked.

The same parameters of Mode A replies are first compared with the parameters for traffic being tracked and those that match are used to update the parameters for the traffic being tracked. Replies which do not match are added to the list of traffic being tracked.

Traffic being tracked as reflected in the updated records is then prioritized by assigning a priority to each record based on altitude offset and range. The TCAD display then displays selected parameters from the highest priority threat. If there is additional traffic being tracked, the display identifies the existence of such other traffic. The pilot can, by manipulating the keyboard, either call for the display of other parameters from the highest priority threat or the display of parameters from second or third level threats.

Audible alerting is also employed; any detected traffic which penetrates the programmed shield parameters then in effect actuates an audible alert. The format of this alert may also be programmed.

TCAD, in addition to proximity warning and collision avoidance information, also provides for certain ancillary functions. Maintaining proper altitude is so important that it is now a criterion which is actively being monitored by air traffic control centers. As an assist to the pilot, TCAD has an altitude deviation alert. The altitude deviation alert can be selected or engaged when the host reaches a desired altitude. TCAD receives reports from the host blind encoding altimeter as to host altitude. Current host altitude is repeatedly compared to the altitude at which the altitude deviation alert was engaged. If the difference between these altitudes reaches a first predetermined criterion, an altitude deviation audio alert is enabled, signalling to the pilot the altitude deviation that has been noted. The pilot can either return to the desired altitude, disable the altitude alert, or if the deviation and altitude reaches a second predetermined criterion, then the altitude deviation alert is automatically disengaged.

As a further assist for the pilot, and as a double check on the analog altimeter, TCAD can be programmed to display sea level corrected altitude. The host's encoding altimeter is calibrated for standard barometric conditions and therefore it reports pressure altitude. The host transponder, as well as the transponder of other aircraft, transmit pressure altitude information (uncorrected). On the other hand, the pilot typically will have corrected his altimeter for barometric pressure variations. The TCAD display (but not the altitude comparison functions of proximity and collision avoidance) can be corrected for barometric pressure variations. When so corrected, the TCAD altitude display is comparable to the analog altimeter and thus serves as a cross-check or back-up for the analog altimeter.

Since TCAD may have access to barometric pressure corrected altitude, it can also provide a density altitude function. This function also requires ambient temperature information. To this end, TCAD can be put into a density altitude mode where ambient temperature information can be input, allowing TCAD to display density altitude.

Since a reply is based solely on the interrogation by an SSR and because different aircraft proximate to the host can be interrogated by different SSR's leading to overlapping and therefore garbled replies, TCAD must be capable of handling these conditions. Accepting a garbled reply as valid, can result in processing, as data, information which does not reflect reality. A consequence of accepting erroneous data is corruption of the TCAD processing and therefore the information provided to the pilot. To avoid this TCAD makes use of Digital Correlation, Pulse width discrimination, Pulse position recognition, Midpoint analysis and Threshold detection. Digital correlation acts as a filter to smooth pulse amplitude variations. Pulse width discrimination discards pulses which are too long or too short; this is one manifestation of overlapping replies. Pulse position recognition compares a sequence of pulses to sequences which are within the transponder specifications; variations of the sequence from the specification are another manifestation of overlapping replies. Midpoint analysis is a powerful technique which validates pulses of a reply only if they all have an amplitude within a given variation from an average. In order to effectively implement midpoint analysis it must include some adaptive technique to identify the midpoint about which the pulse amplitudes of the reply are tested. TCAD uses a sequential process which first attempts to validate the framing pulses ($F_1$ and $F_2$), successive further pulses are processed to simultaneously validate the pulse and adjust the appropriate midpoint, if necessary. Threshold detection is incorporated in the Midpoint analysis. This has the advantage of limiting the information accepted by TCAD to thereby limit burden on the pilot which can come from attempting to absorb too much information.

BRIEF DESCRIPTION OF THE DRAWINGS

The invention will be described in the following portions of the specification so as to enable those skilled in the art to practice the invention when the specification is taken in conjunction with the attached drawings, in which like reference characters identify identical apparatus and in which:

FIGS. 9b and 9c are useful in describing Midpoint Analysis signal processing procedure;

FIGS. 23–25 are useful in explaining the effect of Mode A images;

FIG. 26 is a typical priority table;

FIGS. 28, 29a, 29b and 30 show three interrupt routines for CPU 120.

DETAILED DESCRIPTION OF PREFERRED EMBODIMENTS

Figure 4:
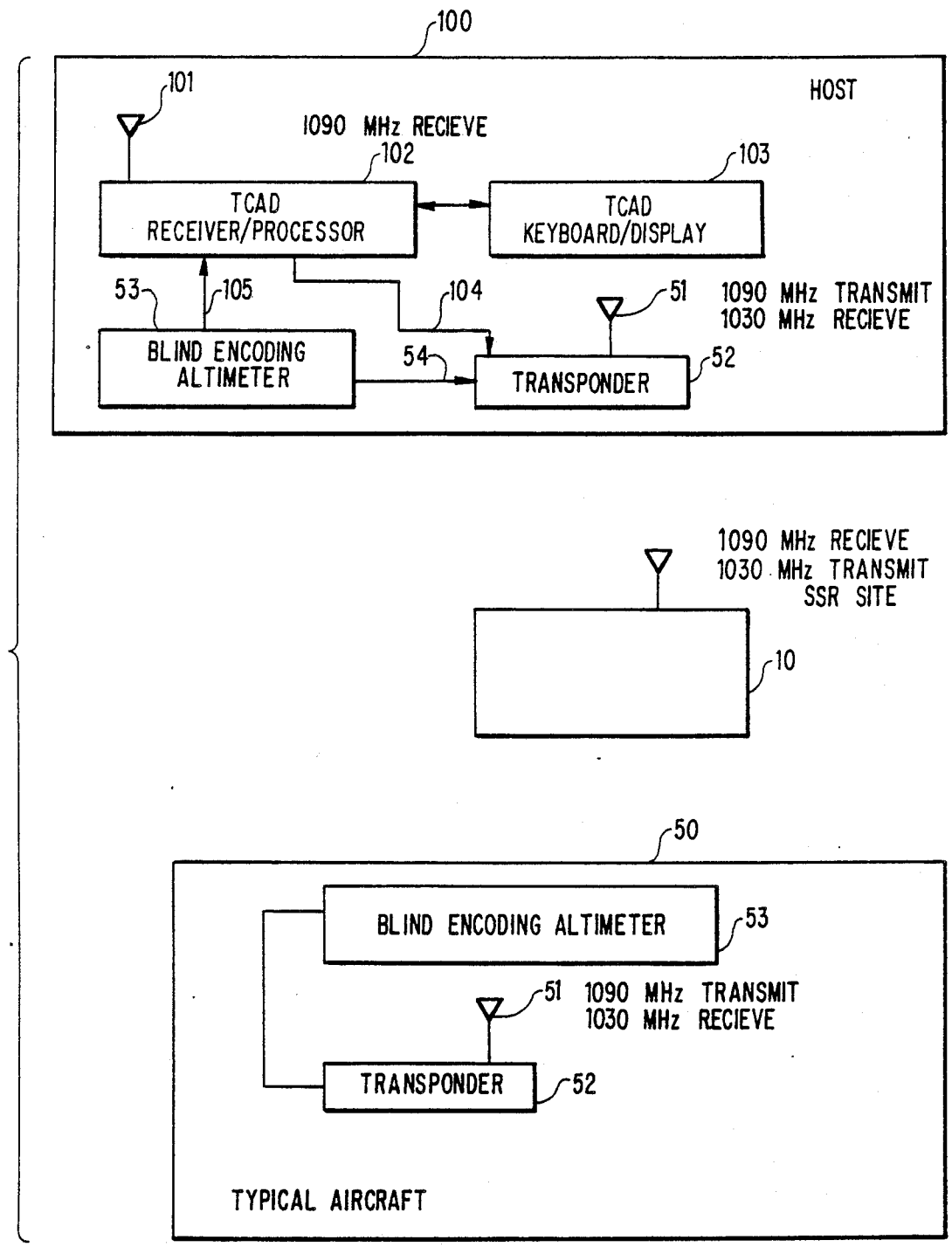
FIG. 4 is a schematic showing of a typical application of the invention in the cooperation of the various components including a SSR site 10, a host 100 equipped with the invention and the typical aircraft 50.

FIG. 4 shows the components which interact to perform the collision detection function. As has been described, the ATCRBS includes as one component at least a single SSR such as the SSR 10 which transmits transponder interrogations on 1030 MHz and receives replies at 1090 MHz. Typically, aircraft which are equipped to cooperate in the ATCRBS are equipped as shown for the craft 50. The craft 50 as seen in FIG. 4 includes a transponder 52, a transponder antenna 51 and a blind altimeter 53. Complementary to the SSR, the transponder 52 is capable of receiving transponder interrogations at 1030 MHz and, when interrogated, transmitting replies at 1090 MHz. In order to respond to a mode C interrogation (calling for altitude information), the blind encoding altimeter 53 provides pressure altitude data to the transponder 52. The blind encoding altimeter 53 measures barometric pressure and provides a digital signal to the transponder 52 representing the pressure altitude of the craft 50. This information is encoded and transmitted in response to a mode C interrogation as a mode C reply.

FIG. 4 also shows the host 100 equipped in accordance with the present invention (TCAD). The host 100 includes, in addition to the equipment carried on the typical craft 50, a TCAD receiver processor 102, a TCAD keyboard/display 103 and an antenna 101. The TCAD receiver processor 102 is designed to receive 1090 MHz replies and to decode valid replies. One function of the TCAD keyboard/display 103 is to allow the user to program the THD and ALT parameters. Accordingly, the TCAD keyboard/display 103 provides an input to the TCAD receiver processor 102 corresponding to the programmed parameters. The TCAD receiver processor 102 also receives the same barometric pressure information which the blind altimeter 53 provides to the transponder 52; the path for this information is shown as the path 105 in FIG. 4. Another function of the TCAD receiver processor 102 is to suppress the transponder 52 at appropriate times via a signal coupled from the receiver processor 102 to the transponder 52 over the path 104.

The TCAD receiver processor 102, based on the parameters received from the keyboard display 103, the host altitude (received from the blind altimeter 53) and the replies from traffic maintains a running record of selected traffic craft. As has been explained the TCAD receiver processor 102 accepts input from the keyboard 103K to select among one of three pre-programmed shield volumes (TRML for a terminal flight regime, STD for standard or transition flight regimes and ENRT for enroute flight regimes). Each shield volume defines a vertical cylinder which has a thickness and radius. Replies from any aircraft found within the selected shield volume result in actuation of an audible warning to the host aircraft. Furthermore, aircraft outside the shield volume, but reasonably close to the shield boundaries are tracked and parameters of such craft will be displayed. TCAD will show vertical direction, vertical separation, vertical trend (toward or away from host) and calibrated range from host for that craft with the highest threat potential. Viewing the changes (if any) in the range parameter provides the pilot with range trend as well. TCAD will also indicate the existence of one or two other craft also being tracked. Corresponding parameters of such other craft may also be displayed on request. In addition, the identity (Mode A reply) and MSL altitude of any of the primary threat aircraft can also be displayed on request. Traffic craft are prioritized in terms of threat probability. An audible warning is provided to the user in the event a traffic craft penetrates the shield. In the event of such a shield penetration, the user is provided information as to the traffic altitude, range, trend and identity, allowing the user to decide whether or not maintaining host altitude is preferred, or in the alternative, whether a change to host altitude is indicated. The TCAD receiver processor 102 will also accept information to determine the parameters (vertical separation and range) for any or all of the shield volumes (TRML, STD, ENRT).

As a supplementary function, since the TCAD receiver processor monitors host altitude via the blind altimeter 53, the TCAD receiver processor can also be programmed, if desired, to alert the user to altitude variations from a preset altitude. This enables the TCAD receiver processor 102 to call the user's attention to unintentional changes in the host altitude. To this end, the user can, by manipulating the keyboard/display 103, cause the receiver processor 102 to memorize then current host altitude. When this alerting function is enabled, the receiver processor 102 will enable a distinctive audio altitude alert (distinct from the potential collision alert) if the host altitude strays from the preset altitude by more than a predetermined amount. This will call the user's attention to the altitude variation and allow the user to return to the desired altitude. The distinctive audio altitude alert is disabled if host altitude changes from the preset altitude by more than a second predetermined amount.

As a further supplementary function, the receiver processor can be provided with Outside Air Temperature (OAT). OAT is manually entered via the keyboard. Since the receiver processor has access to pressure altitude (from the encoding altimeter) the receiver processor can determine density altitude from a look-up table. Thus, on request the receiver processor can display density altitude. The receiver processor 102 will also accept ambient pressure variations so TCAD can display true host altitude. This provides a convenient check on the host analog altimeter.

Microwave Receiver

Preferably, the antenna used for the receiver REC (see FIG. 6) is a quarter wavelength vertical dipole mounted on the upper surface of the aircraft. Preferably the antenna is encased and shaped in a streamline fashion. Only a top mounted antenna is preferred in order to avoid multipath errors. Use of a bottom mounted antenna could introduce unacceptable errors caused by reflected signals. The antenna reception pattern is essentially omni-directional. There is some blocking of signals from aircraft below although experiment has shown that for traffic more than 10° below the horizon and within an altitude of 1000 feet below the host, there is some but not complete blocking.

Figure 5:
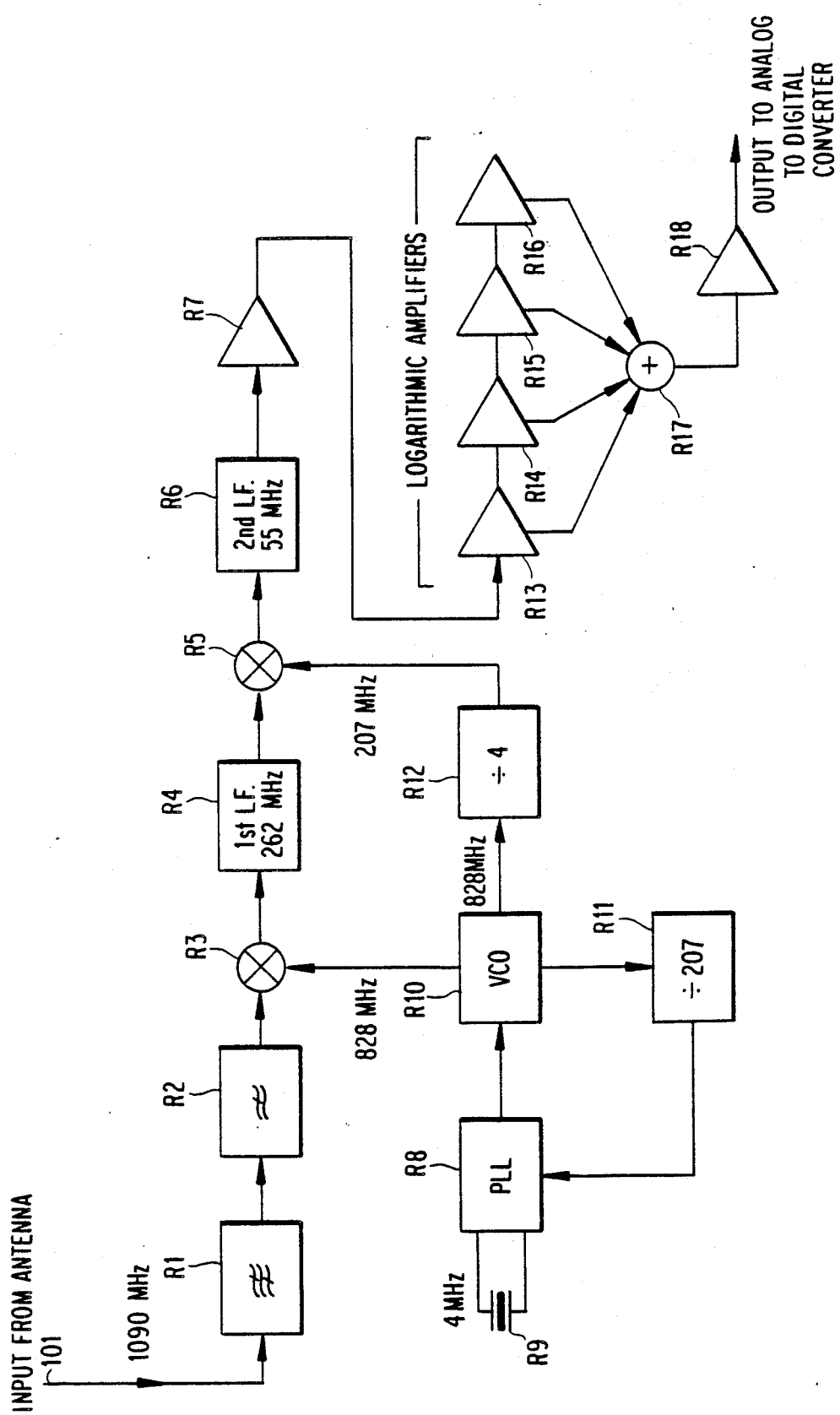
FIG. 5 is a block diagram of the receiver portion of the present invention.

A 1090 MHz dual conversion superheterodyne receiver is used. The block diagram of FIG. 5 illustrates the general format of the receiver. The signal from the antenna 101 is fed to the receiver by coaxial cable. The signal is then filtered by a stripline bandpass filter R1, with a center frequency of 1090 MHz. This is followed by a low-pass stripline filter R2. The two local oscillator signals are generated by a V.C.O. R10 with a crystal reference R9. The center frequency of the first I.F. R4 is 262 MHz, and the center frequency of the second I.F. R6 is 55 MHz. The dual conversion technique results in excellent receiver selectivity and performance. Following the second I.F. R6, four logarithmic amplifiers R13–R16 followed by a video amplifier R18 are used for achieving the necessary dynamic range. The output from the receiver is then fed to the analog to digital converter (ADC) for digitizing and processing.

The output from the receiver ($E_o$) will be proportional to the Logarithm of the strength of the electric field at the antenna. Since the electric field at the antenna is inversely proportional to distance (D) to the traffic, the output ($E_o$) from the receiver will be the negative Logarithm of distance, offset by a constant. The receiver output ($E_o$) as a function of distance (D) can be determined by putting in place the following constraints:

$$E_o(max) = 2.5 \text{ VDC} \qquad (1)$$

$$E_o(min) = 0.25 \text{ VDC} \qquad (2)$$

$$D(max) = 3.0 \text{ cNM} \quad (3)$$

$$D(min) = 0.3 \text{ cNM} \quad (4)$$

Receiver output as a function of distance to a target aircraft becomes:

$$E_o = (9/4)[\text{Log } 3 + 1/9 - \text{Log } D] \quad (5)$$

or $$E_o = 1.324 - 2.25 \text{ Log } D. \quad (6)$$

Figure 5A:
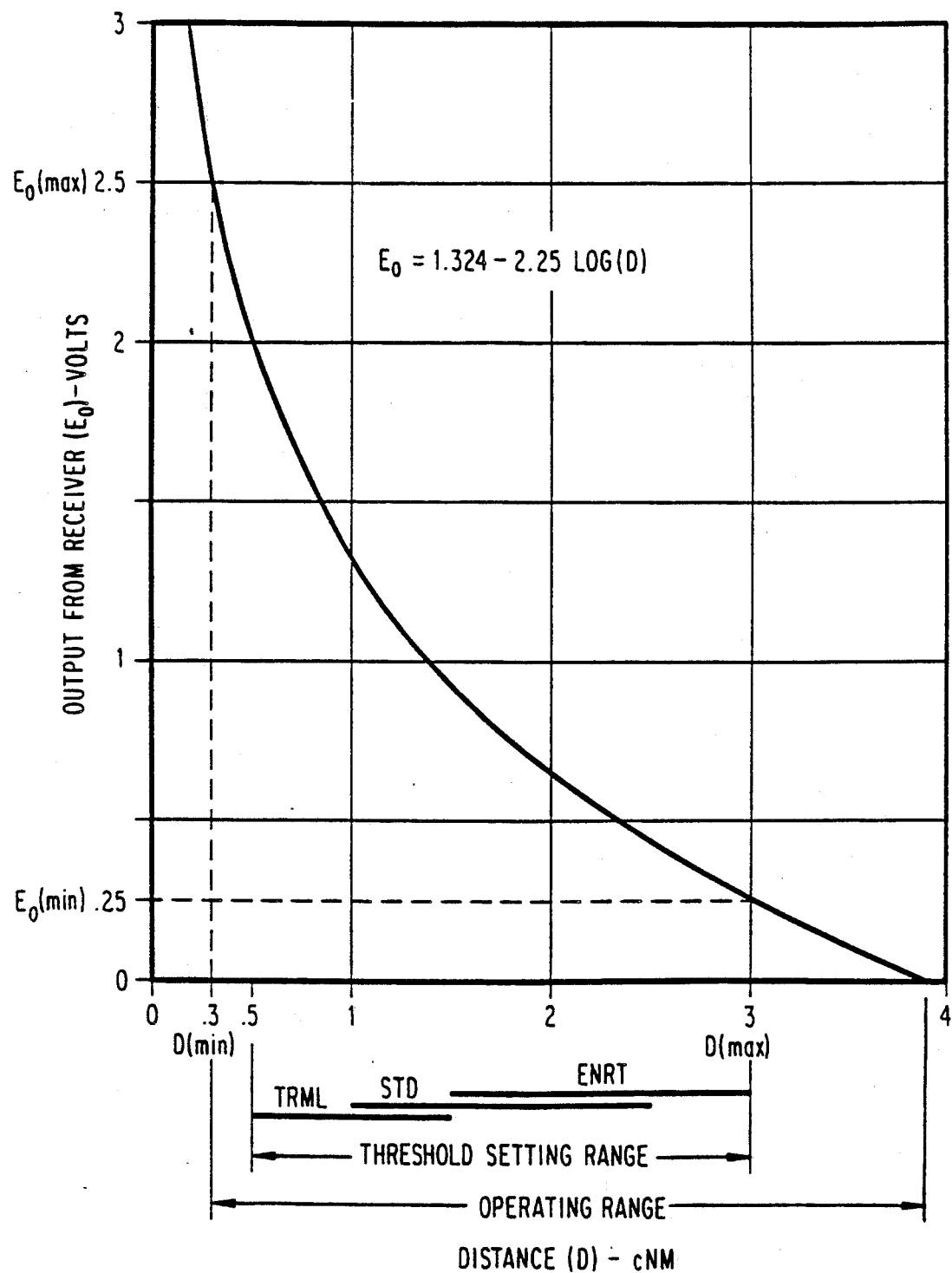
FIG. 5a shows pulse amplitude vs. distance which is used to establish the cNM parameter associated with any VALID REPLY.

FIG. 5a is a plot of this equation. Superimposed on FIG. 5a is an illustration of the threshold setting range, and the operating range. The receiver output corresponding to the most distant threshold setting is $E_o(min) = 0.25$ VDC. It should be understood that the receiver output as a function of distance can be changed to extend the dynamic range of the receiver beyond the illustration of FIG. 5a by imposing different constraints and calibrating the computer accordingly. In the current embodiment, different constraints are imposed to provide range limits of 0.3 cNM to 5 cNM.

Suppression

Most present day transponders allow for or accept suppression signals in accordance with published standards. When a proper suppression pulse is supplied to the transponder 52, the transponder 52 receiver is disabled, and the transponder 52 will not generate replies (except for so-called squitters). This feature is provided for the purpose of preventing interference by other equipment (such as DME). Typically, the suppression input of the transponder 52 is AC coupled, with a time-constant of about 5 ms. With this time-constant, the effective suppression period is typically limited to about 2 ms. There are some transponders that are DC coupled, and there are a few units that do not have provisions for suppression. TCAD requires that the on-board transponder has means for suppression.

Even when suppressed, some transponders still generate an occasional "squitter" output. A "squitter" is defined as a transmitted reply occurring without a valid interrogation. Better designed transponders, however, are void of this characteristic.

Transmit/Receiver Conflict Resolution

As traffic approaches close to the host, or when the traffic and host are in-line with the SSR, the received signal from the traffic overlaps the transmitted transponder reply from the host. Due to unavoidable coupling between transponder reply transmissions and TCAD, the larger amplitude signal from the on-board transponder will completely overshadow the weaker signal from the traffic, making detection of the reply from the traffic impossible. Thus, as threat of collision becomes acute, reception of transponder replies from the traffic are obstructed.

TCAD uses a unique method for the reception of signals that would otherwise be blocked by host transponder replies. Since on-board transponder replies can be suppressed by TCAD, an innovative suppression sequence is generated by TCAD which results in the following:

1. The host will receive transponder replies from traffic, regardless of overlap in reception and transmission that would have occurred absent the suppression.

2. If the traffic is TCAD equipped, this aircraft will also receive transponder replies from the host, regardless of overlap in reception and transmission that would have occurred absent suppression at the traffic.

3. Information flow to the ground radar and other collision avoidance equipment is maintained at adequate levels.

These three features are important.

Figure 19:
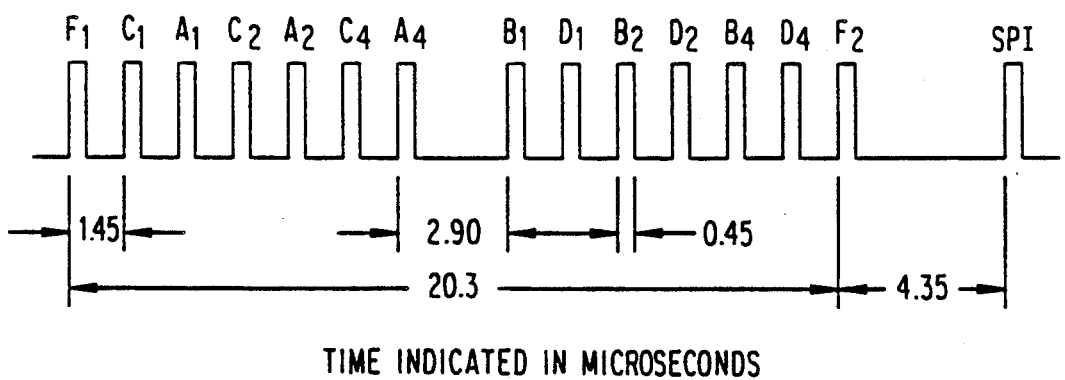

Transponder replies consist of groups of coded pulses, with each group not exceeding 25.1 μs time span (see FIG. 19). The Pulse Repetition Period (PRP) for the pulse groups is from 2 ms to 5 ms. Spacing will be less when there are interrogations from multiple SSRs.

When a transponder 52 is interrogated, there is typically 18 or more replies in sequence for one antenna sweep. For enroute SSRs, this number is larger. Except for military SSRs, replies are alternated between Code A and Code C, with two Code A replies followed by a single Code C reply, with the pattern repeated. With interrogation by multiple SSRs, the reply sequence can be much longer.

In order to resolve the transmit/receiver conflict, use is made of a random sequence method of transponder suppression and data reception. By suppressing the on-board transponder for a brief time interval, and at the same time listening (receiving data) for replies from traffic, there is a finite probability for receiving a valid reply signal from a traffic if present. If the suppression/reception time interval occurs when a traffic reply is present, the data will be received since replies from the on-board transponder are suppressed and therefore do not interfere. If the suppression/reception time interval is chosen at a time when no traffic data is present, then, of course, no data is received. By properly choosing the suppression/reception time interval and sequence, there is sufficient probability of receiving traffic data when present.

In determining the format for the suppression/reception sequence, the following facts and characteristics are considered:

1. Since TCAD must interface with the on-board transponder, the suppression time should not exceed about 2 ms.
2. The suppression time must be much greater than the reply length of a single data burst (25.1 μs).
3. The average suppression time must be limited in order that information required by the ground radar and other systems is maintained at adequate levels.
4. The average suppression time must be sufficient for the reception of adequate traffic data.
5. In some cases, data retrieval and internal data transfers can take longer than data acquisition. This must be accounted for in the timing.

With these requirements in mind, the following is the format for suppression:

1. The length of the suppression/reception time interval is on the order of 1 ms. This time allowance is about 40 times the length of a reply, and will allow sufficient opportunity for reception.
2. Desirably, especially where data is sparse, the average suppression/reception time is 20% of the total time. The probability for reception is then 20%, which allows for an adequate flow of traffic data. Further, this will result in suppression of 20% of the on-board transponder replies which will not adversely affect the necessary flow of data to the ground radar. The average time between suppression/reception pulses (time interval) is then about 4 ms ([1 ms period×1/0.2]−1 ms). As will be described, during the suppression/listen duration the output of the receiver REC is continuously digitized and written to RAM. At the exemplary sampling rate of 100 ns., there will be about 10,000 bytes generated during a 1 ms. suppression/listen duration. While this data is acquired in real time, it can take longer to transfer the digitized data into a buffer for signal processing than it took to acquire the data. In general, for a W s. suppression/listen duration, the corresponding data transfer time is 5W s., in the embodiment which has been constructed. The average 4 ms. inactive interval is theoretically made up of a random selection of the length of the interval in the range of 1 to 7 ms. However, since data transfer can take 5 ms. (where W=1 ms.) there is a conflict in the event the random selection is less than 5 ms. Therefore, in one embodiment, the timing sequence is modified only for those intervals after data is acquired. In this circumstance there is first a delay for data transfer and thereafter a random delay selected in the range of 0 to 3.5 (W) s., for an average of 1.75 (W) s. Thus where there is a rich data environment (and data is acquired very often) the extent of suppression can drop to about 12.9%. This technique preserves the approximate 20% suppression in sparse data environments (where data is acquired infrequently) and in rich data environments, where high suppression is not critical suppression is relaxed to about 13%. It should be understood this modification is only to overcome hardware limitations on data transfer rate and the modification can be eliminated in the event more capable hardware is used.

Figure 8:
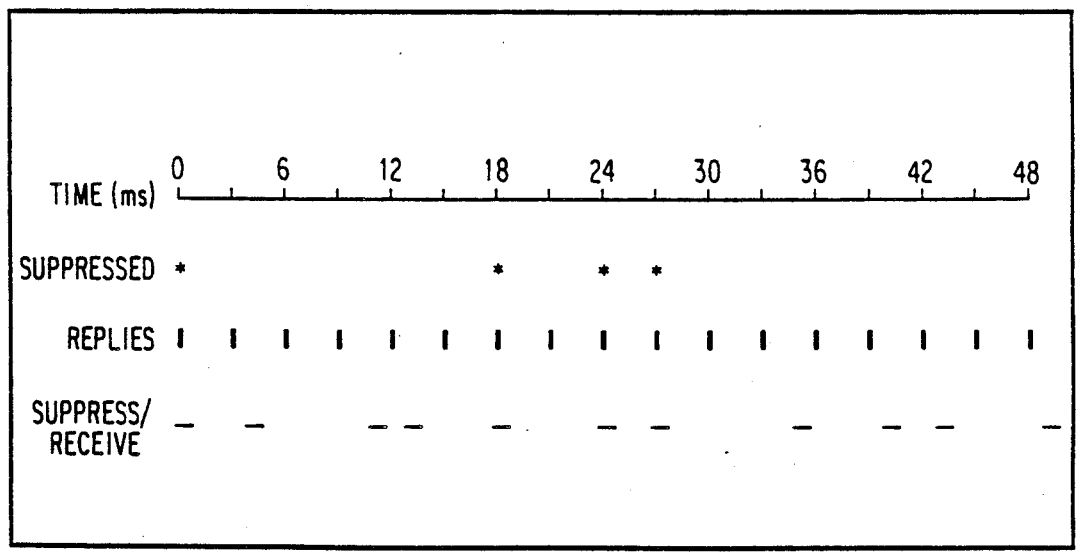
FIGS. 8, 9a and 9d are useful in explaining how the host transponder is suppressed in accordance with the present invention.

Describing this method for resolving the conflict due to overlap of transmit and receive data, assume that each beam sweep generates a series of 20 transponder replies. FIG. 8 illustrates the sequence of events for resolving the transmit/receiver conflict. The series of transponder replies will be spaced between 2 ms and 5 ms apart, and in this illustration are shown spaced 3 ms apart. The suppression/reception time intervals in this example are chosen to be 1 ms. The time spacing between each of the suppression/reception time intervals is random, about an average value of 4 ms, and between limits of 1 ms and 7 ms. Of the 20 replies during the beam sweep (illustration shows 17 of the replies), probability gives preference for the reception of four replies from the transponder of another craft, if present. If the traffic is also using TCAD, probability would favor overlap of one of the four valid data periods, when both transponders would be suppressed at the same time. Thus, each aircraft would expect to receive three valid replies from the other aircraft during the single beam sweep. This rate of data flow is adequate; interrogations by multiple SSRs would further enhance the flow of data.

As mentioned above, some transponders emit "squitter" replies, which are replies without a valid interrogation. Should the on-board transponder 52 generate such a reply even though suppressed, unavoidable coupling between the transponder output and the TCAD input would cause TCAD reception of a false reply. In order to avoid this, TCAD is able to recognize the reception of a reply from the on-board transponder, and disregard. Reception by TCAD of a reply from the on-board transponder will produce receiver overload, which is readily detected and recognized by the A/D converter which digitizes the receiver output. In addition, a squitter is always an unpaired reply, and will appear suddenly and very close in apparent range instead of moving as real threats do. When recognized, it is rejected as a false reply.

The sequence of suppression/reception intervals randomly spaced, with a predetermined average value for spacing, is continuous. This pattern is completely asynchronous with interrogations and replies. There is no requirement for complex synchronization with ground radar interrogation or with replies from transponders. The method is beautifully simple, yet with strong merit. TCAD is passive, and totally independent of other equipment aboard the aircraft. It only requires using the standard suppression provisions of the on-board transponder. There will be no interference by replies from the on-board transponder, since TCAD is never receiving when the on-board transponder is replying (except for "squitters" as discussed above). It will interface with another TCAD aboard a second aircraft in accordance with dependable probabilities. It inherently accommodates an environment having multiple radars, utilizing increased data as available.

Implementing Random Suppression

Figure 9A:
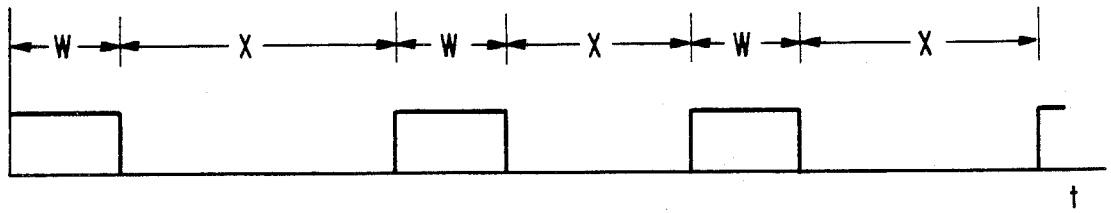

FIG. 9a illustrates a time sequence of the suppression output to the host transponder. When the waveform of FIG. 9a is positive the host transponder is suppressed. As seen in FIG. 9a there is a sequence of suppression durations W, each of which is followed by an interval during which suppression is absent. As will be described, the output of the TCAD Receiver REC is effective only during the suppression durations W and at other times the output is ignored. Preferably the length of the duration W is much longer than a reply (25.1 μs). If we assign a duration of W to the suppression pulse, the interval X in FIG. 9a (the interval between sequential suppression pulses) is chosen at random within a range of 1 to 7 times the duration W. Any given cycle, consisting of one suppression pulse (W seconds long) followed by the interval X (random in the range of W to 7W seconds), will be random in the range of 2W to 8W seconds, the average duration of the cycle will be 5W seconds. Of this average cycle of 5W seconds, there will be suppression for the W seconds duration or 20% of the cycle. The remaining 80% of the cycle (4W seconds) suppression is absent. Suitable values for the suppression duration (W) is less than 1000 μs, or about 750 μs. In an embodiment of the invention that has been constructed W was chosen at 725 μs so that the interval between suppression was random in the range of 725 μs (W) to 5075 μs (7W). With these parameters the ratio of the suppression duration to a reply is larger than 28 (725/25.1).

Figure 9D:
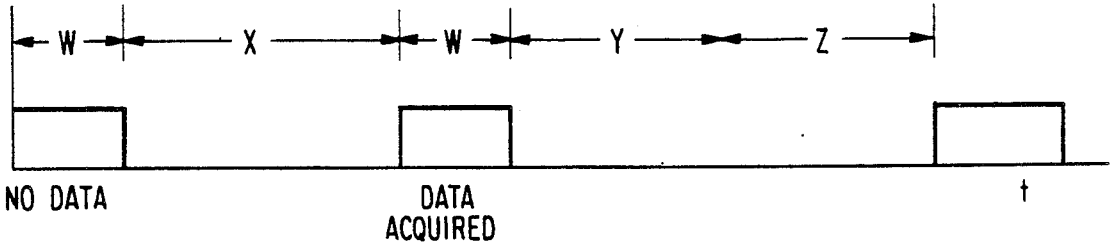

FIG. 9d shows the modified timing embodiment of suppression/listen durations and the intervening intervals, both in the case of no data acquisition and where there is data acquisition. In the case no data is acquired the time sequence is identical to FIG. 9a, where W=725 μs. As seen in FIG. 9d, after data acquisition (DATA ACQUIRED) the intervening interval between that suppression/listen duration during which data was acquired and the next is a composite of two components. The first component is the fixed data transfer interval Y. In the embodiment actually constructed this consumed about 3.625 ms. (since the suppression/listen duration was 725 μs., the transfer of the corresponding quantity of data is about 3.625 ms.). Following the data transfer interval Y there is a component Z of random duration. Z is randomly selected in the interval of 0 to 3.5 (W) s. (where W=725 μs. then Z is in the range of 0 to 2.538 ms.) and so it has an average duration of 1.269 ms.

In summary, where W=1 ms., then
$X_{Max}=7$ ms.
$Y+Z_{Max}=8.5$ ms.
the suppression is either 20% or 12.9%, and, when W=725 μs. then
$X_{Max}=5.075$ ms.
$Y+Z_{Max}=6.1625$ ms.
the suppression is either 20% or 12.9%

Since the cycle (of W seconds of suppression followed by an interval of no suppression) is not synchronized with any other time base implementation is simple. Based on the selected parameters the processor asserts suppression for the chosen duration (W), selects a random number in the appropriate range, converts the random number to the corresponding time duration, times out the corresponding selected duration from the end of the suppression pulse, at the end of the time duration again asserts suppression and repeats this process. In an embodiment actually constructed the random number selection was of resolution 1 in 16. In other words the interval between the end of one suppression pulse and the next suppression pulse was selected from the following table:

| Random Number | X<br>No Data Acquired<br>Interval (in μs) | Z<br>Data Acquired<br>Interval (in μs) |
|---|---|---|
| 1 | 725 | 0 |
| 2 | 1015 | 169 |
| 3 | 1305 | 338 |
| 4 | 1595 | 508 |
| 5 | 1885 | 677 |
| 6 | 2175 | 846 |
| 7 | 2465 | 1015 |
| 8 | 2755 | 1184 |
| 9 | 3045 | 1353 |
| 10 | 3335 | 1523 |
| 11 | 3625 | 1692 |
| 12 | 3915 | 1861 |
| 13 | 4205 | 2030 |
| 14 | 4495 | 2199 |
| 15 | 4785 | 2368 |
| 16 | 5075 | 2538 |

The table has, in the column at the left, the selected random number (in the range 1–16), in the middle column, the corresponding X duration and in the right hand column, the corresponding Z duration. From the preceding description it should be apparent that the middle column defines the duration between the end of one suppression/listen duration and the beginning of the next where there was no data acquired during the suppression period just ended. On the other hand the right hand column defines the duration of the Z component of the same interval following suppression/listen durations where data has been acquired. The total interval from the end of a suppression/listen duration to the next, in the case of data acquisition is just the value in the right hand column plus the data transfer interval, in the embodiment which has been constructed, 3.625 ms.

Two points should be made. In the first place if the data transfer interval can be reduced to the length of W, or less, then the use of timing such as in FIG. 9d and the right hand column of the table is unnecessary. The use of components with higher data transfer rate is one way to reduce the data transfer interval. The use of a supplementary processor for data acquisition and digital filtering is another alternative. Secondly, the sum of the data transfer interval and the random duration Z is selected to be as small as possible.

It will be apparent that while the parameters which have been selected are appropriate there is wide latitude in selecting the resolution of random number selection, the ratio between the length of a reply and the suppression duration (so long as the chosen suppression duration is much longer than a reply). While we prefer to use 20% suppression in sparse data environments it should also be apparent there is room for some variation in this parameter as well.

Unsuppressed Host Replies

There are occasions when the host transponder will initiate a transmitted reply even though the suppression line is active (suppressed). This characteristic seems to be limited to lower cost transponders, and even when it does occur, such transmissions are infrequent.

Since there is always unavoidable coupling between the transmitted signal from the host transponder and the host TCAD, a large amplitude video signal from the microwave receiver results. The amplitude of this video signal is always much larger than the video signal from traffic aircraft, even when at very close range. This condition allows detection and rejection of unsuppressed host replies.

In order to sense the existence of an unsuppressed host reply, two factors are used:
1. The amplitude of the video output from the microwave receiver resulting from host transponder replies is much greater than that generated by traffic aircraft.
2. The video amplitude resulting from host transponder transmissions will suddenly appear with great amplitude, whereas the video from a traffic aircraft follows a progressive pattern.

In order to reject unsuppressed replies, TCAD first senses for the large video amplitude associated with transmissions from the host transponder, and further uses a tracking algorithm so that the progression of traffic approaching at close range is distinguished from the sudden appearance of the large amplitude video from the host transponder. This procedure also has the advantage of discarding replies from other aircraft when both the other aircraft and the host are on the ground.

Digital Signal Processing of Raw Receiver Data

The video signal from the microwave receiver is the analog representation of transponder replies. This video signal is fed to the digital circuit board (FIG. 6), where it is digitized. The analog to digital converter (ADC) 10 digitizes at a 100 ns rate, and is continuously on line, digitizing the analog flow of video information from the microwave receiver. The A/D converter 110 is coupled to the system controller 111 and to a comparator 114. The output of the comparator 114 is asserted when the received amplitude exceeds a first threshold, in an embodiment actually constructed this first threshold was 200 mv. The first threshold is used to detect the presence of data which might be useful or valid. The output of the comparator is coupled to pulse width discriminator 112. If the pulse width discriminator 112 detects plural pulses (say more than one), each with 3 to 11 samples (at the exemplary rate of 100 ns per sample) an interrupt (the receiver interrupt) is sent to the CPU 120. Since receiver interrupts are only enabled during suppression the interrupt is responded to only during the listen duration, i.e., when the host transponder is suppressed.

Although receiver REC and A/D converter 110 are continuously on line and operating the CPU 120, as will be described, only allows the data to be written to RAM during a suppression/listen duration. Furthermore the data which is written during such a suppression/listen duration is only further treated if a receiver interrupt occurs during the suppression/listen duration. If no interrupt occurs the data, although written into RAM, is ignored. Through this procedure the CPU is informed of the presence of potentially useful data (based on received amplitude and pulse width). Thus the software, through control of the CPU 120, enables and disables reception. After digitization, the information is screened by certain signal processing techniques. These techniques are as follows:
1. Digital Correlation
2. Pulse Width Discrimination
3. Pulse Position Recognition
4. Midpoint Analysis, which includes Threshold Detection

Digital Correlation

Each digitized data point is averaged with the succeeding four data points to produce a correlated average. This technique suppresses perturbations that might occur with a single data point. The result of correlation is that the effects of noise and other irregularities in data transmission are greatly minimized.

Pulse Width Discrimination

Data are further refined through pulse width recognition. Ideally, data pulses have a time width of 450 ns. Pulse width screening requires that pulses contain 3, 4 or 5 digital samples, at the sampling rate of 100 ns. Samples per pulse are counted during the period when the correlated amplitude has exceeded 50% of the peak pulse amplitude. Data pulses containing less than three samples or more than five samples are rejected.

Pulse Position Recognition

Data screened by digital correlation, and pulse width discrimination are then further sifted through the use of pulse position recognition. Referring to FIG. 19, and Table 2-2, there are select time locations for each data pulse. Since framing pulses are always present in a valid transponder reply, this is a requirement. Further, there must be an absence of a data pulse between the $A_4$ and $B_1$ data pulse positions (referred to as the "X" pulse position), otherwise the reply is discarded. In order to consider each data pulse acceptable, the time position of occurrence must conform with allowable pulse time positions. A tolerance of ±300 ns is used for pulse position recognition.

Midpoint Analysis

When digital data is transmitted and recovered, there will be irregularities in pulse amplitudes due to noise and transmission aberrations. In order to allow for these pulse amplitude variations, a specified deviation from the average pulse amplitude is allowed. If the permitted deviation from the average peak amplitude is for example ±25 mV, then data pulses within a reply will be accepted or rejected on the basis that their pulse amplitudes are within ±25 mV of an average. But if the ±25 mV amplitude variation allowance is not centered about the most probable peak amplitude, serious errors can result. These errors result from missing data pulses, or by garble from overlapping replies.

Figure 20:
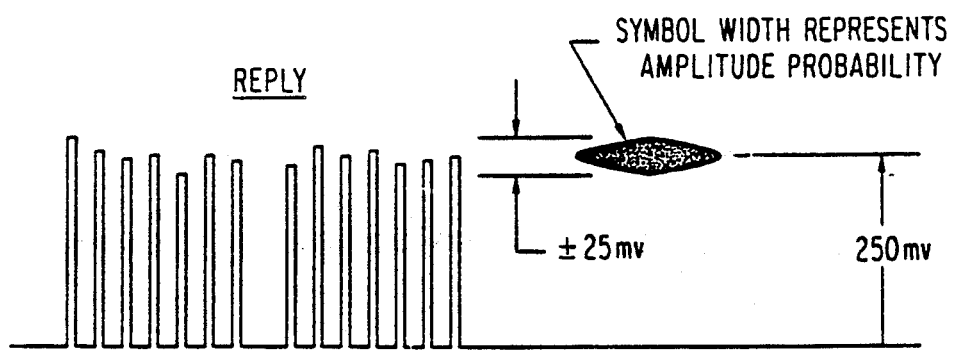
FIG. 20 is useful in explaining the Midpoint Analysis digital signal processing function.

FIG. 20 illustrates a reply having typical variations in pulse amplitudes. Noise and other factors cause a spreading of the pulse amplitudes. The average amplitude is the most probable amplitude. The probability that a valid pulse exists beyond the extremities of the allowable amplitude variation is essentially zero. These factors are illustrated by the symbol to the right in FIG. 20. The width of this symbol at a certain amplitude is a representation of the likelihood that the pulse amplitude will have that value. The greatest probability will be at the average amplitude of the data pulses (in this illustration 250 mv), while at the extremities of the deviation, the likelihood becomes zero. The allowed amplitude variation is adjusted equal to the observed or expected variation in amplitude (in this illustration ±25 mV). But, the window for the allowed variation in amplitude must be centered on the midpoint of the most probable amplitude. When looking at a single data pulse, or even a few data pulses in a reply, it may not be possible to determine the midpoint, and therefore not possible to center the window for allowable amplitude variations. If the window is broadened excessively or if the window is not centered at the midpoint, serious errors can result.

TCAD first looks (see FIG. 9b) for two framing pulses (F1 and F2) using the signal processing techniques presented above. When the framing pulses are located, it is first determined that they meet the allowable variation in amplitude limits (M1). The MIDPOINT is checked to see that it exceeds the minimum threshold (in this example, approximately 3 cNM), at M14. If so, their amplitudes are used to further qualify associated data pulses. Using the two framing pulses as the max and min (M2), a search is made for a data pulse having the closest amplitude to the midpoint between the max and min (M3). If either test fails, the reply is rejected (M12). The data pulse found in the search (M3) must fit into the allowable amplitude window, or it is discarded (M4, M5). With the new data pulse included, a new max and min is determined if necessary (M6–M9, FIG. 9c). The midpoint of the new max and min is used to search for the next nearest data pulse, again requiring fit into the allowable window for amplitude variation (M3). This process is continued until the max and min are within allowable limits, but no other data pulse can be accepted within the allowable limits (M4, M5). In this manner, the allowable spread in pulse amplitude is automatically centered about the midpoint of the most probable amplitude.

Threshold Detection

Before a reply is considered valid, the midpoint amplitude, as previously determined, of a reply must exceed a threshold level. The test is implemented in two parts. First, the initial value (determined by $F_1$ and $F_2$) is tested (M14). Secondly, if any new pulse has excessive amplitude (M14), the reply is rejected. This threshold is representative of cNM, and is set at 250 mV in one example, which corresponds to 3 cNM. By requiring the amplitude to exceed a threshold value, the effects of noise and weaker replies are reduced. Generally, after the threshold is selected the deviation is selected as about 10% of the threshold.

Through these signal processing techniques, data pulses and the series of data pulses representing a complete reply, are required to conform to expected standards. By performing this screening, garbled data caused by overlapping data pulses and other distortions are eliminated. These signal processing techniques offer assurance that data is accurate and valid for use. After digitizing and screening, the resulting sequence of data pulses is converted to a binary number representing a transponder reply. From the amplitude of the digitized data, cNM is determined and a time tag (arrival time) is generated. The combination of the binary number representing the reply code, the cNM and the time tag, is referred to as a VALID REPLY. The Valid Reply information will be used by the microprocessor 120 (see FIG. 6) based computer for system operation.

Figure 6:
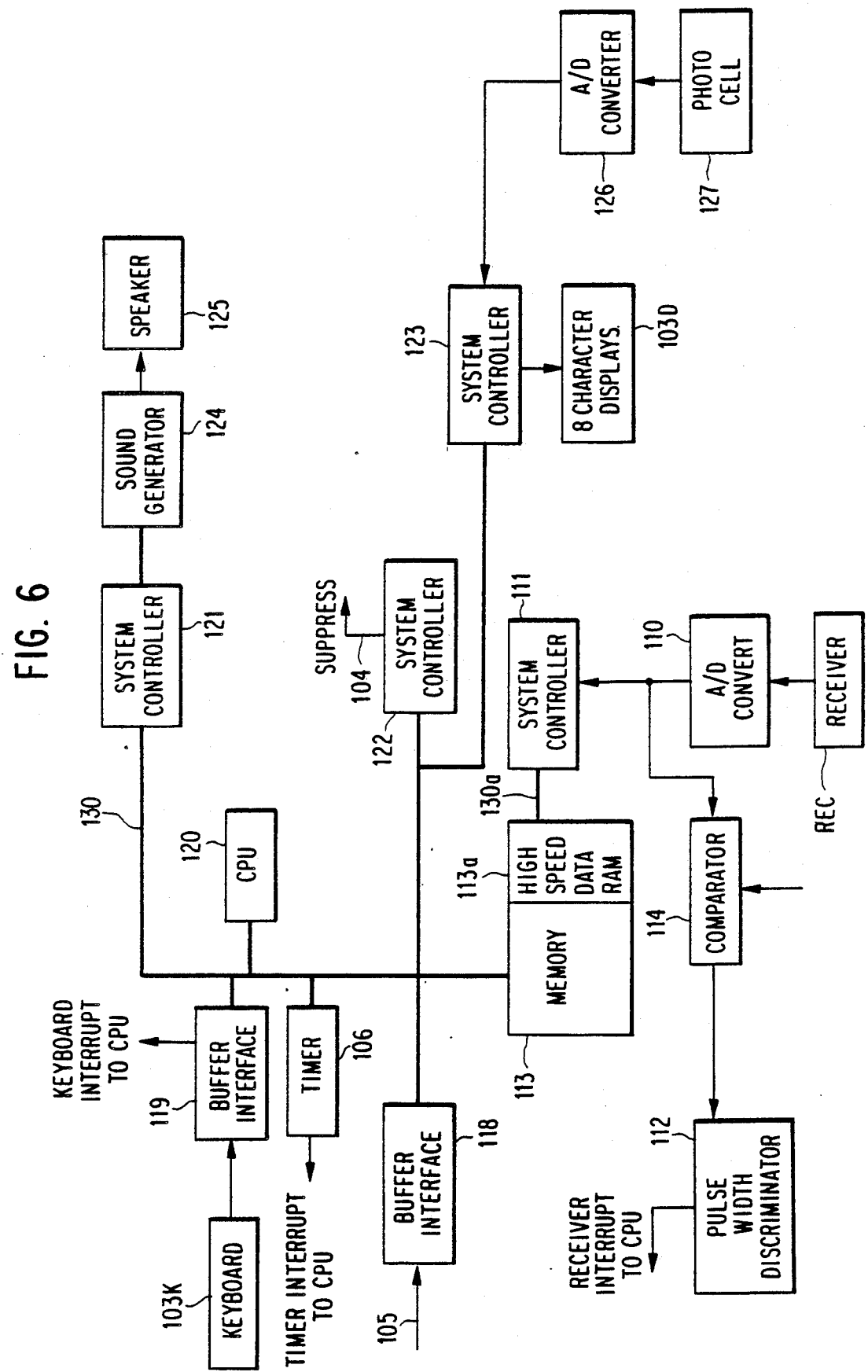
FIG. 6 is a block diagram of the electronics of the present invention incorporating the receiver of FIG. 5 as one component.

FIG. 6 is a block diagram of the processor portion of the receiver processor 102. The microwave receiver REC shown in FIG. 6 is the receiver whose block diagram is shown in FIG. 5. The output of the microwave receiver REC is input to the A to D converter 110. The output of the A/D converter 110 is coupled both to the system controller 111 and to the comparator 114. The pulse width discriminator 112, driven from the comparator 114, generates the receiver interrupt, as described. The system controller 111 accepts the data from the A/D converter 110 and, writes that data to the HIGH SPEED DATA RAM 113a. The CPU allows the system controller 111 to write the input data only during a suppression/listen duration. At the end of the suppression/listen duration the access, by the system controller 111 to the HIGH SPEED DATA RA 113a is terminated until the beginning of the next suppression/listen duration. The data that has been written is then moved to a buffer only if a receiver interrupt occurs during the suppression/listen duration. In the absence of a receiver interrupt the data which has been written is ignored, and overwritten during the next suppression/listen duration. The bus 130 also couples a buffer interface 118 which is driven by the information on path 105 from the blind encoding altimeter 53. The keyboard/display 103 includes a 7-button keyboard 103K. An output from the 7-button keyboard 103K is provided to a buffer interface and debounce element 119. The output of the buffer interface and debounce element 119 is coupled to the system bus 130. The system bus drives a system controller 123 which in turn drives a 16-character display 103D which is a portion of the keyboard/display 103. The bus 130 also couples the CPU 120 via a system controller 121 to a sound generator 124 whose output drives a speaker 125. The CPU is also coupled, via bus 130, to the timer 106. At various times the timer 106 is set and enabled to time either a suppression/listen duration W, the interval X or the Z portion of an interval. When the timer detects the end of the period being timed, it sets a flag (visible to the CPU 120) and also generates a timer interrupt. Finally, the CPU 120 also drives, via the bus 130, a system controller 122 whose output is provided over the path 104 for the purpose of suppressing the transponder 52. Photocell 127 senses ambient light levels. The output of the photocell 127 is coupled via the A/D converter 126 and system controller 123 to the CPU 120. This information is used to adjust the intensity of the display 103D. In an embodiment which has been constructed, CPU 120 is a Motorola 68000 chip.

Figure 7:
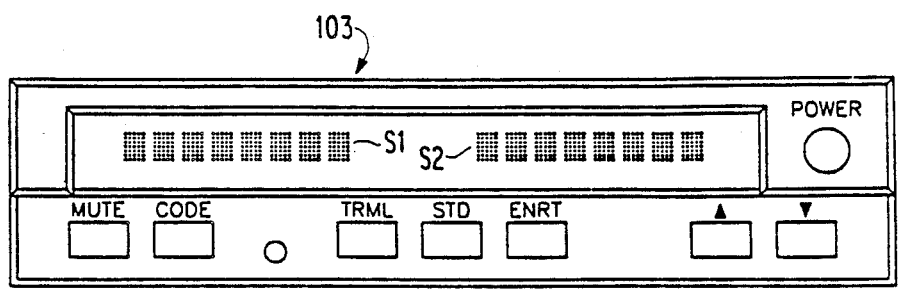
FIG. 7 shows the appearance of the keyboard/display component of the present invention.

FIG. 7 shows the appearance of the keyboard/display 103. The display 103D includes two eight-segment components S1 and S2, one for the purpose of displaying target altitude, vertical direction and trend and the other for displaying range in cNM and the existence of second and third level threats. Keyboard/display 103 has eight user controls, power, MUTE, CODE, TRML, STD, ENRT, one identified with an up arrow and one identified with a down arrow. The power control is a push-on/push-off pushbutton for turning on and off the power to the TCAD, both the receiver processor 102 and the keyboard/display 103. The other seven user controls are inputs to the processor. The function of each is described below.

Figure 21:
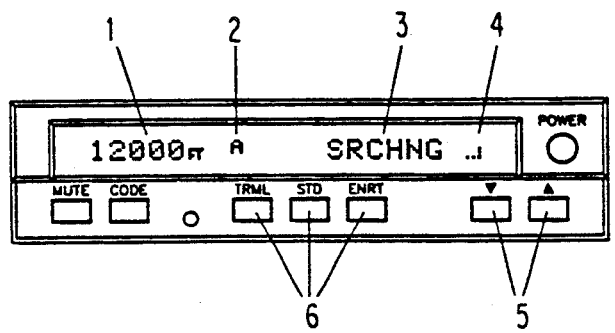
FIGS. 21 and 22 show typical display formats for the keyboard/display 103.
Figure 22:
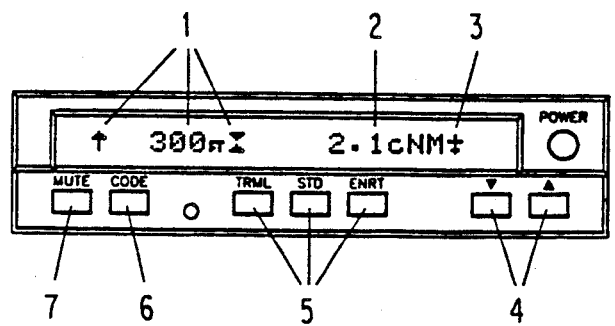

TCAD has two basically different display modes, one illustrated in FIG. 21 and a second illustrated in FIG. 22. In the mode shown in FIG. 21, TCAD is searching for other traffic; the display has four elements identified as 1–4 in FIG. 21. Element 1 (displaying 12,000 feet) reports host altitude. Element 2 (A) indicates that the altitude deviation alert is engaged; when the altitude deviation alert is disengaged, this element is absent. Element 3 (SRCHNG) reports to the user that TCAD is searching for other traffic. Element 4 is used to indicate the mode; the position of the vertical line corresponds to TRML, STD or ENRT.

FIG. 22 shows the display when other traffic has been detected and is being reported on. The example shown in FIG. 22 has three elements (so labelled in FIG. 22). The first element has three components; the up arrow indicates that the traffic being reported on is above the host in altitude. The second component (300 feet) indicates the difference in altitude between the host and other traffic. Finally, the third component of the first element (opposing arrows) indicates that the relative altitude trend is reducing, i.e. the aircraft are coming closer and closer together in altitude. The second element of the display (2.1 cNM) reports that the traffic being reported on has a calibrated distance of 2.1 nautical miles. The third element in the display (the airplane symbol) indicates that there is still other traffic available for display. A similar symbol in the next cell indicates the presence of a third aircraft for display. When traffic has been acquired and is being displayed, such as shown in FIG. 22, the user can manipulate the CODE button and the display will change and identify the 4-digit code of the traffic that had been displayed when the Code button was depressed.

When an audible threat warning tone is sounded, the operator can use the MUTE button to disable the tone for a fixed time interval; this muting interval is programmable. MUTE can also be pressed to suppress audible warnings for a given period after the button is pressed.

When the MUTE and CODE buttons are depressed simultaneously, the density altitude function is either engaged or disengaged. The density altitude function is described below. When engaged, the display shows a series of stars followed by the last Outside Air Temperature (OAT) value. The up or down arrows are used to increase or decrease the OAT value. As OAT changes, the series of stars is altered to show density altitude. Depression of Mute and Code again returns TCAD to the search mode.

TRML, STD and ENRT each have two functions. When any one of these buttons is touched twice within one second, the display will show the associated altitude separation ALT which had previously been programmed. The user can at that time use the up or down arrow pushbutton to increase or decrease this parameter. Pushing the button again will show programmed THD. Use of the up or down arrow button will change the programmed parameters. Depressing the selected button (TRML, STD, ENRT) once more will return to normal TCAD operation. Aside from programming the values, the user can touch any one of the three to activate the particular shield levels that have been programmed for either TRML, STD or ENRT.

The UP ARROW and DOWN ARROW, in addition to the functions already described, are also used for the Altitude Deviation Alert (described below). When depressed together, the status of the Altitude Deviation Alert is changed, i.e. it is either engaged or disengaged.

When MUTE is depressed twice in succession, then TCAD goes into a tone related programming mode. The following table identifies the corresponding display and any action that can be taken at that point.

Tone Related Programming

| Keyboard | Display | Action |
| --- | --- | --- |
| MUTE (twice) | VOLUME ######## | Use up or down arrows to adjust volume |
| MUTE (again) | MUTE 020 s (The time value, here 20 s, is the last selected mute duration. This parameter is programmable. | Use up or down arrows to adjust mute duration |
| MUTE (again) | NO ALT. TONE: SGL | Use up or down arrows to select Single (SGL), continuous (ON), or no tone (OFF) |
| TRML | TERMINAL TONE: SGL | Use up or down arrows to select Single (SGL), or continuous tone (ON) |
| STD | STANDARD TONE: SGL | Use up or down arrows to select Single (SGL), or continuous tone (ON) |
| ENRT | ENROUTE TONE: SGL | Use up or down arrows to select Single (SGL), or continuous tone (ON) |
| MUTE (again) | Returns to search configuration | |

Interpretation of the Results of Digital Signal Processing

At the conclusion of the digital signal processing, computer memory 113 stores the processed replies which are in the form of binary numbers. For each Valid Reply, there are three numbers: the code received (either Mode A or Mode C), the cNM and a time tag. cNM represents "calibrated distance" and is obtained by converting the received pulse amplitude to distance using the data in a table which is represented in FIG. 5a. It is then necessary to interpret those numbers into meaningful data. To perform this, the CPU 120 generates a record, preferably for each craft, although initially for each reply. Each record includes 15 items of meaningful data. These 15 items are tabulated below. In the embodiment actually constructed, the record occupies 48 bytes. Provisions are made for 101 records. This allows a capacity of tracking 50 or more aircraft. Practically speaking, tracking 25 craft appears to be sufficient given the fact that records which are not updated within about 10 seconds are discarded.

CODE The mode A reply of the traffic, if known
ALT The altitude of the traffic, if known
RANGE The range from the host to the traffic in cNM
PRIORITY The priority of the traffic as established by the priority table. The priority is used to prioritize the threats posed by the different traffic so that the primary, secondary or third level threat can be displayed at the user's option.
AGE The time elapsed since this traffic was recognized or its parameters updated; traffic which have been tracked for longer than a predetermined time without change in parameters are discarded.
CLOSE AGE This parameter is used to determine the age of the closure/parture in altitude arrows. This enables the pilot to determine that the threat may have leveled off in altitude.
CLOSURE Indicates the trend of relative altitude, i.e. increasing or decreasing.
SEP The separation in altitude between the host and the traffic.
MATCHED This is a flag that indicates whether both mode A and mode C replies have been received for this particular traffic.
IS-CODE This flag is used to determine whether an unmatched traffic (one in which the record does not include both mode A and mode C information) has mode A information, only.
RAW-CODE This item is used to quickly find the mode A reply that corresponds to the altitude of the traffic.
RAW-ALT This item is used to quickly find the mode C or altitude that corresponds to the mode A reply of the traffic.
TIMES This is merely a count of how many times replies from this traffic have been received.
NEXT This is a pointer to the next record on the list.
PREV This is a pointer to the previous record on the list.

The flow charts which will now be discussed (FIGS. 10-15) describe how the records for each traffic are created, edited and used. This includes sorting to determine whether or not a reply is or possibly could be a code (mode A), for each such reply, determining whether or not there is a record for this traffic and if there is, updating it, and then pairing a mode A reply with a preexisting mode C reply if possible, updating the mode C replies and pairing the unpaired mode C replies with mode A replies, if possible, prioritizing the threat posed by the different traffic as identified in the edited records and then displaying information on the keyboard/display 103. In this explanation, the following symbols are used to identify the following information:
"R" Valid Reply
"A" Mode A Reply
"A" Regarded as a Mode A Reply
"C" Mode C Reply
"C" Regarded as a Mode C Reply
→ Regarded same as
⟷ Signifies Matching Pairs of "A" and "C" replies
T Time within 0.2 seconds
cNM cNM within ±0.4 cNM
Q Code Match
Q Code Match ±100 feet
Q No Code Match

Sorting Routine

Valid Replies are sorted through the use of an algorithm that places principal emphasis on identifying Mode C replies from aircraft within the shield. Since collision avoidance is obtained by altitude separation between aircraft, determination of the altitude of traffic within the shield is the main focus of the sorting routine. This information comes from the reception of Mode C replies.

Figure 10:
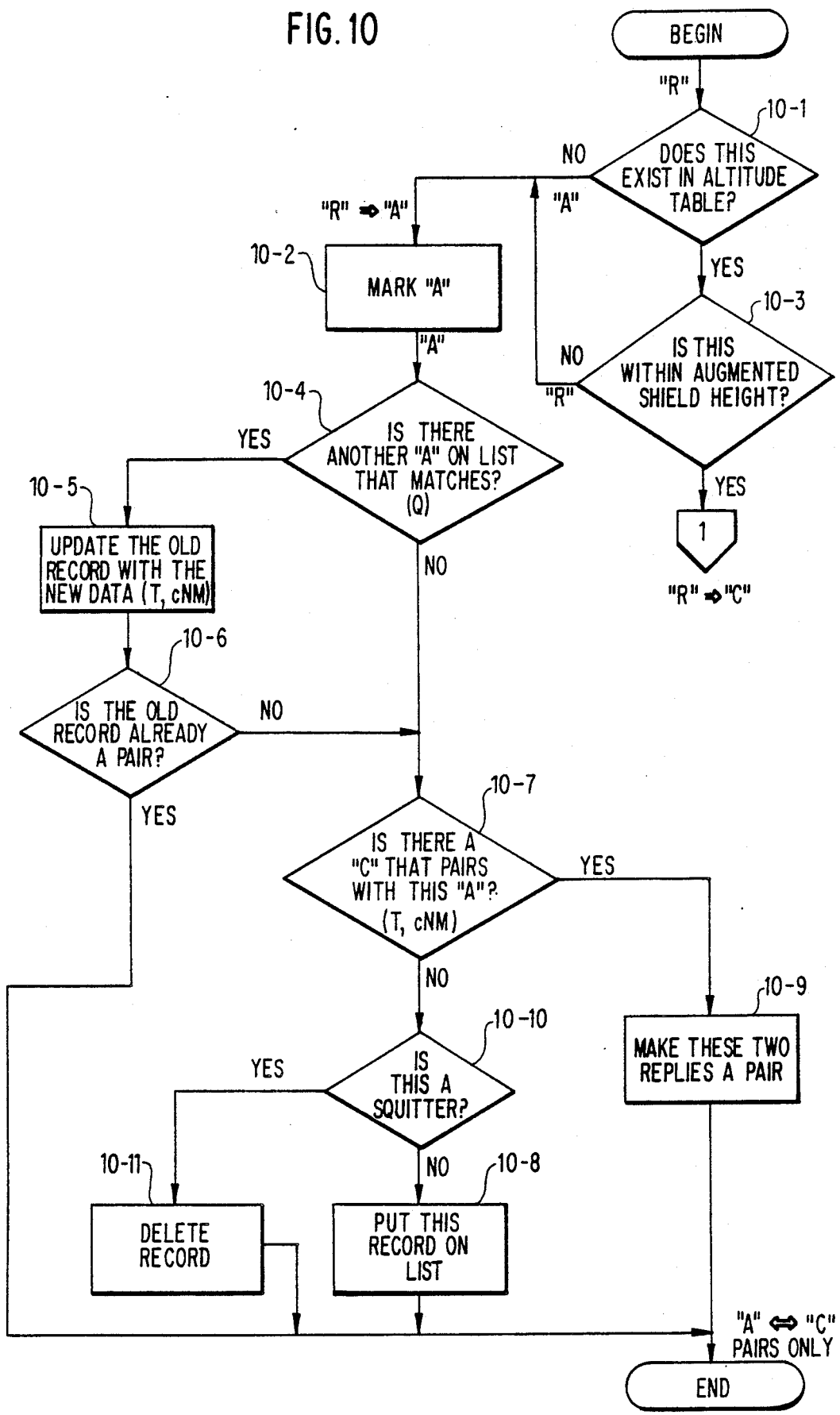
FIGS. 10–15 are flow charts of software routines implemented in the digital electronics portion of the present invention.
Figure 11:
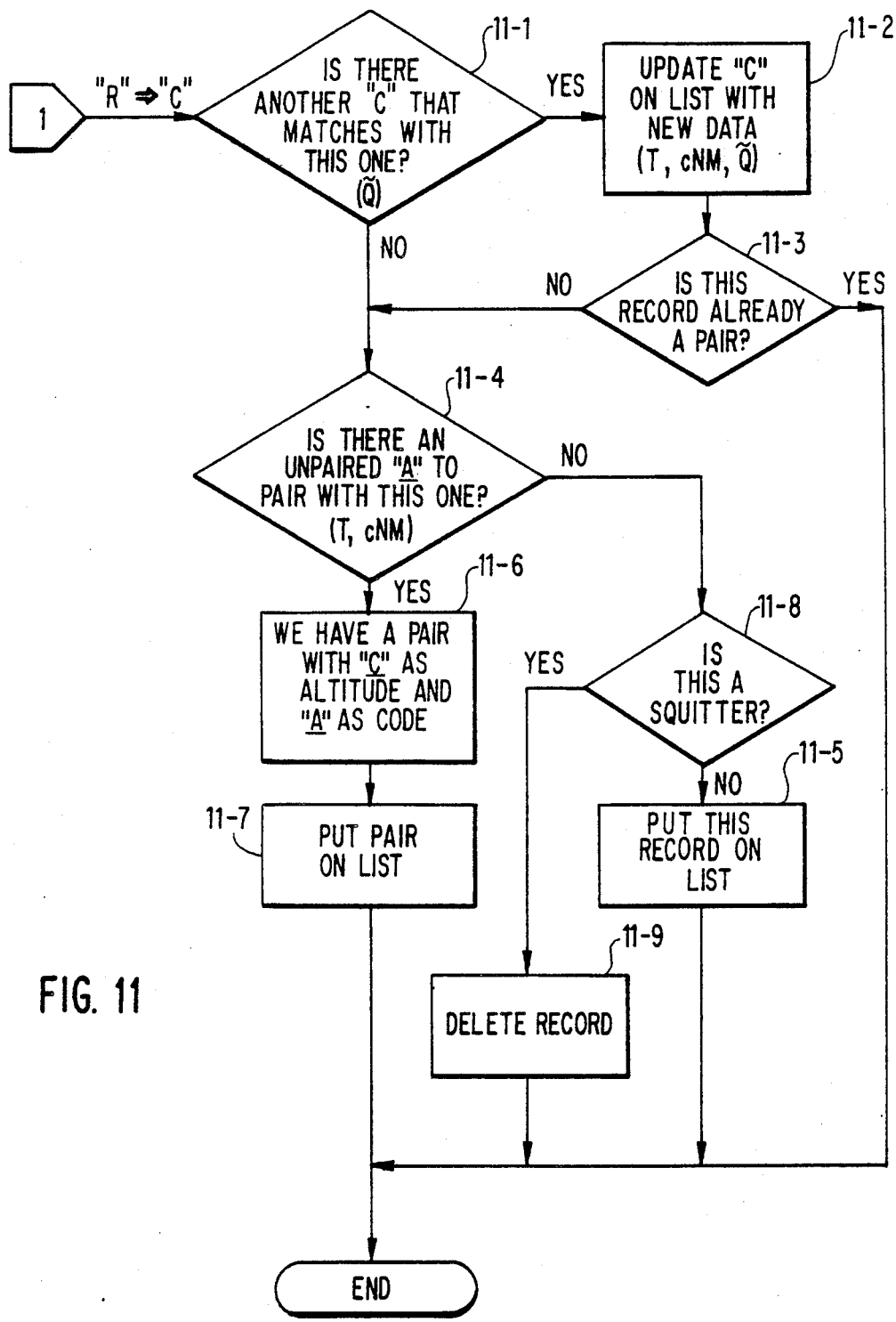

Flow charts for the sorting algorithm are illustrated by FIGS. 10 and 11. The process of FIGS. 10 and 11 are applied to each Valid Reply contained in the data buffer. All Valid Replies, "R", are operated on by this algorithm. These consist of all possible Mode C replies, as well as all possible Mode A replies, since from the three parameters forming the reply it is impossible to distinguish Mode A replies from Mode C replies. The number of possible different codes are tabulated as follows:

| | |
|---|---|
| Possible Mode A Replies = | 4096 |
| Less Code 0000 = | −1 |
| Actual Possible Mode A Replies = | 4095 |
| Possible Mode C Replies = | 610 |
| Plus Code 0000 = | +1 |
| Actual Possible Mode C Replies = | 611 |
| Total Possible Different Reply Codes = | 4706 |

When a transponder is Mode A interrogated, 4096 different replies are possible. Code 0000 is reserved for military intercept operations, and for practical purposes, is never used. Therefore, when a transponder is Mode A interrogated, 4095 different replies are realistically possible. Of these, there are several codes reserved for special purposes, and are routinely not encountered. These are:

Code 1275: Parrot for site monitoring of transponder ground based installation
Code 7500: Hijack
Code 7600: Communications out
Code 7700: Emergency Mode C altitude reporting codes cover an altitude range from 59,900 feet to 1000 feet below sea level. This coverage requires a total of 610 different codes. Also, if an aircraft is interrogated for a Mode C reply, but is without an encoding altimeter, only framing pulses (F1, F2) are transmitted. This is equivalent to transmitting Code 0000. Therefore, when a transponder is Mode C interrogated, including the Code 0000 corresponding to framing pulses only, there are a total of 611 possible different replies. Of the possible Mode C replies, there are an equal number of possible Mode A replies having exactly the same code format. The difference is that if the reply is due to a Mode A interrogation, it means one thing; if the reply is identical but due to a Mode C interrogation, it means another. Since identical Valid Replies can mean different things, this ambiguity must be accounted for.

Referring to FIG. 10, in step 10-1 each reply is compared to all possible Mode C replies (including Code 0000) in an altitude table of codes. This table contains all codes for the 611 different possible altitudes, including Code 0000. Any reply not matching to values in the table is definitely a Mode A reply, step 10-2. The replies which do match values in the altitude table may either be Mode A or Mode C replies. Of the possible 1221 (610 Mode A codes identical to 610 Altitude codes plus the all zero, no altitude code) replies which are not unambiguously Mode A, there are both Mode A and Mode C possibilities. Each of these replies is further sorted by asking "Is This [reply] Within Shield Height+200 Feet?" in step 10-3. The purpose of this selection is to limit attention to Mode C replies within the shield and 200 feet beyond (above or below). Traffic may be displayed 200 feet outside the selected shield height, but only traffic within the shield will annunciate the audio warning tone. Replies representing altitude outside this region (shield ±200 feet) are treated as Mode A replies.

By limiting attention to traffic with altitudes within the shield (and 200 feet beyond), the number of possible codes is further restricted. The maximum shield height is ±2,000 feet, and with the 200 foot extension, the maximum height is ±2,200 feet. Since altitude is digitized in 100 foot increments, the height of ±2,200 feet requires but 45 different Mode C codes. For usual operation, shield heights of ±1,000 feet or less are normally used, and (with extension) this limits the possible Mode C codes to 25. There will also be a possibility of 25 Mode A replies that can correspond to the possible Mode C replies. These consequences are discussed below. Sorting on the basis of altitude has limited ambiguous codes to 25 (for shield height of ±1,000 feet) out of 4,706 possible codes, or about 0.5%. Thus, selection on the basis of altitude provides a powerful sorting technique.

Step 10-4 then determines if there is a match with another record with the same "A". If so, the record is updated, step 10-5. Thereafter, the record is checked to see if it has a Mode C reply, step 10-6. If so, processing of this record is terminated and the next unprocessed record is selected. If at step 10-6 the record does not have a Mode C reply, the list is checked for a match (based on time stamp and cNM) with another record, at step 10-7. If there is no match, step 10-10 checks to see if this is a squitter. The criteria are (a) it is unmatched, (b) unpaired and (c) cNM of 0.3NM or less. If a squitter reply is detected, the record is deleted (10-11). If the reply is not a squitter, the record is put on the list, step 10-8. If there is a match, step 10-9, the information is merged into a single record.

In altitude, the algorithm of FIG. 10 performs pairing of Mode A and corresponding Mode C replies. Mode "A" replies that are identical in code are considered from the same aircraft and treated as such. Replies are compared on the basis of T (time) and cNM (range), and if they are of matching codes, and have arrived within for example 0.1 seconds of each other, and if they are within for example 0.1 cNM, they are tracked as a single aircraft, with the algorithm updating existing records. Further, if there is a Mode "C" reply that compares in T (0.1 seconds) and cNM (0.1 cNM), the Mode "A" and the Mode "C" are paired, so that the Mode A identification (squawk) from traffic is available for display to the pilot. (It should be understood that the time and distance criteria may be varied without departing from the invention.)

The process of FIG. 11 operates on those records which may be Mode C replies and are within the limits established at 10-3. Function 11-1 (FIG. 11) seeks to match a record on the list with the reply being processed based on common altitude (and cNM and time stamp). If a match is found, step 11-2 updates the record on the list. Step 11-3 then determines if the record is already paired. If so, the processing of the record is concluded. If there is no match (11-1) or no Mode A data (11-3), then step 11-4 checks to see if a match can be made with an unmatched mode A record on the list. If there is no pair, step 11-8 checks to see if this is considered a squitter using the same criteria used at step 10-10. If a squitter is detected, step 11-9 deletes the record. If not a squitter, the record being processed is added to the list (11-5). If step 11-4 finds a match, then steps 11-6 and 11-7 add the data in the record being processed to the match. In summary, this algorithm tracks the changing altitude and cNM from a traffic, and keeps the record updated. The Mode "C" replies are compared on the basis of either remaining identical, or having changed by 100 feet. The record is kept updated with altitude and cNM, thus performing tracking. The changing altitude provides information for determining convergence or divergence of altitude separation. Finally, this algorithm searches the record of Mode "A" replies, and provides pairing based on T (0.2 seconds) and cNM (0.4 cNM) comparisons with Mode "C" replies. Again, this pairing provides the pilot with the Mode A identity from traffic.

Prioritizing

Figure 12:
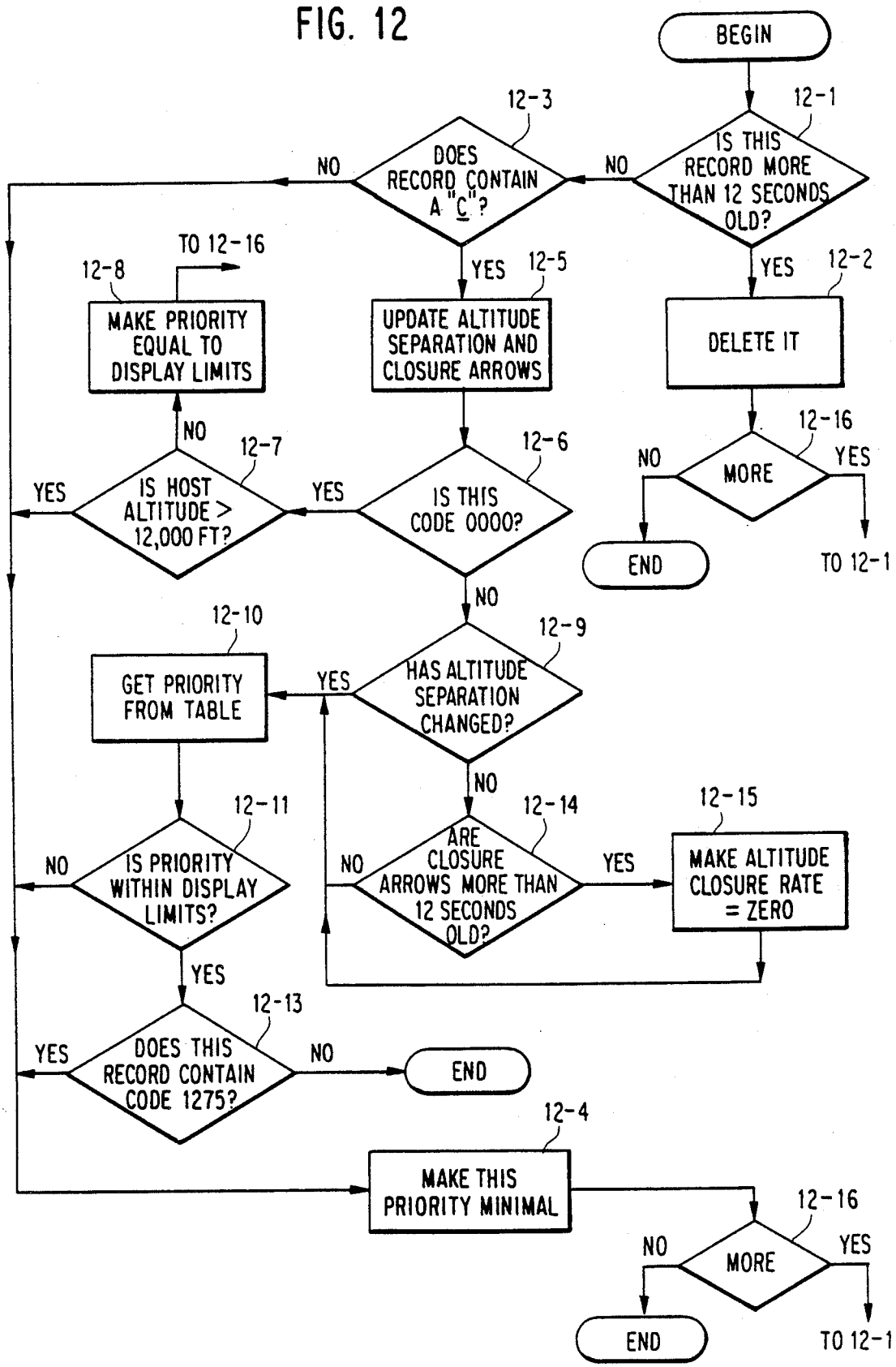

The algorithm of FIG. 12 assigns a priority value to each record. Any record that has not been updated in more than about 12 seconds old is discarded (steps 12-1, 12-2). If information has not been updated within this time, it is considered obsolete. A record passing the test of step 12-1 is then checked for a code "C" (12-3). If there is none, the record is assigned a minimal priority (12-4). If there is a "C", then altitude separation and closure data is updated (12-5). If Code 0000 is received, it is assigned the lowest possible priority ("Make Priority Equal to Display Limits") if the host is below 12,000 feet (12-7; 12-8). By doing so, if the non-Mode C aircraft (Code 0000) is the only threat, it is considered primary; however, if there is another threat from a Mode C aircraft, it will always take priority over the non-Mode C aircraft. Since Mode C is required for aircraft operating above 10,000 feet, if the host aircraft is above 12,000 feet (12-7), all non-Mode C replies are disregarded (12-4). This algorithm then checks to see if altitude separation between host and traffic are changing (12-9), and if not, the convergence/divergence (closure) arrows are no longer displayed (12-14; 12-15). If either altitude separation has changed or if change in altitude separation is recent (within 12 seconds), then step 12-10 obtains a priority value from a priority table. Step 12-11 compares the priority for the craft with priority of traffic within the user selected shield. If priority is above the threshold, then it will be displayed even if the traffic is outside the user selected shield.

Further, Code 1275 is placed in the background by assigning minimal priority. Code 1275 is used as a parrot at radar sites for providing continual testing of the transponder system, and thus never represents an aircraft. Code 1275 is placed into the background, but not deleted from the record, in order to minimize computer workload. By keeping this code on record, each time the code is received, complete processing is not required. This technique is used with other replies (such as non-Code C above 12,000 feet) that are received repetitively, but are not displayed.

All other Mode "C" codes are assigned priority values from a priority lookup table (12-10). The lookup table (see FIG. 26) is based on both altitude separation and cNM, but places emphasis on altitude separation. This table is completely versatile, and can be readily adapted as necessary. Since cNM is determined from Mode "C" replies (or framing pulses in the case of non-Mode C replies), priority values depend solely upon Mode "C" replies, and not Mode "A" replies. In this manner, each craft is assigned a priority value.

FIG. 26 shows a table which yields a priority value (an arbitrary number between 100 and 2097, where the lower the number, the higher the priority) based on calibrated distance (cNM in the range 0.3–3.9 nautical miles) and either no altitude (NO ALT) or an altitude offset from host between 0 feet and ±2500 feet. The table is constructed so that there are no equal priority values. The table is divided into eight different regions. The first region, the region containing the highest threats, is within ±300 feet (in altitude) of the host and 2.1 cNM or less from the host. Region 2 is devoted to replies showing no altitude but within 2.1 cNM from the host. Region 3 is outside of region 1 but within 500 feet of the host in altitude and within 2.1 cNM. Region 4 is outside of region 3 and between 2.1 cNM and 3.9 cNM from the host. Region 5 is outside of region 3 but within 1000 feet from the host in altitude and within 2.1 cNM. Region 6 is devoted to replies which do not have a specific altitude (NO ALT) and between 2.1 cNM and 3.9 cNM. Region 7 is outside of region 5, within 1000 feet from the host in altitude and between 2.1 cNM and 3.9 cNM. Finally, region 8 is outside of region 7, within 2500 feet of the host in altitude and within 3.9 cNM. FIG. 26 shows the general format for the table by illustrating the entries for 0.3, 0.5, 1.0, 1.5, 2.0, 2.5, 3.0 and 3.9 nNM and altitude separations for 2500, 2000, 1500, 1000, 500, 400, 300, 200, 100, 0, −100, −200, −300, −400, −500, −1000, −1500, −2000 and −2500 feet as well as the NO ALT class of replies. Those skilled in the art will, after a review of FIG. 26 and the foregoing specification, be capable of completing the table or altering the table as desired.

Search Routine

Figure 13:
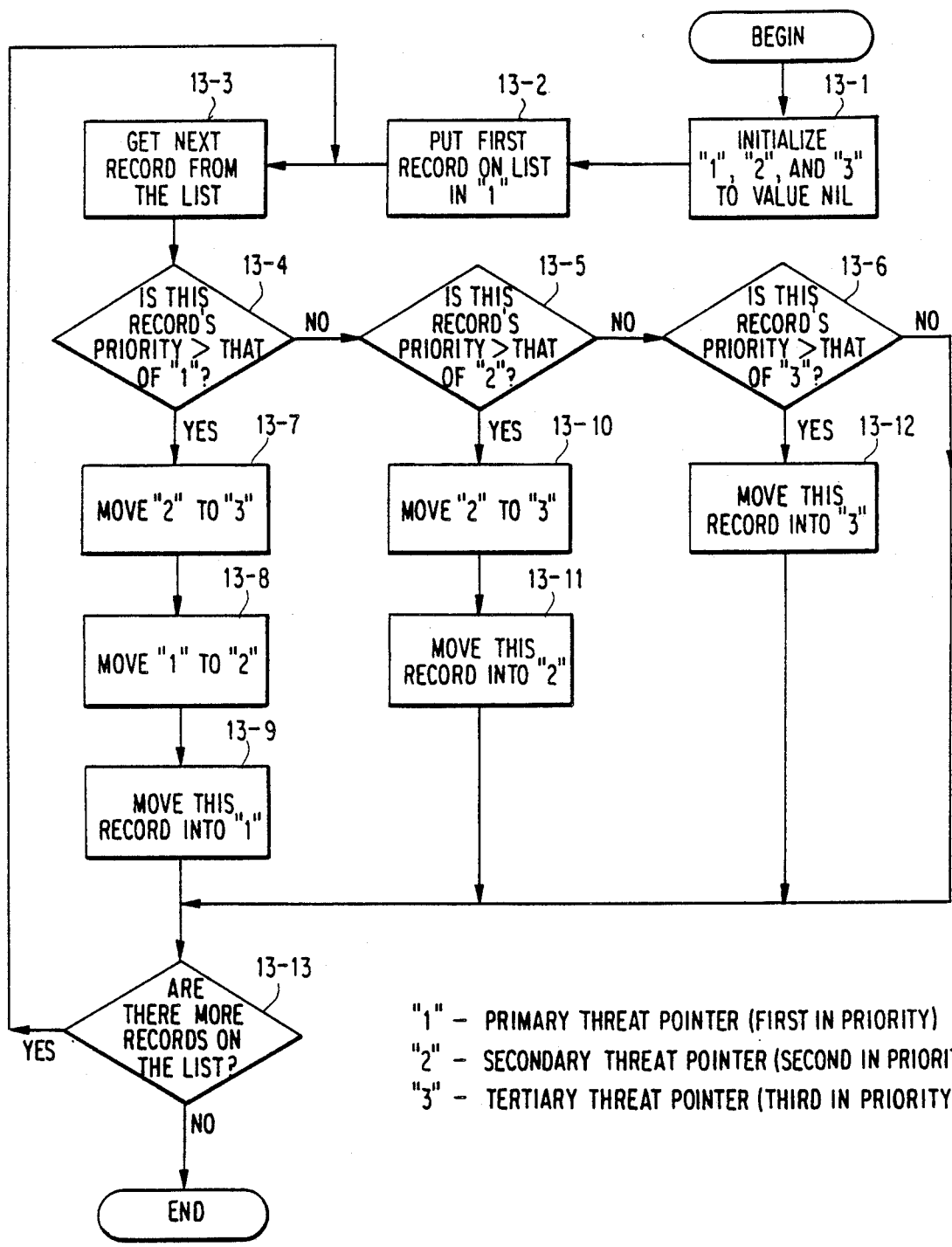

The algorithm of FIG. 13 searches for traffic having the three highest priorities, and identifies them accordingly. The traffic having the highest priority is identified by a "Primary Threat Pointer" giving the address for the highest priority record. Secondary and Tertiary Threat Pointers designate records with secondary and tertiary priorities respectively. Step 13-1 initializes the priority registers to null values. Step 13-2 enters the first record on the list into register "1". Step 13-3 then gets the next record from the list. Steps 13-4 through 13-12 sort the two records based on priority value. Step 13-13 returns to step 13-3 if there are more unprocessed records and sorting continues until the entire list is sorted.

Display Algorithm

Figure 14:
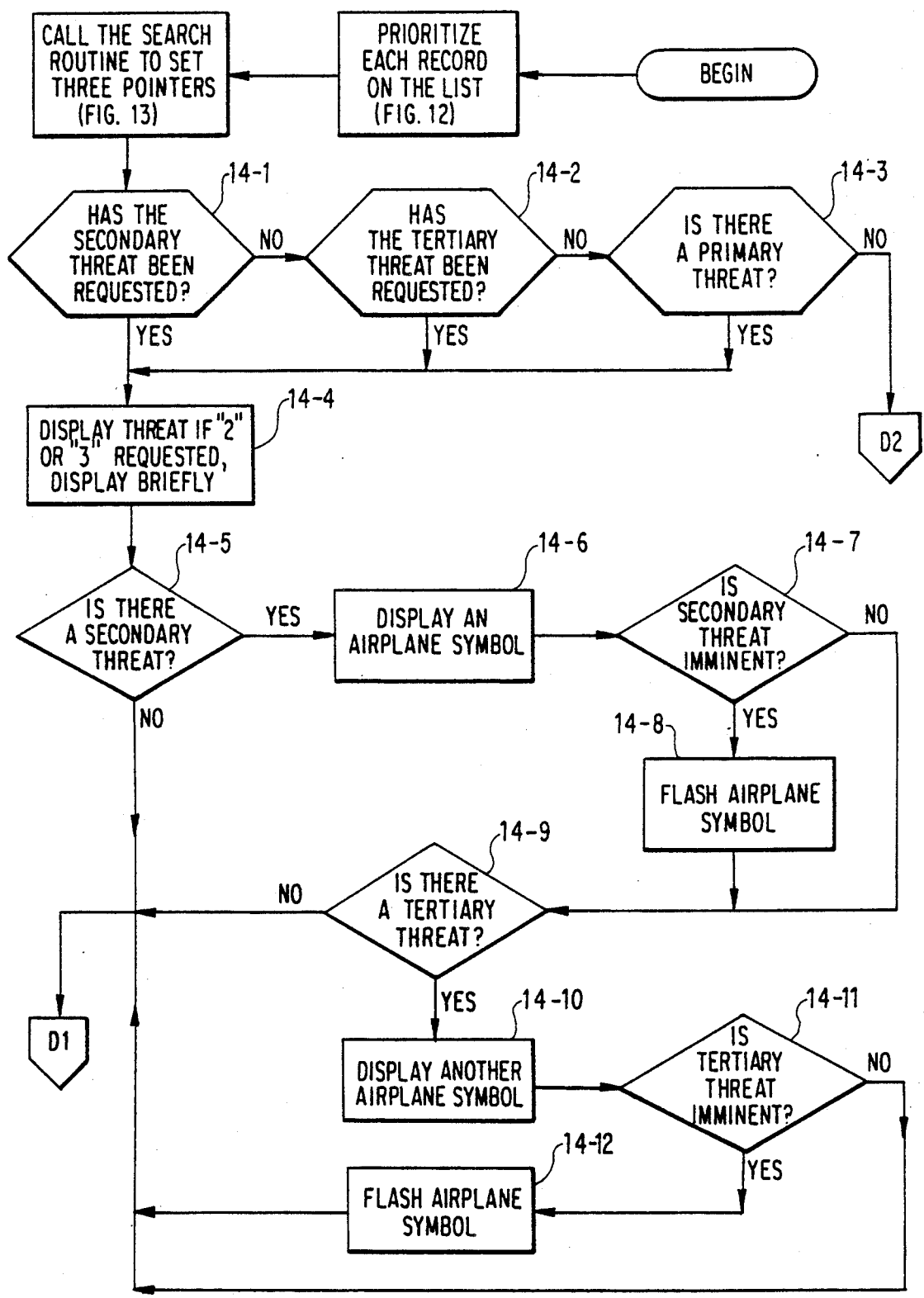
Figure 15:
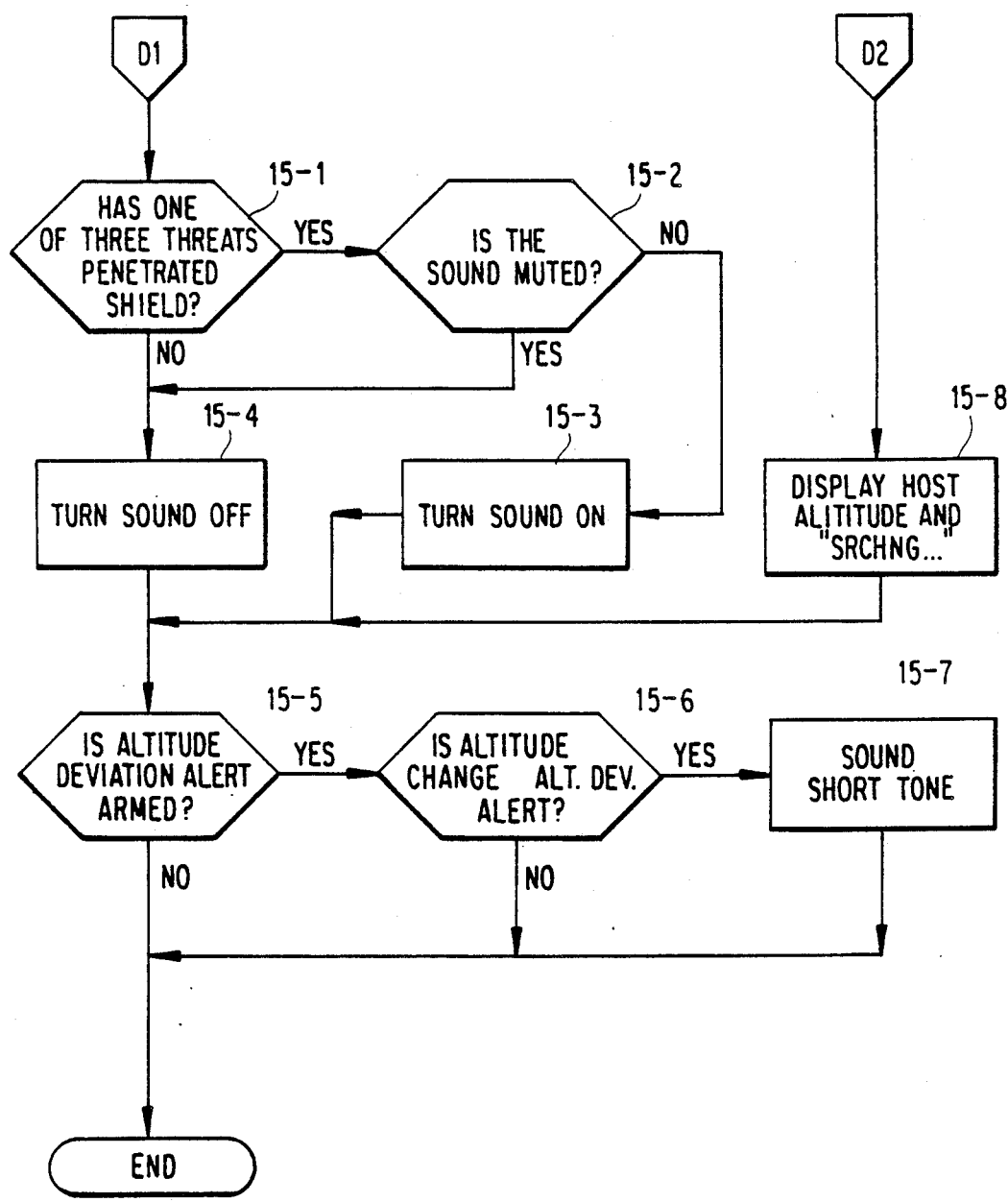
Figure 16:
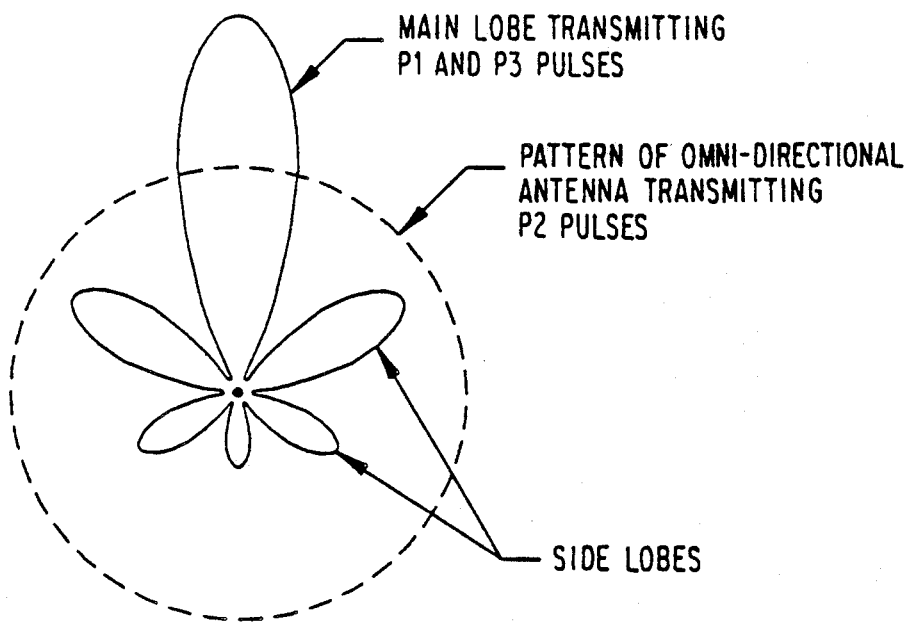
FIGS. 16–19 are useful in describing ATCRBS characteristics.
Figure 17:
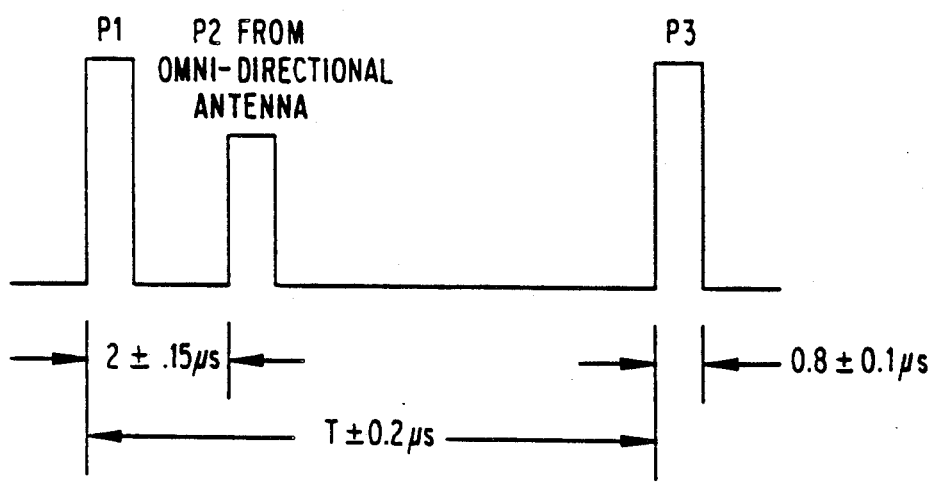
Figure 18:
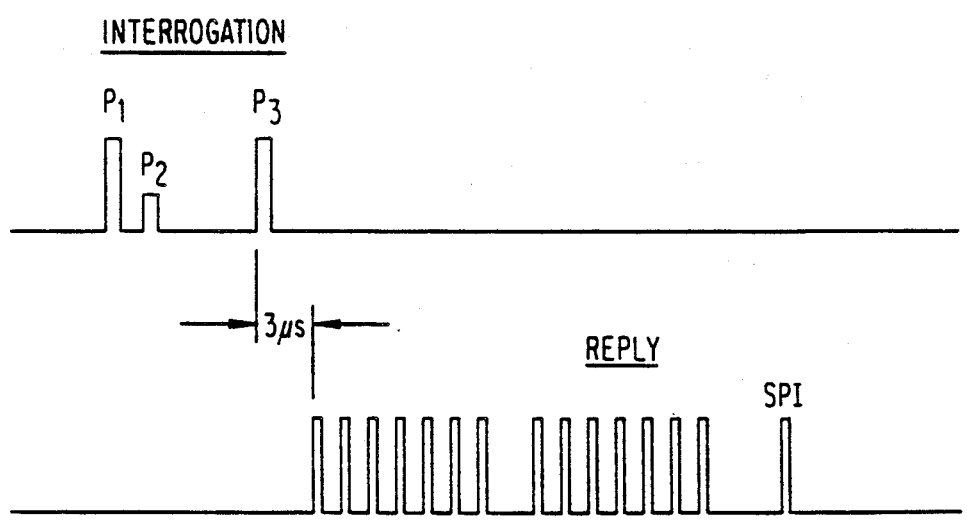

The Display Algorithm of FIGS. 14-15 organizes threat information for proper display. The primary threat is normally displayed for pilot viewing (14-4). If there is a secondary threat, an airplane symbol is displayed to the right side of the primary display (14-6). If there is a tertiary threat, a second airplane symbol is displayed (14-10). The secondary and tertiary threats can be requested for momentary display (14-1, 14-2, 14-4).

If either the secondary or tertiary threats are imminent, the associated airplane symbol flashes (14-7, 14-8, 14-11, 14-12). Imminent is considered within 500 feet, and of opposite altitude direction of the primary threat.

The Display Algorithm also arranges for annunciation of the audio tone (see FIG. 15). When traffic has penetrated the shield, the audio tone is turned on. This sound can be muted for a defined period of time by the operator (15-1 through 15-4). If no traffic is acquired, then function 15-8 is performed to display host altitude and the "SRCHNG" note. Steps 15-5 through 15-7 monitor the Altitude deviation alert. If engaged (15-5), step 15-6 checks to see if the deviation exceeds the threshold (200 feet for example). If so, step 15-7 produces a distinctive tone.

FIGS. 27, 28, 29a, 29b and 30 illustrate respectively the executive routine executed by the CPU 120 and three interrupt routines for RCVR, TIMER and KYBD. The executive routine (FIG. 27) is a continuous loop (F3-F7) once the preparatory functions F1-F2 have been performed. When TCAD is energized, steps F1-F2 establish a 10 ms display update timer and establish a short preparatory interval and begin timing that interval. Thereafter, function F3 checks to see if a new data buffer has been loaded. The new data buffer is loaded with the raw input data from the REC by the CPU 120 in the event a receiver interrupt occurs during a suppression/listen duration. If, on reaching step F3, there is a new data buffer containing raw data, step F4 is performed which performs the signal processing filtering consisting of digital correlation, pulse width discrimination, pulse position recognition, midpoint analysis and threshold detection, as described above. Raw data which passes the filtering function is considered a VALID REPLY and is stored as such. When the signal processing of step F4 is concluded, step F5 determines whether or not it is time to update the display. As established by the 10 ms display update, the display is updated approximately 100 times per second. A wait loop is established at step F5 to wait for expiration of the display update timer. When it is time to update display, step F6 corrects the intensity. Display intensity is determined by sensing ambient light levels (photocell 127). Thereafter, step F7 performs the functions already described in connection with FIGS. 10-15. The loop of steps F3-F7 is thereafter continuously repeated.

Figure 29A:
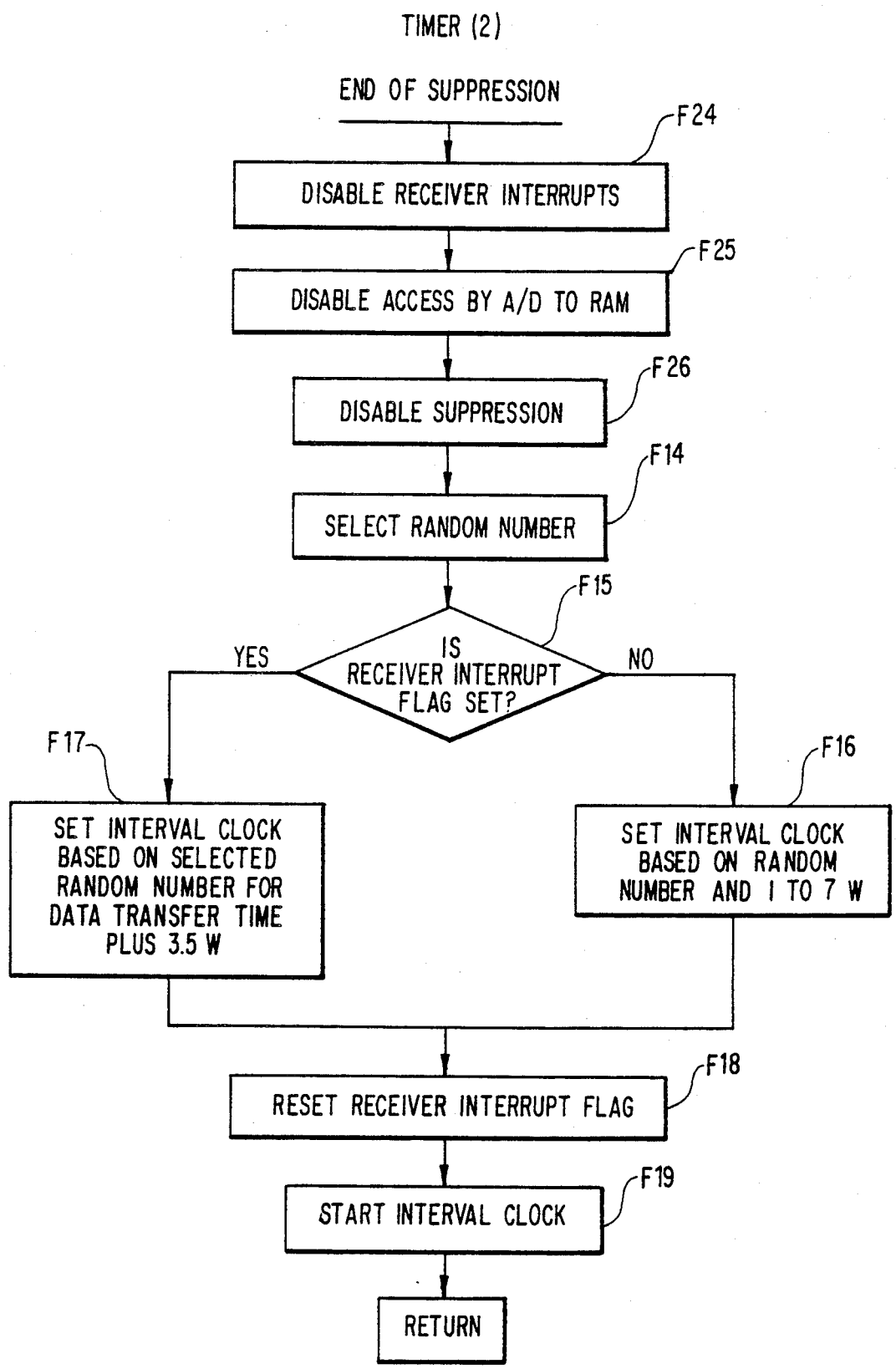
Figure 30:
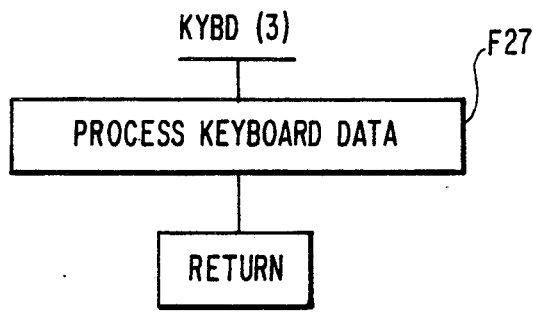

The CPU 120 can be interrupted on any one of three different bases. These interrupts have a priority level and the highest priority interrupt is from the receiver REC; this interrupt routine is headed RCVR and is shown in FIG. 28. The CPU 120 also responds to a timer interrupt based on expiration of the timer 106 which is alternately programmed by CPU 120 to time the suppression/listen duration (725 μs) or the interval (set to a selected random interval as described above). The timer interrupt is shown in FIGS. 29a (at the end of a suppression/listen duration) and 29b (at the end of an interval) under the heading TIMER. Finally, the lowest priority interrupt is from the keyboard and the processing for that is shown in FIG. 30 under the heading KYBD.

Referring to FIG. 28, an interrupt from the REC will, since it is the highest priority interrupt, cause the CPU 120 to suspend whatever process was in operation and jump to step F9 (FIG. 28). This interrupt is generated by the pulse width discriminator 112 and is only accepted if receiver interrupts are enabled. Step F9 determines the end of suppression/listen duration. The CPU remains at step F9 until the timer 106 indicates expiration of suppression (by setting a flag). Receiver interrupts are only enabled during suppression. At the end of suppression, F8 disables receiver interrupts. F10 disables access to RAM 113a. F11 disables (ends) the suppression. F12 begins the transfer of the raw received data to a buffer and F13 sets the receiver interrupt flag.

Figure 29B:
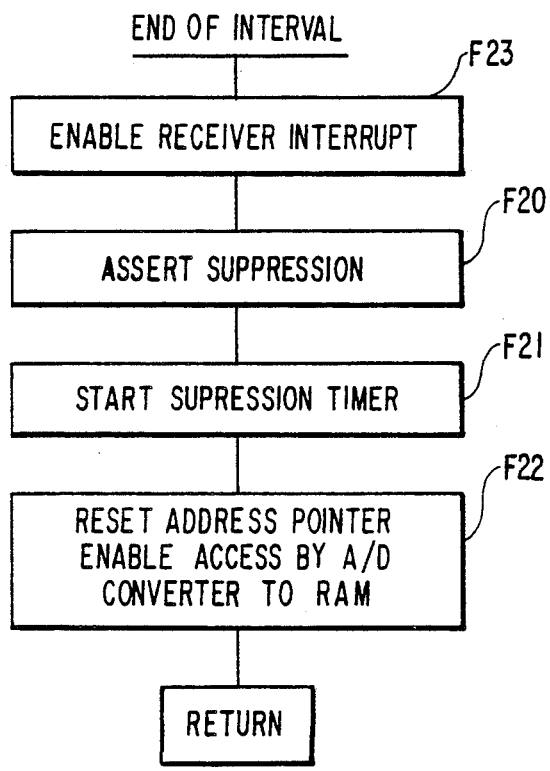

If an interrupt is received from the timer, then the CPU 120 will suspend whatever operation is in progress unless a receiver interrupt is currently in process. If no receiver interrupt is in process or at the end of the currently executing receiver interrupt, the CPU will then perform the functions shown in FIG. 29a or 29b depending on whether the interrupt was received at the end of a suppression duration (in which event FIG. 29a is performed) or at the end of the interval (establishing the interval between suppression pulses), in which event FIG. 29b is performed. If the timer interrupt signals the end of suppression duration, then steps F 24, F 25 and F 26 are performed to disable receiver interrupts, disable access to the RAM by the A/D converter and end the suppression to the host transponder. Thereafter step F 14 selects a random number (the use for this random number will be described) in the range 1-16. F 15 then branches based on whether the receiver interrupt flag is or is not set (the receiver interrupt flag is set in FIG. 28 at F 13, if a receiver interrupt is received). If the flag is set, then at F 17, the interval clock (timer 106) is set for a duration which is equal to the sum of the data transfer time (a constant for any system) plus the random Z component which is based on the random number. In the event the receiver interrupt has not been received then the receiver interrupt flag will not be set and the interval to be timed (by timer 106) is that shown above in the middle column of the table defining X, as shown for F 16. Step F 18 then resets the receiver interrupt flag. Finally step F 19 starts the interval clock (timer 106) to time the interval selected at step F 16 or F 17.

If on the other hand an interval has ended then the routine of FIG. 29b is executed. F 23 enables receiver interrupts. F 20 asserts suppression. F 21 starts the suppression timer (106). F 22 resets the address pointer to the start of the RAM (so that newly received data is written properly) and allows access to the RAM by the A/D converter.

During a suppression duration there may be a receiver interrupt signaling the receipt of potentially useful data. In that event the receiver interrupt process of FIG. 28 is performed. This process waits for the end of the current suppression duration (since the receiver interrupt is enabled only during the suppression durations there cannot be a receiver interrupt fielded by CPU 120 except during a suppression duration). At that time steps F 8, F 10 and F 11 end the suppression duration. Step F 12 begins transfer of the received data to a data buffer and step F 13 sets a flag so that the process of FIG. 29a can be tailored for the different steps that are performed depending on the existence of received data. Step F 9 delays until the end of suppression, this is detected by the flag set by timer 106, on expiration. The expiration of the timer 106 also generates a timer interrupt. Since the receiver interrupt has a higher priority the current receiver interrupt (if any) is not interrupted by the timer interrupt. Instead the timer interrupt process (FIG. 29a) is performed at the end of the receiver interrupt. On the other hand, in the absence of a receiver interrupt, the timer interrupt, at expiration of the suppression duration, results immediately in execution of the process of FIG. 29a. The initial steps F 24-F 26 disable receiver interrupts, disable access to RAM by the A/D converter and end suppression to the host transponder. Step F 14 selects a random number. Step F 15, in that process, branches on the status of the receiver interrupt flag. If the flag had not been set then step F 16 is performed to program timing the next interval by programming timer 106 to time out that interval corresponding to the selected random number (selected at step F 14). Thereafter the receiver interrupt flag is reset (F 18) and timing the interval is initiated (F 19). If the receiver flag had been set then F 17 is performed in lieu of F 16. F 17 programs the timer to the sum of the fixed data transfer interval (fixed for any embodiment and related to the length of the suppression duration and the rate of data transfer) and the Z component of the interval, selected based on the selected random number (F 14). The length of the data transfer interval may also take into account that although the timer is initiated at step F 19, data transfer actually began some time earlier, at execution of step F 13 (FIG. 28).

If the CPU 120 receives an interrupt from the keyboard, then all processes presently running will be suspended except for currently executing receiver interrupts or currently executing timer interrupts. The keyboard interrupt merely performs the step F18 to process the keyboard data, i.e. to accept the data and respond properly to that data.

In general through the keyboard routine the CPU maintains a set of registers which store indications of the pilots current selections. For example there is a group of registers, one register for each of the parameters (cNM equivalent range, altitude and tone type) for each operating regime (TRML, STD and ENRT). The keyboard routine checks for the appropriate pushbutton selections before displaying and/or altering the quantities in these registers. A current regime register stores a regime indicator (TRML, STD or ENRT to establish which group of this set of registers is to be used). Likewise the keyboard routine checks for the appropriate pushbutton selection before changing the contents of the regime register. At step 15-1 the contents of the regime indicator is used to select the current shield parameters for comparison to the parameters of the traffic. When step 15-3 is reached the appropriate tone type (continuous or single) is used as determined from the contents of the tone type register for the current regime. A further register is dedicated to altitude deviation alert status (engaged or disengaged). When changing the status to engaged a further register has current altitude written therein This value is then used to (1) determine whether the altitude alert audio tone is to be sounded and (2) determine if the altitude alert is to be disengaged due to current altitude deviation. Similarly registers are dedicated to current OAT and barometric pressure correction. Access to these registers for rewriting is gained after the appropriate pushbutton combination is detected and the contents of the registers are used for the obvious purpose. Another register stores mute duration. Finally a register is used to indicate whether ground muting is in effect. If that function is in effect then a check is made on initialization for depression of the TRML button. If detected then current altitude is recorded and muting is in effect until either (1) the operating regime is altered or (2) current altitude deviates by more than 100 feet from the recorded altitude.

Altitude Deviation Alert

The altitude deviation alert function is engaged/disengaged on a latching basis by operator manipulation of the keyboard 103. More particularly, as the pilot reaches cruise altitude, the up arrow and down arrow keys are simultaneously depressed; assuming that the altitude deviation alert had not theretofore been engaged, this operation engages the altitude deviation alert. At this time, the altitude reported by the altimeter is recorded by TCAD. Thereafter, when processing reaches the flow chart of FIG. 15, and more particularly step 15-5, the Yes path is followed. Step 15-6 determines the difference between the present altitude (as reported by the altimeter) and that altitude recorded when the altitude deviation alert was engaged. If that difference exceeds the altitude deviation alert limit (for example 200 feet) then the Yes path from step 15-6 is followed. Thereafter, step 15-7 sounds a short audio tone (distinguishable from the tone used for collision warning). The pilot can disengage the altitude deviation alert by again simultaneously pressing the up arrow and down arrow keys. If, during the time that the altitude deviation alert is engaged, step 15-6 determines that the difference between present altitude and the altitude recorded when the altitude deviation alert was engaged exceeds a second altitude difference (for example 500 feet) then the altitude deviation alert function will be disengaged.

As indicated above, when the altitude deviation alert function is engaged, the TCAD display in the mode of FIG. 21 includes as one element the A (see FIG. 21 and the element denoted by the reference character 2) to indicate engagement of the altitude deviation alert. Likewise, the altitude deviation alert is disengaged, the display in the mode of FIG. 21 does not exhibit the A element.

Density Altitude

As pilots are aware, density altitude is useful in calculating power plant performance at cruise and for calculating runway requirements for high altitude, high temperature departures. The density altitude is determined by pressure altitude and temperature. The TCAD monitors pressure altitude from the blind altimeter. By providing TCAD with outside air temperature (OAT), the TCAD computes and displays the density altitude. The density altitude function is engaged by simultaneously depressing the MUTE and the CODE buttons. The display will show, on the left, a location for density altitude display (with six stars) and on the right, the previously entered temperature (in degrees Fahrenheit). The temperature digits flash indicating the density altitude function is engaged and is ready to accept a new temperature input. The flashing temperature display is altered by using the up or down arrow key buttons. Once temperature is entered, the display will terminate flashing and density altitude will be shown. When the TCAD is in the density altitude mode, it does not search for nor display other traffic and/or collision threats. The density altitude mode is disengaged by again simultaneously depressing the MUTE and CODE buttons. Alternatively, if TCAD remains in the density altitude mode without any key button inputs for 20 seconds, TCAD automatically returns to collision avoidance operation.

Barometric Pressure Correction

Figure 1:
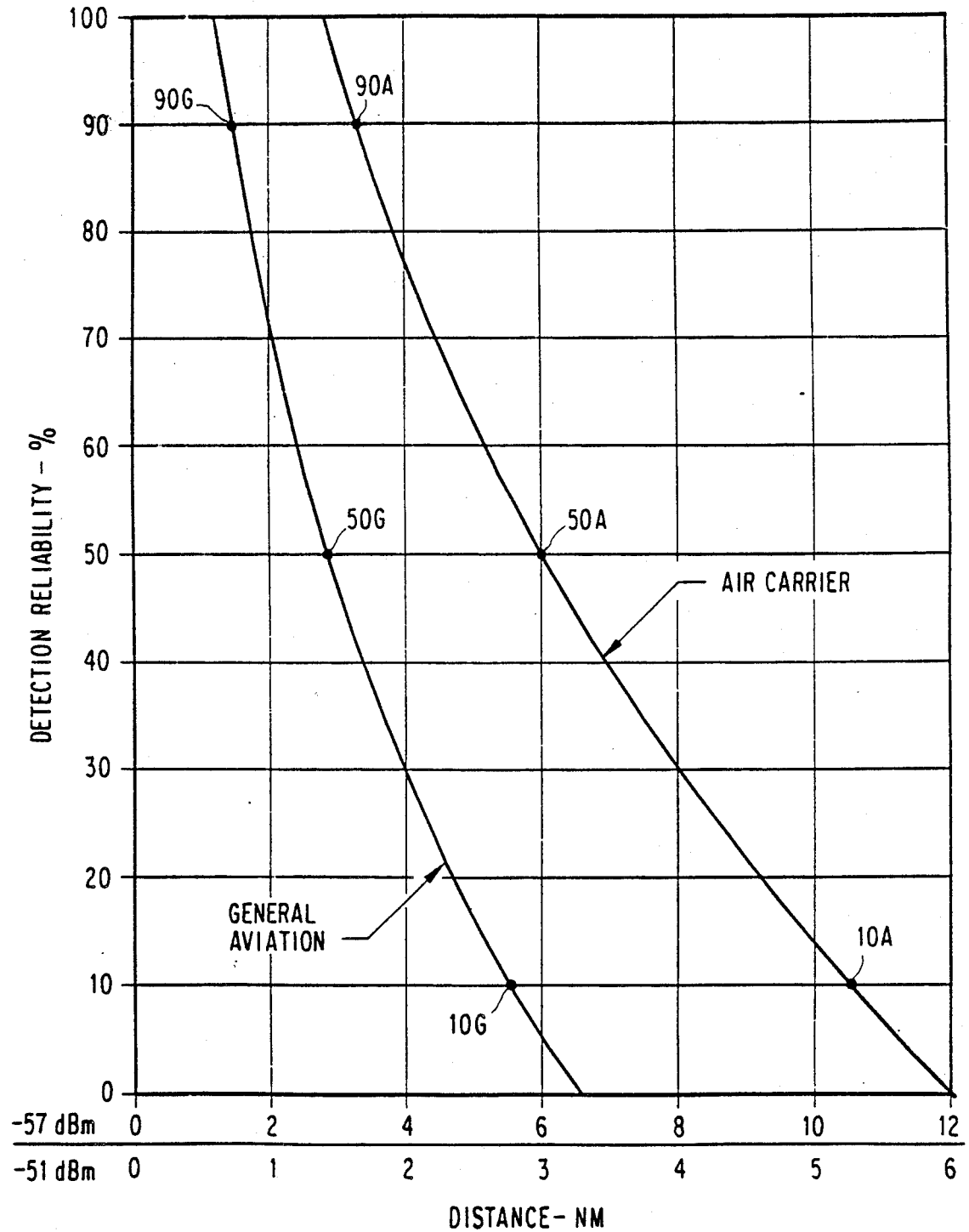
FIG. 1 shows curves for general aviation and air carrier aircraft plotting detection reliability vs. distance from a receiver.
Figure 2:
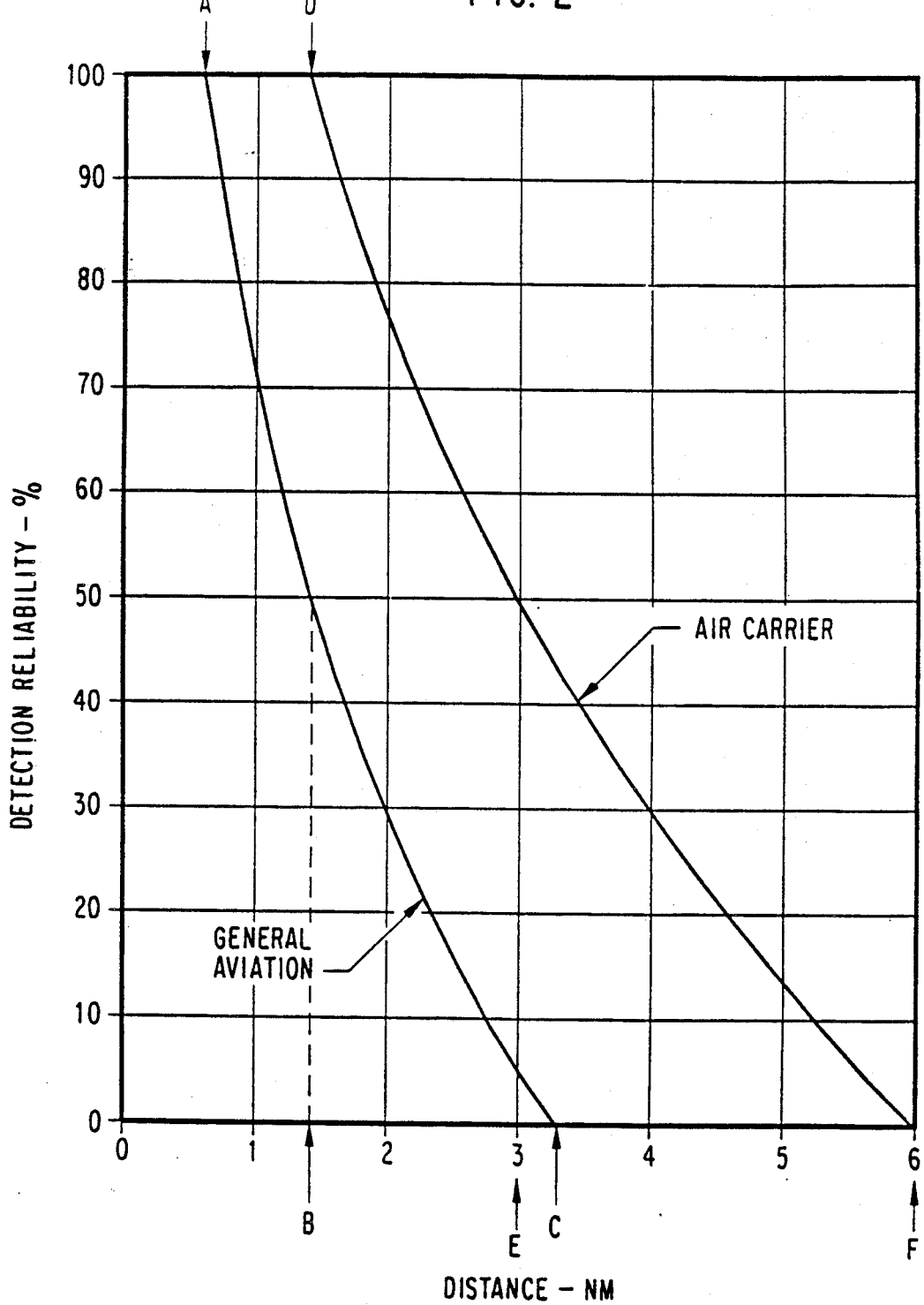
FIG. 2 is an annotated version of FIG. 1 specific to receiver threshold sensitivity of −51 dBm.
Figure 3:
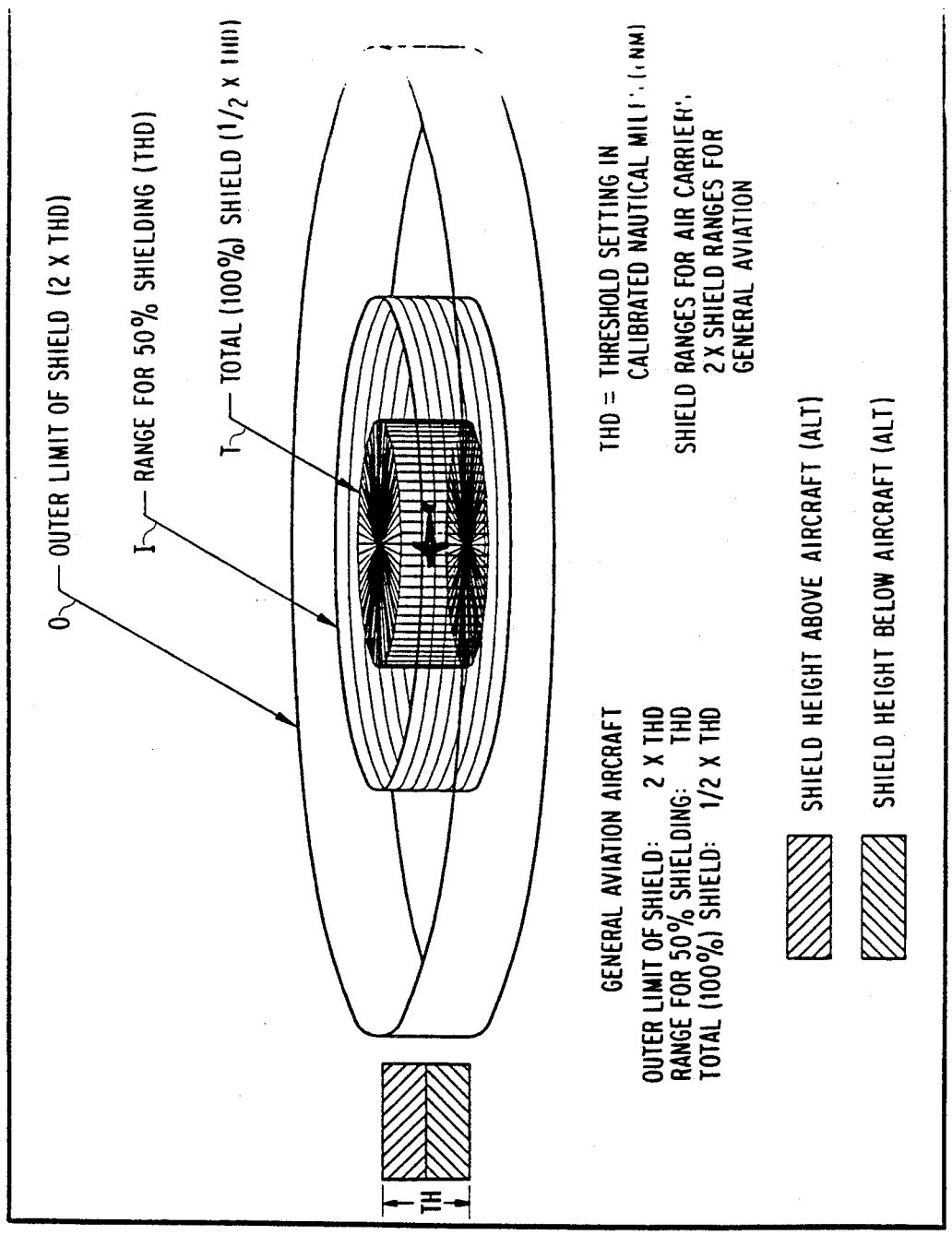
FIG. 3 is a schematic showing of the relative altitudes and ranges and the associated shielding probabilities as a function of the receiver sensitivity of the host.

A basic piece of equipment on all aircraft is an altimeter. The altimeter is an analog instrument which detects barometric pressure but is calibrated in altitude. The instrument is calibrated so that with outside barometric pressure of 29.92 inches of mercury, at sea level, zero altitude is reported. Since barometric pressure can vary, typically pilots receive barometric pressure information and recalibrate the instrument to take into account ambient barometric pressure differences which are not due to changes in altitude. The encoding or blind altimeter, on the other hand, reports altitude based on the assumption of 29.92 inches of mercury at sea level. If the barometric pressure is above standard conditions, then the blind altimeter will report an altitude which is lower than true altitude and, on the other hand, if barometric pressure is less than standard conditions, the encoding altimeter will report an altitude which is higher than true altitude. Since all transponders are subject to the same conditions there is no confusion regarding barometric pressure difference and the system reports representative altitude differences. To the extent that the TCAD reports host aircraft altitude based on the input from the blind altimeter, it is not surprising that under non-standard atmospheric conditions, the blind altimeter (or TCAD reports of the blind altimeter output) and the aircraft's analog altimeter readings will differ. TCAD has, however, provision for input of non-standard barometric pressure conditions so that the altitude reported by TCAD (based on the output of the blind altimeter) can be compared to the aircraft's analog altimeter. Non-standard barometric pressure is input by depressing the up or the down arrow when TCAD is in the search mode (display has the form in FIG. 2.1). The right-hand portion of the display will change to show the last barometric pressure correction. The current pressure correction can be inserted by using the up or down arrow button to change the setting. Normal TCAD operation will resume a slight delay after the last button depression. Thereafter, the TCAD altitude display will correct the blind altimeter output according to the current barometric pressure correction. It should be emphasized that while the TCAD display (see FIG. 21) of altitude has been corrected for barometric pressure variations and therefore is comparable to the analog altimeter and serves as a cross-check, this in no way affects the Mode C altitude reported by the transponder. Likewise, relative altitude or altitude differences displayed in the display as shown in FIG. 22, are differences between Mode C reports for the host and traffic aircraft, and neither of the Mode C values is corrected for pressure variations.

As an option the barometric pressure correction can also be used for another purpose. When in the search mode, parameters from selected aircraft can be displayed. The display can be changed, by depressing the CODE button, to an alternate display to show the mode A reply from that aircraft. That alternate display also includes the pressure corrected altitude of the aircraft, corrected by the effective pressure correction, i.e., the last pressure correction that has been input.

Mode A Images

It has previously been described that because there are certain identification codes (Mode A) which identically match altitude codes (Mode C reply), some valid replies which identify an aircraft can be erroneously regarded as the Mode C reply from an aircraft. The converse is not a problem because of the logic used in processing. In other words ambiguous codes are treated as Mode C if within a specified relation to the host. This leads to the problem being discussed, i.e., what is the effect of treating a Mode A code as a Mode C code. If the reply which is a Mode C code is treated as such, then the logic has operated as intended. There are Mode C codes which are treated as Mode A codes, but all are sufficiently displaced in altitude so they pose no threat and can be ignored. Referring briefly for example to FIG. 10, step 10-1 determines whether or not the code matches an entry in the altitude table. Step 3 determines if this altitude is within the augmented shield height and if it is, the reply is regarded as a Mode C reply even though it may in fact be a Mode A reply. Referring to FIG. 11, if the reply which is now regarded as a Mode C reply does not match with an actual Mode C reply already on the list (step 11-1) and there is no unpaired Mode A reply to pair with this one (step 11-4) then this particular reply (the Mode A reply which is treated as a Mode C reply) is put on the list as a Mode C reply even though it is in fact a Mode A reply (step 11-5). Because only some of such Mode A replies (specifically those lying within the augmented shield height) are further processed, only some of the ambiguous Mode A replies will be processed by TCAD. It goes without saying that if the amplitude of the reply lies below the threshold for range, then the reply will not even be considered a valid reply. However, there is a small but distinct possibility that TCAD will treat, as a valid Mode C reply, a reply which actually is a Mode A reply. This possibility is referred to as a Mode A image, i.e. it produces a Mode C record although the aircraft which is the source of the reply is not at the corresponding Mode C altitude. The possible effects which flow from this ambiguity are described with relation to FIGS. 23–25.

If the Mode A image is of an aircraft which is more than 500 feet displaced from the altitude of the host, then while the threat from this image will be displayed, the host need not change vertical position since the purported 500 foot separation is sufficient for safety. FIG. 23 illustrates the situation when the Mode A image is within 500 feet in altitude to the host. FIG. 23 illustrates the host, the Mode A image, as well as the actual threat. For the circumstance illustrated in FIG. 23, if the actual threat lies above the shield, the pilot of the host aircraft under the circumstances shown in FIG. 23 may be induced to increase his altitude to avoid the Mode A image.

Figure 24:
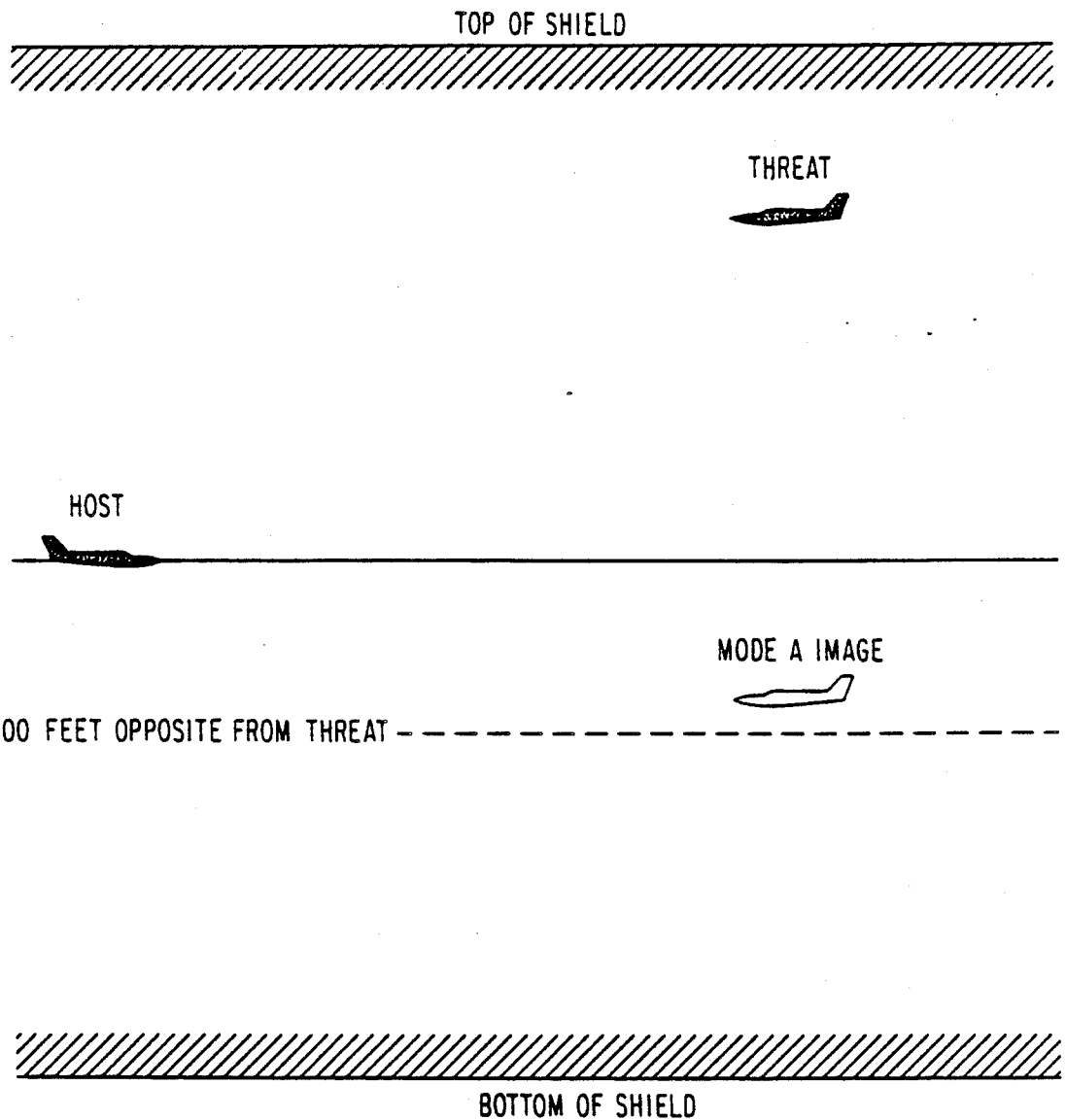

FIG. 24 illustrates an instance, different from FIG. 23, in which the Mode A image is within 500 feet of the host in altitude and the actual threat lies within the shield. Under these circumstances, the Mode A image is displayed as the primary threat since it is closer to the host and therefore has a higher priority. However, the secondary threat symbol is present since there is a record created for the actual Mode C reply of the threat which is treated as a Mode C reply. The pilot of the host aircraft may be induced by this situation to increase his altitude. If the host altitude is increased to the extent that the threat becomes a higher priority, then the TCAD displays the actual threat and the image becomes the secondary threat.

Figure 25:
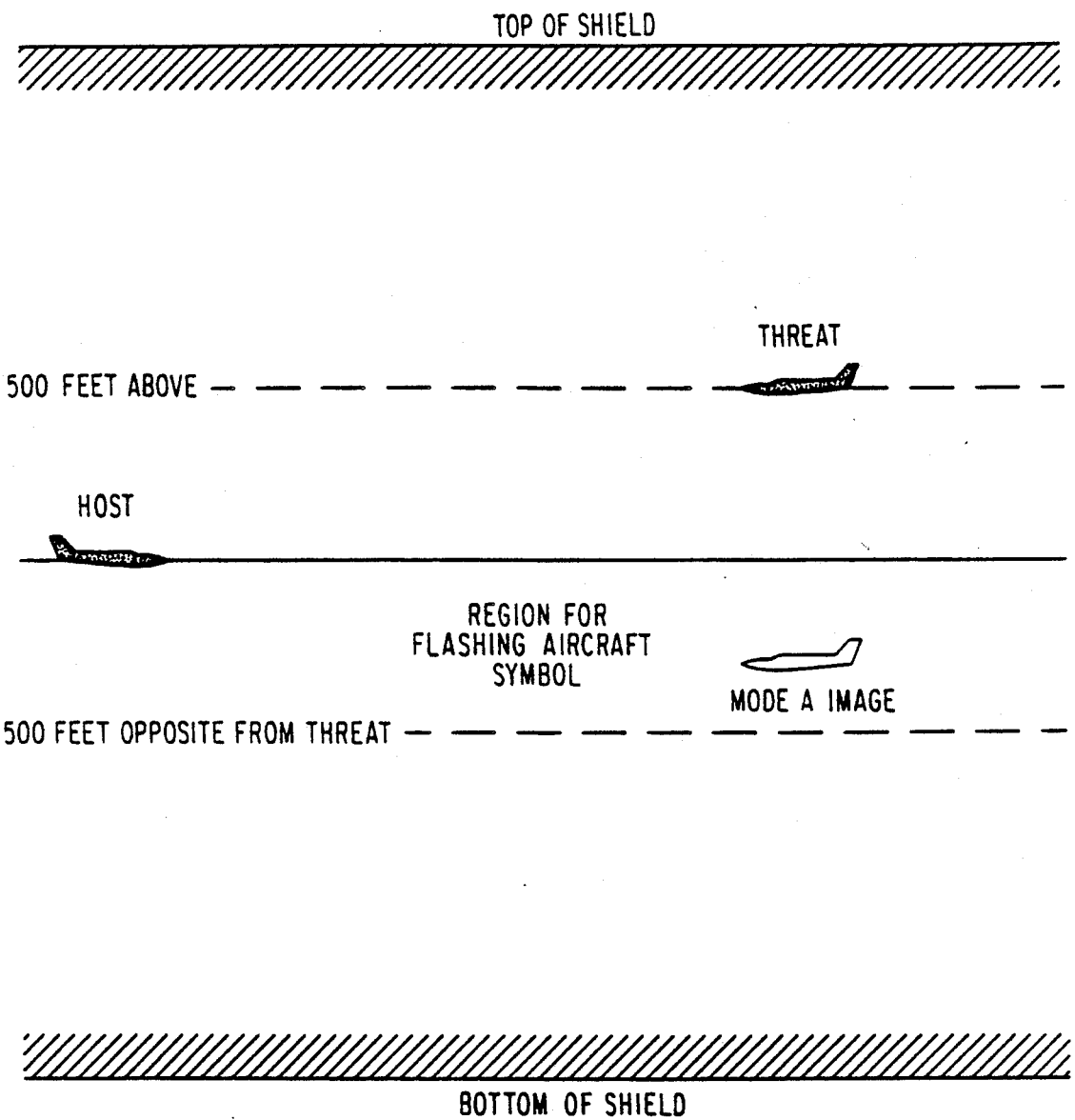
Figure 27:
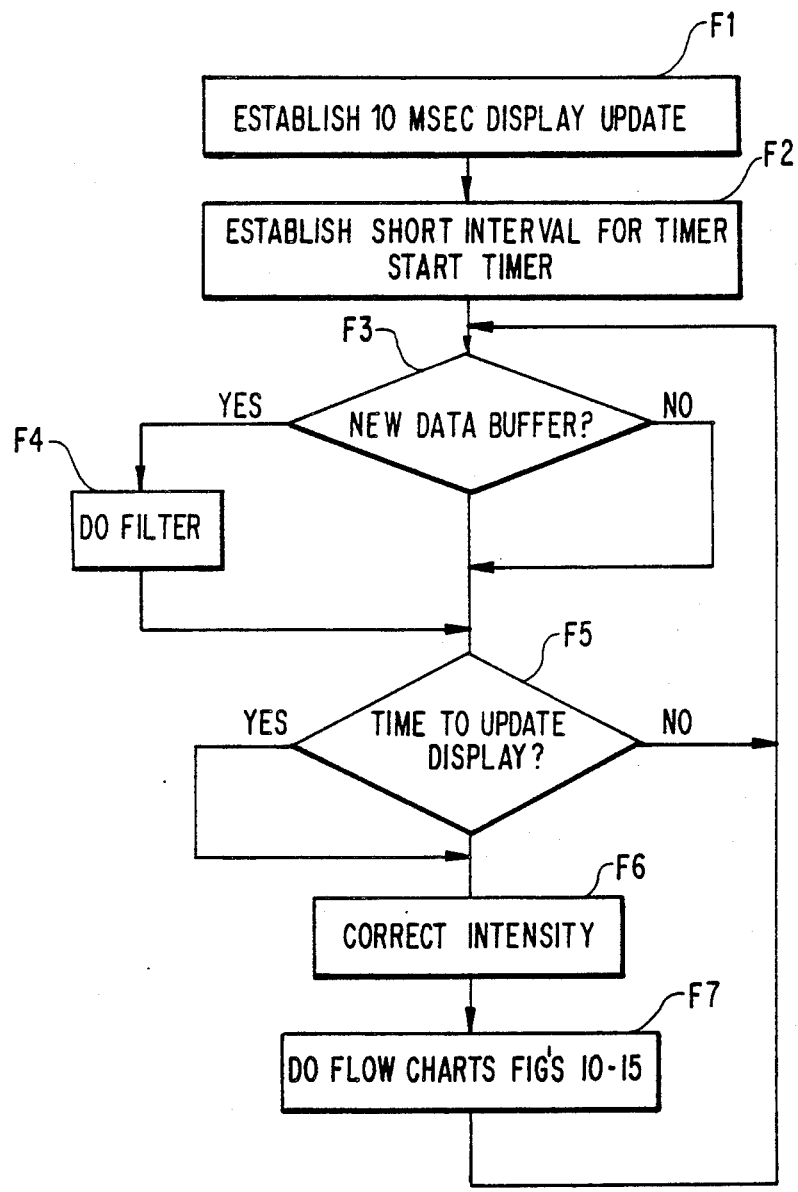
FIG. 27 shows the Executive routine of CPU 120.

FIG. 25 illustrates the most problematic circumstance, i.e. the Mode A image is within 500 feet from the host and the actual threat is also within 500 feet of the host but opposite in direction. The flashing threat symbol induces the pilot to view information from both the Mode A image and the actual threat. With this information, the pilot can then avoid both the real threat as well as the purported threat from the Mode A image.

It should be apparent from the foregoing that TCAD provides a passive device performing effective proximity warning and collision avoidance functions. It is flexible in that the pilot can select among a plurality of preprogrammed shield sizes (both in terms of shield altitude and range parameters) by the depression of a single button. The pilot can also program these values by manipulation of the keyboard. Notwithstanding its passive nature, TCAD monitors traffic in the vicinity of the host based on transponder relies to SSR interrogations. TCAD will, in the search mode, automatically prioritize the different threats, display the parameters related to the threat of the highest priority and at the same time indicate whether additional threats are present. In the event any threat penetrates the selected programmed shield parameters, an audible collision avoidance tone is sounded. The presence of other threats with the shield is reported on visually. Several additional peripheral functions are also performed at the pilot's selection including altitude deviation alert, reporting host altitude based on barometric pressure corrected data and providing the pilot with density altitude on request. Although the present description has described a preferred embodiment, it should also be apparent that many changes can be made within the spirit and scope of the invention which is to be interpreted in accordance with the claims attached hereto.

We claim:

1. In a proximity warning system for a host aircraft which includes a host transponder and a reply detector, said proximity warning system based on evaluation of replies from transponders of other aircraft to interrogations from a Secondary Surveillance Radar, an improved reply detector comprising:
   a) first means for suppressing said host transponder for a succession of suppression durations, wherein a delay between an end of one suppression duration and initiation of an adjacent suppression duration is no greater than about 8.5 ms., and wherein a ratio of the summation of time durations within a succession of suppression durations to a total time span encompassing said succession of suppression durations is in a range of about 13 to 20%,
   b) a reply receiver,
   c) data storage means responsive to said first means for storing data from said reply receiver only during a suppression duration, and
   d) threat evaluation means responsive to said data storage means for signaling presence of a collision threat.

2. An improved reply detector as recited in claim 1 wherein said suppression durations are irregularly spaced in time and initiation of each of said suppression durations is determined on a random basis.

3. An improved reply detector as recited in claim 2 wherein each of said suppression durations is less than 1 ms.

4. An improved reply detector as recited in claim 2 wherein said first means establishes each of said suppression durations at about 725 µs. and delay between ending of one suppression duration and initiation of an adjacent suppression duration is random between about 725 µs. and 5075 µs.

5. An improved reply detector as recited in claim 2 wherein said first means establishes each of said suppression durations at about 725 µs. and delays between ending of one suppression duration and initiation of an adjacent suppression duration is random between about 3.6 ms. and 6.2 ms.

6. An improved reply detector as recited in claim 1 wherein said threat evaluation means includes:
   d1) programmable means for selecting a threat threshold,
   d2) comparing means for comparing a characteristic of a reply to said selected threat threshold for producing a distinctive output if said reply characteristic bears a predetermined relation to said selected threat threshold, and
   d3) alerting means responsive to said distinctive output for alerting a pilot to a threat from a source of said reply.

7. An improved reply detector as recited in claim 6 wherein said comparing means compares an output amplitude from said reply receiver to said threat threshold.

8. An improved reply detector as recited in claim 6 wherein said comparing means includes differencing means for determining a difference between an altitude represented by a mode C reply code from said source of said reply and host aircraft altitude and producing said distinctive output if said difference is within a relative altitude window of said selected threat threshold.

9. An improved reply detector as recited in claim 7 or claim 8 wherein said programmable means for selecting a threat threshold includes:
   d1a) a plurality of buttons, each for a different flight regime,
   d1b) means responsive to depression of one of said buttons for selecting a corresponding preprogrammed threat threshold, and
   d1c) means responsive to multiple depressions of one of said buttons for enabling alteration of a corresponding preprogrammed threat threshold.

10. An improved reply detector as recited in claim 6 which further includes display means for displaying parameters of at least one threat.

11. An improved reply detector as recited in claim 10 wherein said display means displays at least one parameter changing in relation to distance between host and said source of said reply.

12. An improved reply detector as recited in claim 10 which further includes display control means for selecting parameters from said source of said reply for display.

13. An improved reply detector as recited in claim 12 wherein said threat evaluation means includes priority means responsive to parameters of different reply source for selecting a primary threat for display.

14. An improved reply detector as recited in claim 13 wherein said display means includes means for displaying the existence of threats other than the threat being displayed.

15. An improved reply detector as recited in claim 6 wherein said alerting means includes:
   d3a) a source of an audible tone for generating a tone in response to said distinctive output, and
   d3b) means for energizing said audible tone for either continuous or a limited period of operation.

16. An improved reply detector as recited in claim 15 wherein said alerting means further includes:
   d3c) muting means responsive to operation of an operator input for muting said source of an audible tone for a predetermined time, and
   d3d) first programmable means for selecting said predetermined time.

17. An improved reply detector as recited in claim 16 wherein said alerting means further includes:
   d3e) second programmable means for selecting continuous or limited period of operation of said source of said audible tone:

18. An improved reply detector as recited in claim 17 wherein said second programmable means includes means for selecting continuous or limited period of operation of said source of said audible tone for each of a plurality of different flight regimes.

19. A proximity warning system for host aircraft based on evaluation of replies from transponder equipped other aircraft to interrogations from a Secondary Surveillance Radar, said system including a host transponder and a reply detector, said reply detector comprising:
 a) first means for repeatedly suppressing said host transponder for a sequence of suppression durations, each of a given, equal, duration whose initiation is selected within a given time window on a random basis,
 b) a reply receiver,
 c) data storage means responsive to said first means for storing data from said reply receiver only during a suppression duration, and
 d) threat evaluation means responsive to said data storage means for signaling presence of a collision threat.

20. A proximity warning system as recited in claim 19 wherein said threat evaluation means includes a selectable threat threshold and means for comparing an output amplitude from said reply receiver to said threat threshold.

21. A proximity warning system as recited in claim 20 wherein said threat evaluation means includes an operator input for selecting said threat threshold.

22. A proximity warning system as recited in claim 19 wherein said threat evaluation means includes a selectable threat threshold and means for comparing a difference between host altitude and an altitude represented by a mode C reply to said threat threshold, where said threat threshold is a relative altitude threshold.

23. A proximity warning system as recited in claim 22 wherein said threat evaluation means includes an operator input for selecting said relative altitude threshold.

24. A proximity warning system as recited in claim 19 or 20 or 22 wherein said given duration of suppression is less than 1 ms.

25. A proximity warning system as recited in claim 19 or 20 or 22 wherein a ratio of the summation of time durations of a succession of said suppression durations to time encompassing said suppression durations is in a range of about 13% to about 20%.

26. A proximity warning system as recited in claim 19 wherein said threat evaluation means further includes display means for displaying parameters of at least one threat.

27. A proximity warning system as recited in claim 26 wherein said display means displays at least one parameter changing in relation to distance between threat and host.

28. A proximity warning system as recited in claim 26 wherein said threat evaluation means further includes display control means for selecting threat parameters for display.

29. A proximity warning system as recited in claim 28 wherein said threat evaluation means further includes priority means responsive to parameters of different threats for selecting a primary threat for display.

30. A proximity warning system as recited in claim 29 wherein said display means further includes means for displaying the existence of threats other than the threat being displayed.

31. In a proximity warning system based on receipt, at an own aircraft, of replies by transponders of other aircraft to interrogations from Secondary Surveillance Radar, a method of reducing the masking effect of own aircraft transponder replies comprising the steps of:
 a) dividing time into a succession of time slices of different durations, each time slice including only one suppression duration, remaining time in any time slice available for reply transmissions,
 b) actively asserting a suppression signal to an own aircraft transponder for the duration of each of said suppression durations,
 c) disabling receipt of replies outside of a suppression duration,
 d) wherein each of said suppression durations are selected to last for equal durations, and
 e) initiating a suppression duration in a time slice at a time within said time slice selected at random.

32. A method as recited in claim 31 wherein said time slice durations and the duration of said suppression is selected to suppress less than about 20% of possible replies from said own aircraft transponder.

33. A method as recited in claim 32 wherein said suppression duration is smaller than a limit established by a time constant exhibited by a suppression input of said own aircraft transponder.

34. A method as recited in claim 31 wherein said time slice durations and the duration of said suppression is selected to suppress about 20% of possible replies from said own aircraft transponder.

35. A method as recited in claim 31 wherein said suppression duration is selected as less than 1 ms. and said remaining time averages less than about 8.5 ms.

36. A method as recited in claim 31 wherein said suppression duration is about 725 $\mu$s and said remaining time averages either about 3 ms. or about 4.9 ms.

37. A method as recited in claim 36 wherein said remaining time has durations in the range of about 725 $\mu$s to about 6.16 ms.

38. A method as recited in claim 31 wherein said suppression duration is about 725 $\mu$s and said remaining time averages about 3 ms.

39. A method as recited in claim 31 wherein said suppression duration is greater than a duration of a reply.

40. A method as recited in claim 39 wherein suppression duration is greater than a duration of a reply by a multiple of about 28.

41. In a proximity warning system based on receipt, at an own aircraft, of replies by transponders of other aircraft, a method of threat detection for treating otherwise ambiguous Mode A and Mode C replies comprising the steps of:
 a) establishing a threat altitude region based on own aircraft altitude,
 b) selecting for treatment as a possible Mode C reply only received data equivalent to a defined Mode C reply, and
 c) selecting for treatment only a subset of those replies selected in step b), said subset comprising those replies representing an altitude within said threat altitude region.

42. A method as recited in claim 41 wherein said replies are replies to interrogations from an SSR and which includes the further steps of:
 d) comparing replies with defined Mode C replies to differentiate possible Mode C replies from Mode A replies, e) placing on a list to be considered as Mode A replies all replies with data which is not a defined Mode C reply and in addition replies not selected in step c), along with a time stamp indicating a time of receipt, and f) comparing a time stamp associated with the subset of replies selected in step c) with time stamps of replies on said list of step e) and pairing replies with time stamp pairs meeting a predetermined time stamp criterion.

43. A method as recited in claim 42 in which said step e) also places, along with data on said list of step e) a value representing distance between own and other aircraft and wherein said step f) pairs replies based on said time stamp and said values representing distance.

44. A method as recited in claim 43 which includes the further steps of:

g) updating records in said list in terms of relative altitude and apparent distance, h) determining from changes in relative altitude whether said relative altitude is increasing or decreasing, and i) displaying relative altitude along with an indication of increasing or decreasing relative altitude.

45. A method as recited in claim 42 which further includes:

g) displaying an altitude difference based on own altitude and altitude corresponding to a possible mode C reply from said subset of step c).

46. A method as recited in claim 45 wherein said step g) further includes indicating whether said altitude corresponding to a possible mode C reply from said subset of step c) is above or below said own aircraft.

47. A method as recited in claim 46 which further includes:

h) displaying a mode A reply, paired with a possible mode C reply of step f).

48. A method as recited in any of claims 41-47, which further comprises:

i) establishing a threat prioritization table yielding a priority value for distance and altitude separations between host aircraft and source of a reply, ii) processing entries on said list with said prioritization table to assign a priority value for entries on said list, and iii) selecting from said list an entry of highest priority and iv) driving a display with data from said entry selected in step iii).

49. A method as recited in claim 48 which comprises the further steps of:

v) selecting from said list entries of second and third highest priority value, and vi) driving said display with data indicating whether or not there are entries of second and third highest priority value.

50. A method as recited in claim 41 wherein said step of establishing a threat altitude region based on own aircraft altitude comprises:

i) selecting a limiting altitude offset, ii) establishing said threat altitude region as that altitude space within said limiting altitude offset from said own aircraft altitude.

51. A method as recited in claim 50 wherein said step i) comprises:

i1) programming a plurality of limiting altitude offsets, a different limiting altitude offset for each different zone of travel, and i2) selecting a zone of travel to select the corresponding limiting altitude offset.

52. In a proximity warning system for host aircraft including a transponder and a reply detector and based on evaluation of replies from transponders of other aircraft, a reply detector and altitude alert comprising:

a) buffer means responsive to altitude measurement for reporting own aircraft altitude, b) reply detecting means responsive to transponder replies from other aircraft for displaying proximate threats based on own aircraft altitude as determined from said buffer means, c) recording means responsive to engaging an altitude alerting function for recording existing own aircraft altitude when said altitude alerting function is engaged, d) comparing means enabled on engaging said altitude alerting function for comparing the own aircraft altitude recorded by said recording means with own aircraft altitude of said buffer means to generate an altitude difference, and e) alarm means responsive to said altitude difference from said comparing means for producing an alarm when said altitude difference is increased above a predetermined altitude difference threshold.

53. The apparatus as recited in claim 52 which further includes:

f) control means for engaging and disengaging an altitude alerting function in response to depression of selected pushbuttons, said control means engaging said altitude alerting function on depression of said pushbuttons when said altitude alerting function is disengaged and disengaging said alerting function on depression of said pushbuttons when said altitude alerting function is engaged.

54. The apparatus as recited in claim 52 which further includes:

f) control means for disengaging an altitude alerting function in response to said comparing means indication of a difference between own altitude recorded by said recording means and own aircraft altitude as above a second predetermined altitude difference threshold.

55. The apparatus as recited in claim 52 where said reply detecting means further comprises:

b1) a source of an audible tone for generating a tone in response detection of a proximate threat from another aircraft, and b2) means for energizing said audible tone for either continuous or a limited period of operation.

56. The apparatus as recited in claim 55 where said reply detecting means further comprises:

b3) muting means responsive to operation of an operator input for muting said source of an audible tone for a predetermined time, and b4) first programmable means for selecting said predetermined time.

57. The apparatus as recited in claim 56 where said reply detecting means further comprises:

b5) second programmable means for selecting continuous or limited period of operation of said source of said audible tone, wherein said second programmable means includes means for selecting continuous or limited period of operation of said source of said audible tone for each of a plurality of different flight regimes.

58. The apparatus as recited in claim 52 wherein said reply detecting means further comprises:

b1) a source of an audible tone for generating a tone in response to detection of a proximate threat from another aircraft; and b2) means responsive to an operator input for muting said source of an audible tone until detection of a predetermined change in host altitude.

59. In a proximity warning system for host aircraft including a transponder and a reply detector and based on evaluation of replies from transponders of other aircraft, a reply detector and altimeter check comprising:

a) buffer means responsive to pressure altitude measurement for reporting own aircraft altitude, b) reply detecting means responsive to transponder replies from other aircraft for displaying information on proximate threats based on own aircraft altitude as determined from said buffer means, c) recording means responsive to engaging a barometric correction function for recording local barometric pressure, and d) altitude display means responsive to said reporting means and to said recording means for compensating the own aircraft altitude from said buffer means in accordance with said local barometric pressure from said recording means to display, local barometric pressure corrected, own aircraft altitude.

60. The apparatus as recited in claim 59 which further includes:

e) threat display means for displaying pressure corrected threat altitude based on replies detected by said reply detecting means and local barometric pressure from said recording means.

61. In a proximity warning system for host aircraft including a transponder and a reply detector and based on evaluation of replies from transponders of other aircraft, a reply detector and density altitude computer comprising:

a) buffer means responsive to pressure altitude measurement for reporting own aircraft altitude, b) reply detecting means responsive to transponder replies from other aircraft for displaying information on proximate threats based on own aircraft altitude as determined from said buffer means, c) recording means responsive to engaging a density altitude function for recording local ambient temperature, and d) density altitude display means responsive to said buffer means and to said recording means for compensating the own aircraft altitude from said buffer means in accordance with said local ambient temperature from said recording means to display, local temperature corrected, own aircraft density altitude.

62. A method of validating a transponder reply in a proximity warning system comprising the steps of:

a) identifying F1 and F2 reply pulses;

b) determining if said pulses differ in amplitude by more than a given amount; rejecting said reply if they do, otherwise accepting said pulses;

c) averaging amplitudes of said F1 and F2 pulses to determine a midpoint;

d) identifying a pulse received between said F1 and F2 pulses in time and closest to a current midpoint; terminating said validation if no pulse is identified;

e) rejecting a pulse identified in step d) and terminating the validation if the identified pulse has an amplitude differing by more than a specified amount from said current midpoint, otherwise accepting said pulse;

f) determining a new midpoint if the pulse identified in step d) has an amplitude which is greater or less than the amplitudes of the largest or smallest pulse which has been accepted; and g) repeating steps d), e), and f) until said validation is terminated.

63. A method as recited in claim 62 which includes the further, preparatory steps of:

i) sampling received energy and digitizing an output from the sampling, ii) averaging each digitized sample with a predetermined number of adjacent samples and storing said averaged samples, and iii) validating pulses from those ones of the stored averaged samples which have time durations meeting predetermined criteria.

64. A method as recited in claim 63 which includes the further preparatory step of:

iv) comparing a sequence of pulses from step iii) with a predetermined sequence criterion and discarding those pulse sequences which do not meet the predetermined sequence criterion.

65. A method as recited in claim 62 wherein said step (c) further includes:

c1) comparing the average amplitude determined in step (c) against a threshold amplitude and rejecting said reply if said average is less than the threshold amplitude.

* * * * *